(12) United States Patent
Atobe

(10) Patent No.: US 11,435,383 B2
(45) Date of Patent: Sep. 6, 2022

(54) INFORMATION PROCESSING APPARATUS, INFORMATION PROCESSING METHOD, AND COMPUTER READABLE MEDIUM

(71) Applicant: Mitsubishi Electric Corporation, Tokyo (JP)

(72) Inventor: Yuta Atobe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 128 days.

(21) Appl. No.: 16/482,772

(22) PCT Filed: Sep. 6, 2017

(86) PCT No.: PCT/JP2017/032153
§ 371 (c)(1),
(2) Date: Aug. 1, 2019

(87) PCT Pub. No.: WO2018/146845
PCT Pub. Date: Aug. 16, 2018

(65) Prior Publication Data
US 2020/0233019 A1    Jul. 23, 2020

(30) Foreign Application Priority Data

Feb. 8, 2017    (WO) .................. PCT/JP2017/004555

(51) Int. Cl.
*G01R 19/165*    (2006.01)
*G01K 13/00*    (2021.01)
(Continued)

(52) U.S. Cl.
CPC ....... *G01R 19/16585* (2013.01); *G01K 13/00* (2013.01); *G01R 15/14* (2013.01); *G06F 11/3027* (2013.01); *G06F 11/3058* (2013.01)

(58) Field of Classification Search
CPC .. G01R 19/16585; G01R 15/14; G01K 13/00; G06F 11/3027; G06F 11/3058;
(Continued)

(56) References Cited

U.S. PATENT DOCUMENTS 6,826,350 B1    11/2004 Kashino et al.
10,831,184 B2 *  11/2020 Endo .................... G05B 23/024
(Continued)

FOREIGN PATENT DOCUMENTS

JP    2000-138695 A    5/2000
JP    2000-312343 A    11/2000
(Continued)

OTHER PUBLICATIONS

Google machine translation of RU2598684C1 retrieved on Oct. 5, 2021. (Year: 2016).*
(Continued)

*Primary Examiner* — Raymond L Nimox
(74) *Attorney, Agent, or Firm* — Sughrue Mion, PLLC; Richard C. Turner

(57) ABSTRACT

A comparison unit (22) compares a measurement value, which is one of changes over time in a voltage value of a bus line (11), distance transition of the voltage value, changes over time in an impedance value of the bus line (11), and distance transition of the impedance value that have been measured, with a normal value, which is one of changes over time in a voltage value of the bus line (11), distance transition of the voltage value, changes over time in an impedance value of the bus line (11), and distance transition of the impedance value in a normal state, and extracts a difference between the measurement value and the normal value. An unauthorized connection determination unit (24) evaluates the difference between the measurement value and the normal value extracted by the comparison unit (22), so (Continued)

as to determine whether an unauthorized device is connected to the bus line (11).

26 Claims, 44 Drawing Sheets

(51) Int. Cl.
    *G01R 15/14*       (2006.01)
    *G06F 11/30*       (2006.01)
(58) Field of Classification Search
    CPC ........ G06F 21/554; G06F 11/07; G06F 13/00; G06F 21/85
    See application file for complete search history.

(56) References Cited

U.S. PATENT DOCUMENTS

| | | |
|---|---|---|
| 2005/0053355 A1 | 3/2005 | Kashino et al. |
| 2005/0084238 A1 | 4/2005 | Kashino et al. |
| 2006/0034493 A1* | 2/2006 | Shimamura ........... A61B 5/6838 382/115 |
| 2006/0164998 A1 | 7/2006 | Pharn |
| 2014/0059098 A1* | 2/2014 | Otani ................... G06K 9/6203 708/209 |
| 2014/0380416 A1* | 12/2014 | Adachi ................... H04L 63/20 726/2 |
| 2016/0106332 A1* | 4/2016 | Takeshima ............. A61B 5/366 600/509 |
| 2016/0154038 A1* | 6/2016 | Toizumi ................. G01R 21/00 702/61 |
| 2018/0285601 A1* | 10/2018 | Ogawa .................... G06F 21/71 |

FOREIGN PATENT DOCUMENTS

| | | |
|---|---|---|
| JP | 2001-196980 A | 7/2001 |
| JP | 2002-318262 A | 10/2002 |
| JP | 2007-036512 A | 2/2007 |
| JP | 2007-046954 A | 2/2007 |
| JP | 2007-108058 A | 4/2007 |
| JP | 2007-333468 A | 12/2007 |
| JP | 2008-046038 A | 2/2008 |
| JP | 2008-064523 A | 3/2008 |
| JP | 2010-016560 A | 1/2010 |
| JP | 2010-204033 A | 9/2010 |
| JP | 2012-097603 A | 5/2012 |
| JP | 2012-149914 A | 8/2012 |
| JP | 2013-187555 A | 9/2013 |
| JP | 2014-041453 A | 3/2014 |
| JP | 2014-083874 A | 5/2014 |
| JP | 2015-161506 A | 9/2015 |
| JP | 2015-230168 A | 12/2015 |
| RU | 2598684 C1 * | 9/2016 |

OTHER PUBLICATIONS

International Search Report for PCT/JP2017/032153 dated Nov. 7, 2017 [PCT/ISA/210].
International Search Report for PCT/JP2017/004555 dated Mar. 14, 2017 [PCT/ISA/210].
Japanese Office Action No. 2018-506364 dated May 8, 2018.

* cited by examiner

Fig. 45

| CRITERION ID | THRESHOLD VALUE | UPPER LIMIT WIDTH |
|---|---|---|
| 1 | −2.0 | 10 |
| 2 | −5.5 | 5 |
| .. | .. | .. |

INFORMATION PROCESSING APPARATUS, INFORMATION PROCESSING METHOD, AND COMPUTER READABLE MEDIUM

CROSS REFERENCE TO RELATED APPLICATIONS

This application is a National Stage of International Application No. PCT/JP2017/032153 filed Sep. 6, 2017, claiming priority based on PCT/JP2017/004555 filed Feb. 8, 2017.

TECHNICAL FIELD

The present invention relates to a technique for verifying the legitimacy of a device connected to a bus line.

BACKGROUND ART

Network systems in which a plurality of devices are connected to a bus line are in widespread use. For example, a Controller Area Network (CAN) which is in widespread use as an in-vehicle network is a bus-type network. In a bus-type network system, a device can be easily added. For this reason, in a use case where many and unspecified users can access a single bus line (for example, car sharing, etc.), a possibility exists that an unauthorized device may be connected to the bus line by a malicious user. Then, if the unauthorized device is connected to the bus line, a possibility exists that confidential information transferred on the bus line may be intercepted by the unauthorized device, and a possibility exists that unauthorized data may be transmitted to other devices on the bus line by the unauthorized device, for example.

Patent Literature 1 discloses a technique for estimating a location of a failure point in a cable.

CITATION LIST

Patent Literature

Patent Literature 1: JP 2007-333468 A

SUMMARY OF INVENTION

Technical Problem

Patent Literature 1 describes a technology called time domain relfectometry (TDR) for observing the reflection characteristic of a high-frequency step signal transmitted on a bus line, and discloses the technique for estimating a location of a failure point in a cable by employing this technology. However, with the configuration of Patent Literature 1, it is not possible to determine whether an unauthorized device is connected to a bus line. Therefore, a problem is that in order to determine whether an unauthorized device is connected to a bus line, it is at present necessary for a manager or the like to visually check the bus line, which requires time and cost.

It is a main object of the present invention to solve the above problem. Specifically, it is a main object of the present invention to efficiently determine whether an unauthorized device is connected to a bus line.

Solution to Problem

An information processing apparatus according to the present invention includes:

a comparison unit to compare a measurement value with a normal value, and extract a difference between the measurement value and the normal value, the measurement value being one of changes over time in a voltage value of a bus line, distance transition of the voltage value, changes over time in an impedance value of the bus line, and distance transition of the impedance value that have been measured, the normal value being one of changes over time in a voltage value of the bus line, distance transition of the voltage value, changes over time in an impedance value of the bus line, and distance transition of the impedance value in a normal state; and an unauthorized connection determination unit to evaluate the difference between the measurement value and the normal value extracted by the comparison unit, so as to determine whether an unauthorized device is connected to the bus line.

Advantageous Effects of Invention

According to the present invention, it is possible to efficiently determine whether an unauthorized device is connected to a bus line.

BRIEF DESCRIPTION OF DRAWINGS

FIG. 45 is a diagram illustrating an example of an unauthorized connection determination criterion according to Embodiment 12;

DESCRIPTION OF EMBODIMENTS

Embodiments of the present invention will be described hereinafter with reference to the drawings. In the description and the drawings of the embodiments below, parts denoted by the same reference signs indicate the same or corresponding parts.

Embodiment 1

*Description of Configurations*

Figure 1:
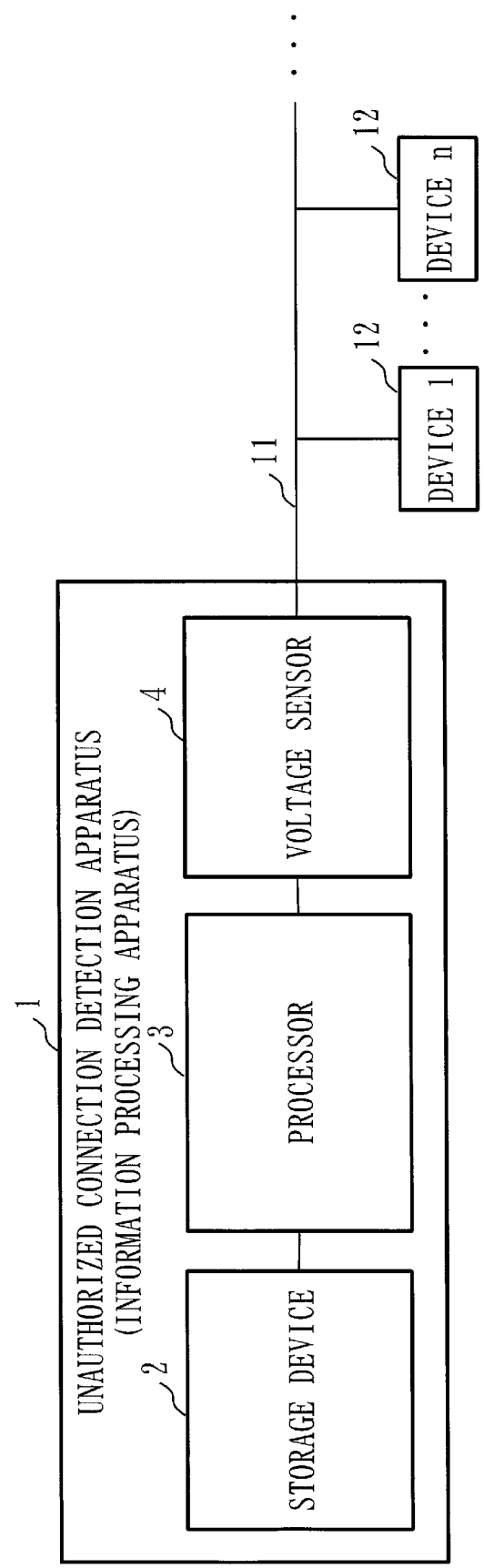
FIG. 1 is a diagram illustrating an example of the hardware configuration of an unauthorized connection detection apparatus according to Embodiment 1.

FIG. 1 illustrates an example of the hardware configuration of an unauthorized connection detection apparatus 1 according to Embodiment 1.

The unauthorized connection detection apparatus 1 is connected to a bus line 11. The bus line 11 is a bus network such as a Controller Area Network (CAN), a Local Interconnect Network (LIN), or Ethernet (registered trademark), for example.

An n number of devices 12 are connected to the bus line 11. The n number of devices 12 are devices that are permitted to connect to the bus line 11 and are authorized devices.

The unauthorized connection detection apparatus 1 determines whether an unauthorized device is connected to the bus line 11.

An unauthorized device is a device that is not permitted to connect to the bus line 11. In this embodiment, it is assumed that no device other than the n number of authorized devices illustrated in FIG. 1 is permitted to connect to the bus line 11. Therefore, if a device other than the n number of authorized devices 12 is connected to the bus line 11, the unauthorized connection detection apparatus 1 determines that an unauthorized device is connected to the bus line 11. If a new device is connected to the bus line 11 in place of one of the devices 12, the unauthorized connection detection apparatus 1 also determines that an unauthorized device is connected to the bus line 11. If a communication integrated circuit (IC) in one of the devices 12 is replaced with a different communication IC, the unauthorized connection detection apparatus 1 also determines that an unauthorized device is connected to the bus line 11.

Note that the unauthorized connection detection apparatus 1 corresponds to an information processing apparatus. Processes performed in the unauthorized connection detection apparatus 1 correspond to an information processing method and an information processing program.

The unauthorized connection detection apparatus 1 is a computer.

The unauthorized connection detection apparatus 1 includes a storage device 2, a processor 3, and a voltage sensor 4, as hardware.

The storage device 2 stores programs for realizing the functions of a comparison unit 22, an unauthorized connection determination unit 24, and a determination result notification unit 26 to be described later with reference to FIG. 2.

The processor 3 executes these programs to perform the operation of the comparison unit 22, the unauthorized connection determination unit 24, and the determination result notification unit 26.

The storage device 2 also stores a normal waveform 23 and an unauthorized connection determination criterion 25 to be described later with reference to FIG. 2.

The voltage sensor 4 is connected to the bus line 11. The voltage sensor 4 measures a voltage value of the bus line 11. The voltage sensor 4 is a sampler circuit, a comparator, an analog/digital (A/D) converter, or the like. The voltage sensor 4 realizes a waveform acquisition unit 21 to be described later with reference to FIG. 2.

Figure 2:
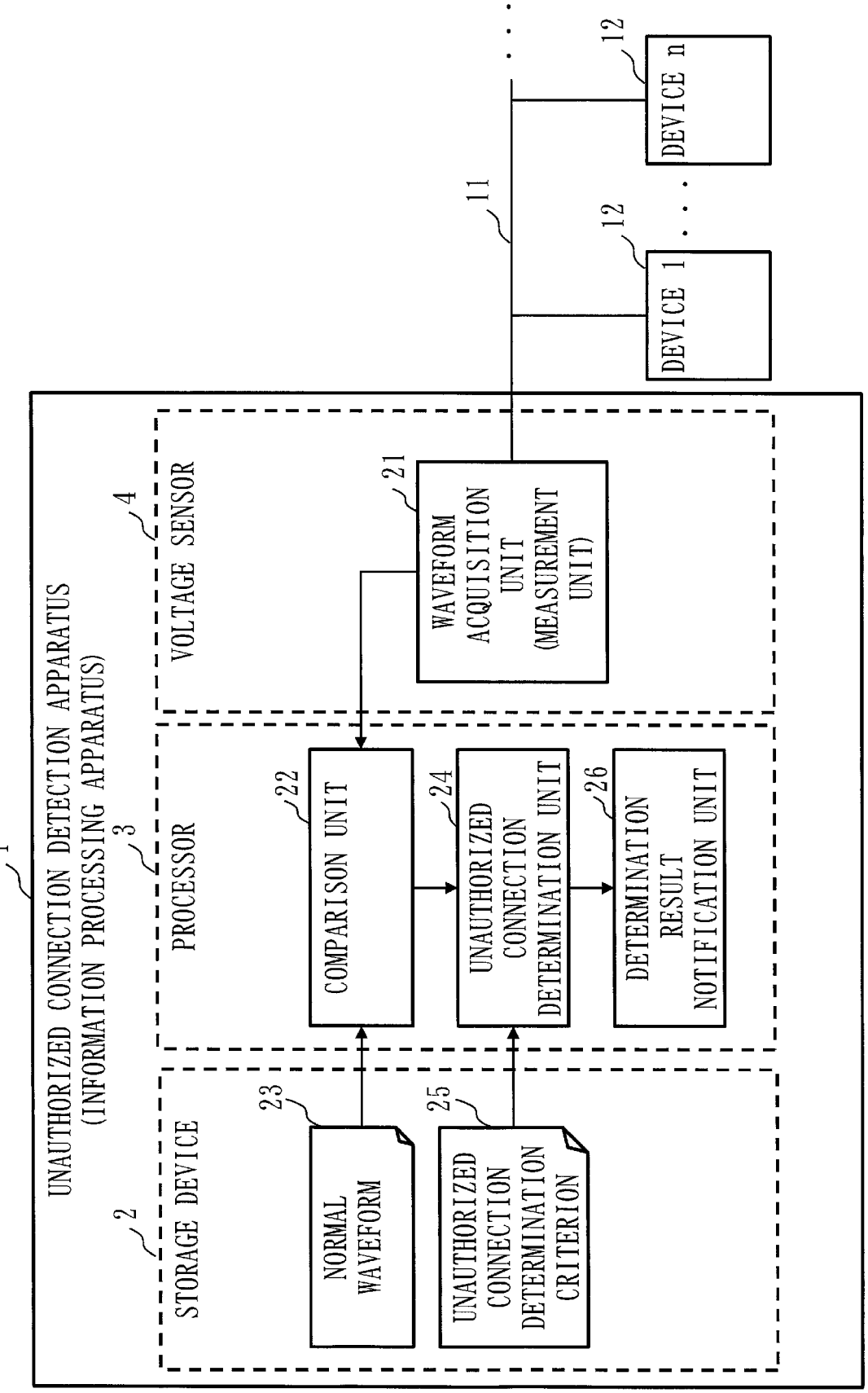
FIG. 2 is a diagram illustrating an example of the functional configuration of the unauthorized connection detection apparatus according to Embodiment 1.

FIG. 2 illustrates an example of the functional configuration of the unauthorized connection detection apparatus 1 according to this embodiment.

The unauthorized connection detection apparatus 1 is composed of the waveform acquisition unit 21, the comparison unit 22, the unauthorized connection determination unit 24, and the determination result notification unit 26.

As described above, the waveform acquisition unit 21 is realized by the voltage sensor 4.

As described above, the comparison unit 22, the unauthorized connection determination unit 24, and the determination result notification unit 26 are realized by the programs. The processor 3 executes these programs to perform the operation of the comparison unit 22, the unauthorized connection determination unit 24, and the determination result notification unit 26. FIG. 2 schematically represents a state in which the processor 3 is executing the programs for realizing the functions of the comparison unit 22, the unauthorized connection determination unit 24, and the determination result notification unit 26.

The waveform acquisition unit 21 measures a voltage value of the bus line 11. The waveform acquisition unit 21 outputs a waveform representing changes over time in voltage values of the bus line 11 to the comparison unit 22 as an acquired waveform.

The waveform acquisition unit 21 corresponds to a measurement unit.

The comparison unit 22 acquires the normal waveform 23 from the storage device 2. The comparison unit 22 compares the acquired waveform output from the waveform acquisition unit 21 with the normal waveform 23. Then, the comparison unit 22 outputs the comparison result to the unauthorized connection determination unit 24.

The normal waveform 23 is a waveform representing changes over time in voltage values of the bus line 11 in a normal state. The term "normal" refers to a state in which only the n number of authorized devices 12 are connected to the bus line 11.

That is, the comparison unit 22 compares changes over time in voltage values of the bus line 11, which is a measurement value of the waveform acquisition unit 21, with changes over time in voltage values of the bus line 11 in a normal state, which is a normal value.

The operation performed by the comparison unit 22 corresponds to a comparison process.

The unauthorized connection determination unit 24 acquires the unauthorized connection determination criterion 25. The unauthorized connection determination criterion 25 indicates a threshold value for a difference between the normal waveform 23 and the acquired waveform. The unauthorized connection determination unit 24 compares the comparison result output from the comparison unit 22 with the unauthorized connection determination criterion 25. If a difference between the acquired waveform and the normal waveform 23 indicated in the comparison result is within the unauthorized connection determination criterion 25, the unauthorized connection determination unit 24 determines that an unauthorized device is not connected to the bus line 11. On the other hand, if a difference between the acquired waveform and the normal waveform 23 indicated in the comparison result exceeds the unauthorized connection determination criterion 25, the unauthorized connection determination unit 24 determines that an unauthorized device is connected to the bus line 11.

In this way, the unauthorized connection determination unit 24 evaluates the difference between the acquired waveform and the normal waveform 23 extracted by the comparison unit 22, so as to determine whether an unauthorized device is connected to the bus line 11.

If an unauthorized device is connected to the bus line 11, a change occurs in the characteristic impedance of a portion where the unauthorized device is connected, and the change in the characteristic impedance can be observed as a change in a waveform by the TDR technology. The unauthorized connection determination unit 24 determines whether an unauthorized device is connected to the bus line 11 based on the presence or absence of an observed change in the waveform and the amount of the observed change.

The unauthorized connection determination unit 24 outputs the determination result on the presence or absence of connection of an unauthorized device to the determination result notification unit 26.

The operation performed by the unauthorized connection determination unit 24 corresponds to an unauthorized connection determination process.

The determination result notification unit 26 notifies a user of the unauthorized connection detection apparatus 1 of the determination result of the unauthorized connection determination unit 24. For example, upon obtaining the determination result indicating that an unauthorized device is connected to the bus line 11, the determination result notification unit 26 issues an alarm.

Figure 13:
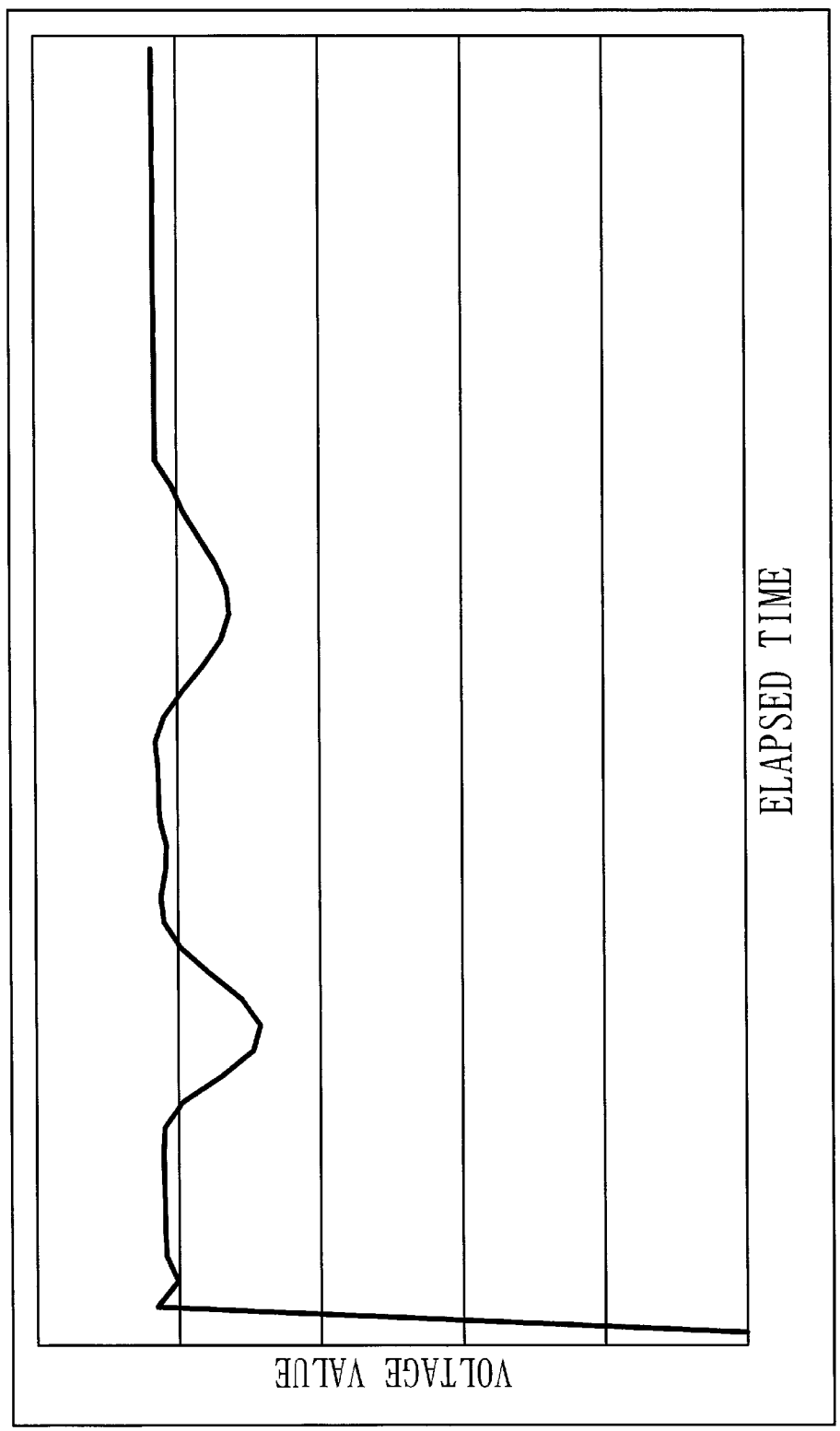
FIG. 13 is a diagram illustrating an example of a normal waveform according to Embodiment 1.

FIG. 13 illustrates an example of the normal waveform 23.

In this embodiment, the comparison unit 22 compares the acquired waveform with the normal waveform 23 representing changes over time in voltage values as illustrated in FIG. 13. However, the comparison unit 22 may compare the acquired waveform simply with scalar values indicating specific voltage values, in place of the normal waveform 23.

The comparison unit 22 may use a waveform of impedance values for comparison, in place of a waveform of voltage values. In this case, the waveform acquisition unit 21 has a function of converting a measured voltage value into an impedance value based on an applied voltage value. Alternatively, an elapsed time may be converted in a lengthwise direction of the bus line 11. In this case, the waveform acquisition unit 21 has a function of converting an elapsed time at a measurement point in the lengthwise direction, based on a transmission line delay time. Then, the comparison unit 22 compares a waveform acquired by conversion in the waveform acquisition unit 21 with a waveform representing changes over time in impedance values of the bus line 11 or distance transition in the lengthwise direction of voltage values or impedance values of the bus line 11 in a normal state.

*Description of Operation*

The operational flow of the unauthorized connection detection apparatus 1 according to this embodiment will be described with reference to FIGS. 5, 6, 7, and 8.

When the user issues an instruction for execution to the unauthorized connection detection apparatus 1, the waveform acquisition unit 21 starts a waveform acquisition process (step S101).

Figure 6:
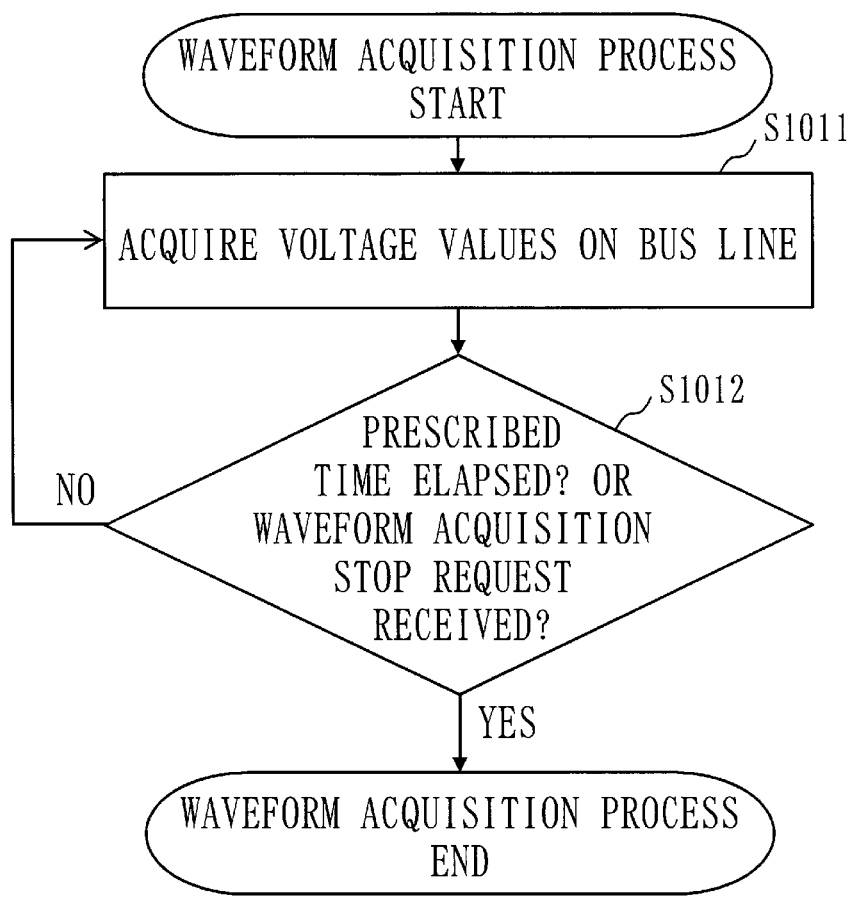
FIG. 6 is a flowchart illustrating a waveform acquisition process of the unauthorized connection detection apparatus according to Embodiment 1.

Details of the waveform acquisition process will be described with reference to FIG. 6.

In the waveform acquisition process, the waveform acquisition unit 21 repeatedly acquires voltage values of the bus line 11 until a prescribed time elapses or until a waveform acquisition stop request is received (steps S1011, 1012).

Upon completion of the waveform acquisition process by the waveform acquisition unit 21, the comparison unit 22 starts a comparison process (step S102).

Figure 7:
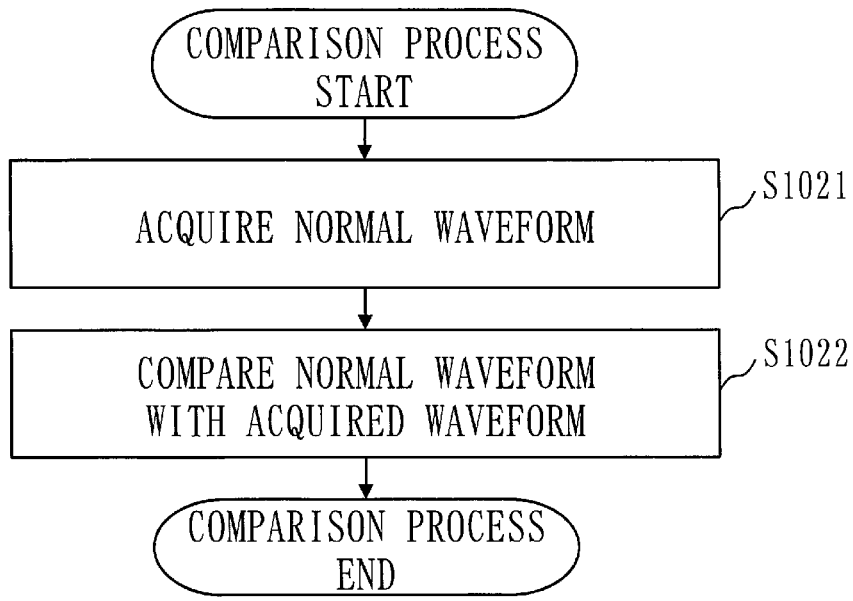
FIG. 7 is a flowchart illustrating a comparison process of the unauthorized connection detection apparatus according to Embodiment 1.

Details of the comparison process will be described with reference to FIG. 7.

In the comparison process, the comparison unit 22 first acquires the normal waveform 23 from the storage device 2 (step S1021). Then, the comparison unit 22 compares the normal waveform 23 with the acquired waveform (step S1022). For example, as comparison between the normal waveform 23 and the acquired waveform, the comparison unit 22 may obtain a distance between the normal waveform 23 and the acquired waveform. As the distance, the comparison unit 22 may obtain a Euclidean distance or a dynamic time warping (DTW) distance, for example. As another comparison method, a difference between the waveforms at each sample point may be obtained to obtain a differential waveform.

Upon completion of the comparison process by the comparison unit 22, the unauthorized connection determination unit 24 starts an unauthorized connection determination process (step S103).

Figure 8:
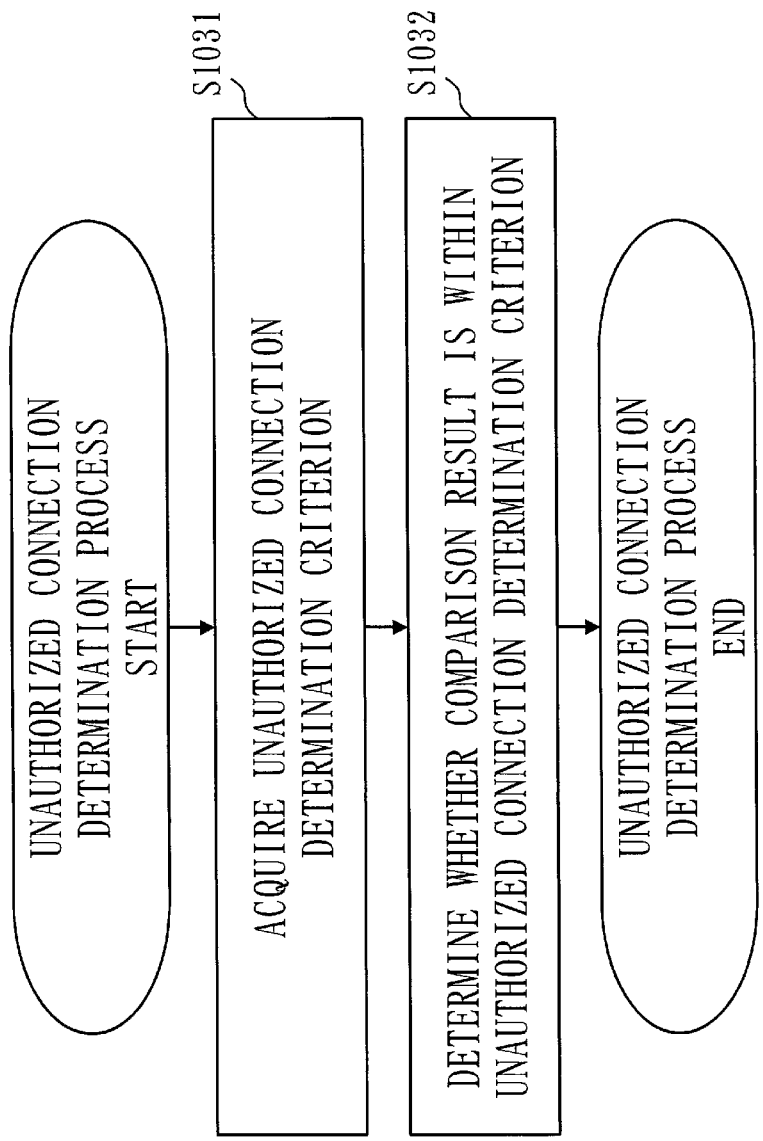
FIG. 8 is a flowchart illustrating an unauthorized connection determination process of the unauthorized connection detection apparatus according to Embodiment 1.

Details of the unauthorized connection determination process will be described with reference to FIG. 8.

In the unauthorized connection determination process, the unauthorized connection determination unit 24 acquires the unauthorized connection determination criterion 25 from the storage device 2 (step S1031). Then, the unauthorized connection determination unit 24 determines whether the difference between the normal waveform 23 and the acquired waveform indicated in the comparison result of the comparison unit 22 is within the unauthorized connection determination criterion 25 (step S1032).

If the difference between the normal waveform 23 and the acquired waveform is within the unauthorized connection determination criterion 25, the unauthorized connection determination unit 24 determines that an unauthorized device is not connected to the bus line 11. On the other hand, if the difference between the normal waveform 23 and the acquired waveform exceeds the unauthorized connection determination criterion 25, the unauthorized connection determination unit 24 determines that an unauthorized device is connected to the bus line 11.

Upon completion of the unauthorized connection determination process by the unauthorized connection determination unit 24, the determination result notification unit 26 notifies the user of the unauthorized connection detection apparatus 1 or notifies an external device of the determination result of the unauthorized connection determination unit 24 (step S104).

Description of Effects of Embodiment

In this embodiment, the unauthorized connection detection apparatus 1 measures a voltage value or an impedance value of the bus line 11, and compares a measurement value, which is the measured voltage value or impedance value, with a normal value, which is a voltage value or impedance value of the bus line in a normal state. Then, the unauthorized connection detection apparatus 1 evaluates a difference between the measurement value and the normal value to determine whether an unauthorized device is connected to the bus line 11. Therefore, it is not necessary for the user to visually check for connection of an unauthorized device, so that the presence or absence of connection of an unauthorized device can be determined efficiently.

Embodiment 2

In this embodiment, differences from Embodiment 1 will be mainly described. Matters not described below are the same as in Embodiment 1.

Figure 3:
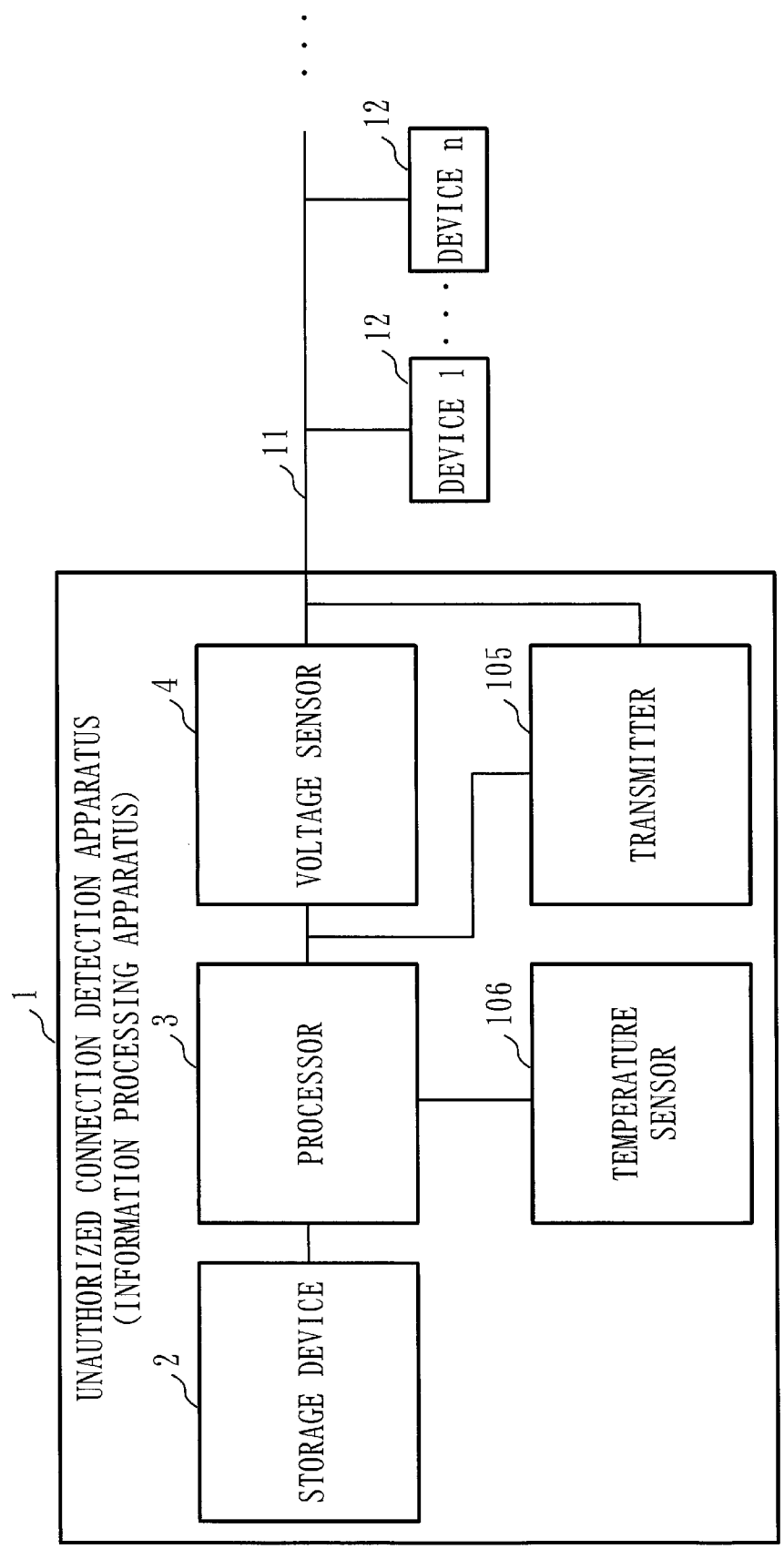
FIG. 3 is a diagram illustrating an example of the hardware configuration of an unauthorized connection detection apparatus according to Embodiment 2.

FIG. 3 illustrates an example of the hardware configuration of an unauthorized connection detection apparatus 1 according to this embodiment.

In FIG. 3, a transmitter 105 and a temperature sensor 106 are added in comparison with FIG. 1. Elements other than the transmitter 105 and the temperature sensor 106 are the same as those illustrated in FIG. 1, and thus description will be omitted.

The transmitter 105 transmits a signal to the bus line 11 in accordance with an instruction from the processor 3.

The temperature sensor 106 measures a temperature around the bus line 11.

Figure 4:
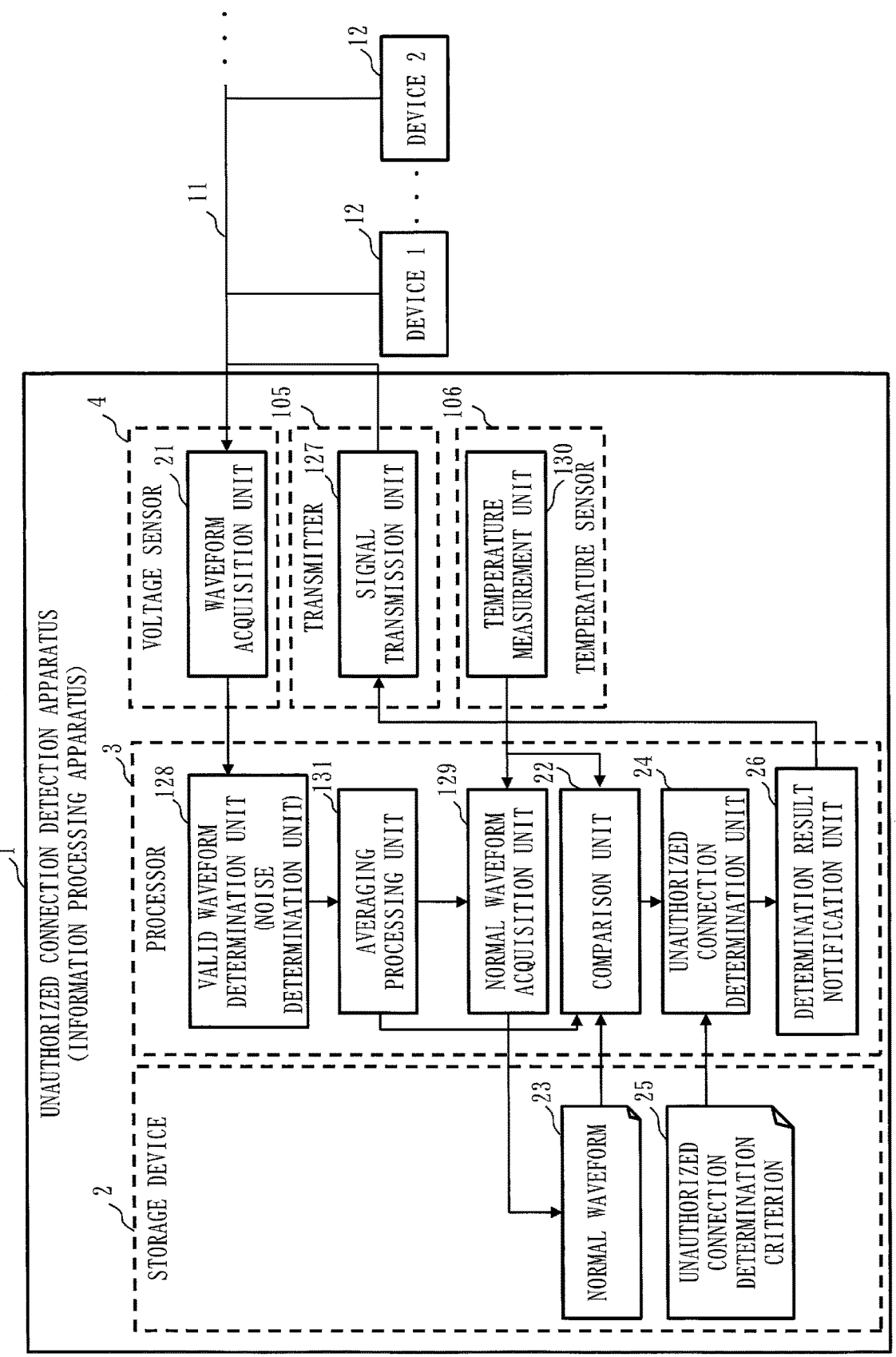
FIG. 4 is a diagram illustrating an example of the functional configuration of the unauthorized connection detection apparatus according to Embodiment 2.
Figure 5:
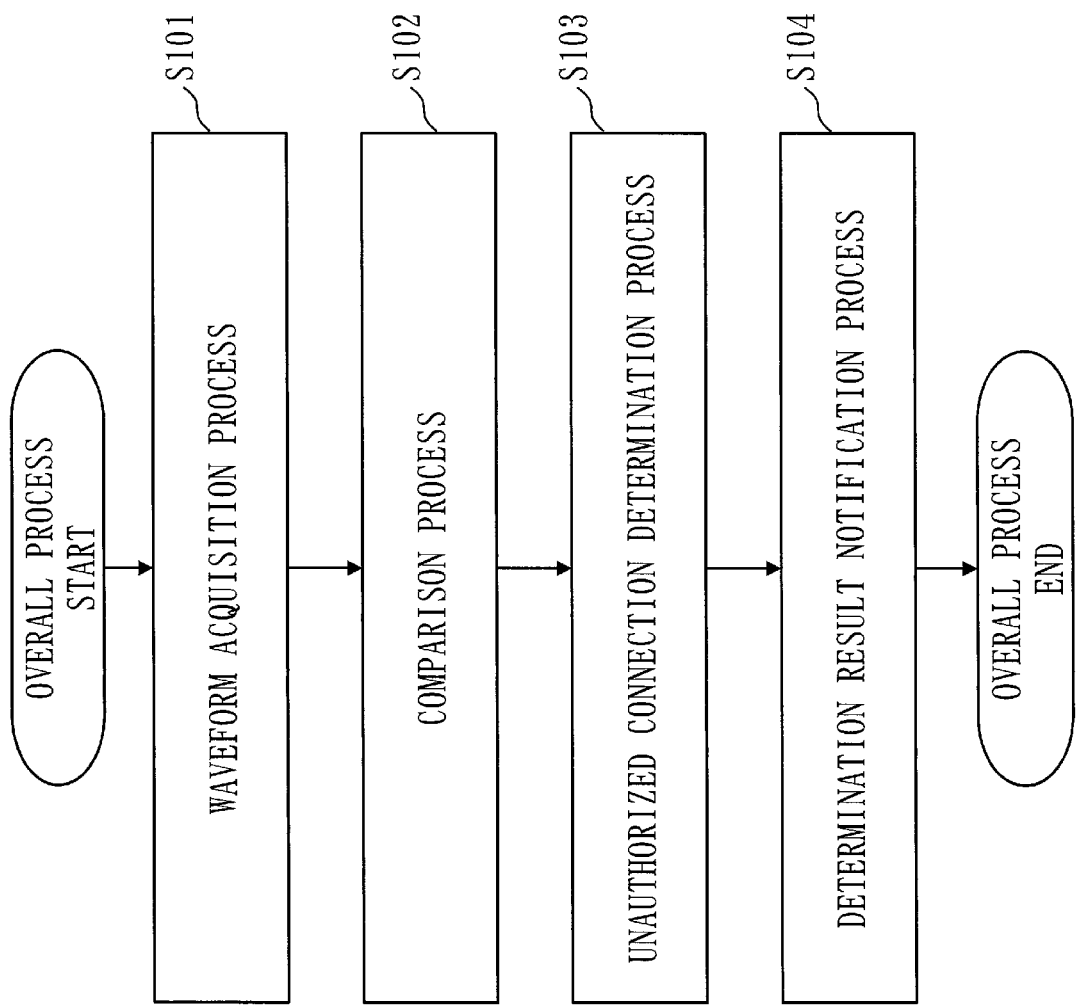
FIG. 5 is a flowchart illustrating an overall process of the unauthorized connection detection apparatus according to Embodiment 1.

FIG. 4 illustrates an example of the functional configuration of the unauthorized connection detection apparatus 1 according to this embodiment.

In FIG. 4, a signal transmission unit 127, a valid waveform determination unit 128, a normal waveform acquisition unit 129, a temperature measurement unit 130, and an averaging processing unit 131 are added in comparison with FIG. 2.

Elements other than the signal transmission unit 127, the valid waveform determination unit 128, the normal waveform acquisition unit 129, the temperature measurement unit 130, and the averaging processing unit 131 are the same as those illustrated in FIG. 2, and thus description will be omitted.

The signal transmission unit 127 is realized by the transmitter 105 illustrated in FIG. 3. The temperature measurement unit 130 is realized by the temperature sensor 106 illustrated in FIG. 3. The valid waveform determination unit 128, the normal waveform acquisition unit 129, and the averaging processing unit 131 are realized by programs, and these programs are executed by the processor 3.

The signal transmission unit 127 transmits a high-frequency step electrical signal or a pulse electrical signal to the bus line 11. In this embodiment, the waveform acquisition unit 21 observes the reflection characteristics of high-frequency step electrical signals or pulse electrical signals transmitted by the signal transmission unit 127 so as to measure changes over time in voltage values of the bus line 11.

The waveform acquisition unit 21 can accurately set the start timing and the end timing for acquiring a waveform, so that memory saving and an increase in processing speed can be expected.

In this embodiment, the determination result notification unit 26 may cause the signal transmission unit 127 to transmit a high-frequency step electrical signal or a pulse electrical signal to the bus line 11 to notify the bus line 11 of a determination result.

The valid waveform determination unit 128 determines whether an acquired waveform acquired by the waveform acquisition unit 21 is a valid waveform suitable for determination by the unauthorized connection determination unit 24. For example, the valid waveform determination unit 128 determines whether impulse noise is included in the acquired waveform. Then, only when impulse noise is not included in the acquired waveform, the valid waveform determination unit 128 outputs the acquired waveform to the averaging processing unit 131. The valid waveform determination unit 128 excludes acquired waveforms including impulse noise, so that the influence of impulse noise can be reduced in the unauthorized connection determination process, and connection of an unauthorized device can be detected with accuracy.

The valid waveform determination unit 128 corresponds to a noise determination unit.

The normal waveform acquisition unit 129 stores an acquired waveform acquired by the waveform acquisition unit 21 in a normal state and determined to be a valid waveform by the valid waveform determination unit 128 in the storage device 2 as the normal waveform 23. As described above, the term "normal" refers to a state in which only the n number of authorized devices 12 are connected to the bus line 11. The normal waveform acquisition unit 129 acquires the normal waveform 23, so that connection of an unauthorized device can be detected with high accuracy.

Note that the normal waveform acquisition unit 129 may store an acquired waveform after an averaging process by the averaging processing unit 131 to be described later in the storage device 2 as the normal waveform 23, or may store an acquired waveform without the averaging process by the averaging processing unit 131 in the storage device 2 as the normal waveform 23. FIG. 3 illustrates an example in which the normal waveform acquisition unit 129 stores an acquired waveform after the averaging process by the averaging processing unit 131 in the storage device 2 as the normal waveform 23.

The temperature measurement unit 130 measures a temperature around the bus line 11 and outputs the measurement result to the comparison unit 22. The temperature measurement unit 130 outputs the measurement result also to the normal waveform acquisition unit 129. The normal waveform acquisition unit 129 stores the normal waveform 23 in the storage device 2 in association with a temperature level of the temperature measured by the temperature measurement unit 130 at the time of acquisition of the normal waveform 23 concerned. As a result, the storage device 2 stores a plurality of the normal waveforms 23 in association with a plurality of temperature levels. The comparison unit 22 selects the normal waveform 23 associated with the temperature level corresponding to the temperature at acquisition of the acquired waveform by the waveform acquisition unit 21. Then, the comparison unit 22 acquires the selected normal waveform 23 from the storage device 2. Therefore, the unauthorized connection determination unit 24 can detect connection of an unauthorized device with accuracy, depending on the temperature around the bus line 11.

The averaging processing unit 131 performs the averaging process to average acquired waveforms. That is, the averaging processing unit 131 calculates an average waveform based on a plurality of acquired waveforms acquired by the waveform acquisition unit 21 and determined to be valid by the valid waveform determination unit 128. For example, the averaging processing unit 131 obtains the average waveform by superimposing the plurality of acquired waveforms on one another. The averaging processing unit 131 outputs the average waveform to the comparison unit 22. The comparison unit 22 compares the average waveform obtained by the averaging processing unit 131 with the normal waveform 23. By this arrangement, the unauthorized connection determination unit 24 can reduce the influence of noise on the voltages of the bus line 11, and can detect connection of an unauthorized device with accuracy.

The averaging processing unit 131 also outputs the average waveform to the normal waveform acquisition unit 129. As described above, the normal waveform acquisition unit 129 stores the average waveform in the storage device 2 as the normal waveform 23.

*Description of Operation*

The operational flow of the unauthorized connection detection apparatus 1 according to this embodiment will be described with reference to FIGS. 9 and 10.

First, the temperature measurement unit 130 performs a temperature measurement process (step S151). That is, the temperature measurement unit 130 measures a temperature around the bus line 11. The temperature measurement unit 130 notifies the comparison unit 22 of the measured temperature.

Next, the signal transmission unit 127 performs a signal transmission process (step S152). That is, the signal transmission unit 127 transmits a high-frequency step electrical signal or a pulse electrical signal to the bus line 11.

Next, the waveform acquisition unit 21 performs a waveform acquisition process (step S101). Details of the waveform acquisition process are as described in Embodiment 1.

Next, the valid waveform determination unit 128 performs a valid waveform determination process (step S153). That is, the valid waveform determination unit 128 determines whether impulse noise is included in the acquired waveform.

If the acquired waveform is a valid waveform, that is, if impulse noise is not included in the acquired waveform, step S154 is performed. The valid waveform determination unit 128 also outputs the acquired waveform which is a valid waveform to the averaging processing unit 131. If the acquired waveform is an invalid waveform, that is, if impulse noise is included in the acquired waveform, step S101 is performed again and steps from step S152 are performed again when the configuration includes the signal transmission unit 127.

If the acquired waveform is a valid waveform, the averaging processing unit 131 performs the averaging process (step S154). That is, the averaging processing unit 131 obtains an average waveform using a plurality of acquired waveforms.

If there are not enough acquired waveforms for averaging, step S152 is performed again. If there are enough acquired waveforms and the average waveform is obtained, step S102 is performed. If the average waveform is obtained, the averaging processing unit 131 outputs the average waveform to the comparison unit 22.

If the average waveform is obtained, the comparison unit 22 performs a comparison process (step S102).

Details of the comparison process according to this embodiment will be described with reference to FIG. 10.

In this embodiment, the comparison unit 22 first obtains the normal waveform 23 corresponding to the temperature measured by the temperature measurement unit 130 from the storage device 2 (step S1023). Then, the comparison unit 22 compares the acquired normal waveform 23 with the acquired waveform (step S1022). Details of step S1022 are as described in Embodiment 1.

After the comparison process, an unauthorized connection determination process (step S103) and a determination result notification process (step S104) are performed. Details of the unauthorized connection determination process and the determination result notification process are as described in Embodiment 1.

Next, a normal waveform acquisition process by the normal waveform acquisition unit 129 will be described with reference to FIGS. 11 and 12.

Figure 9:
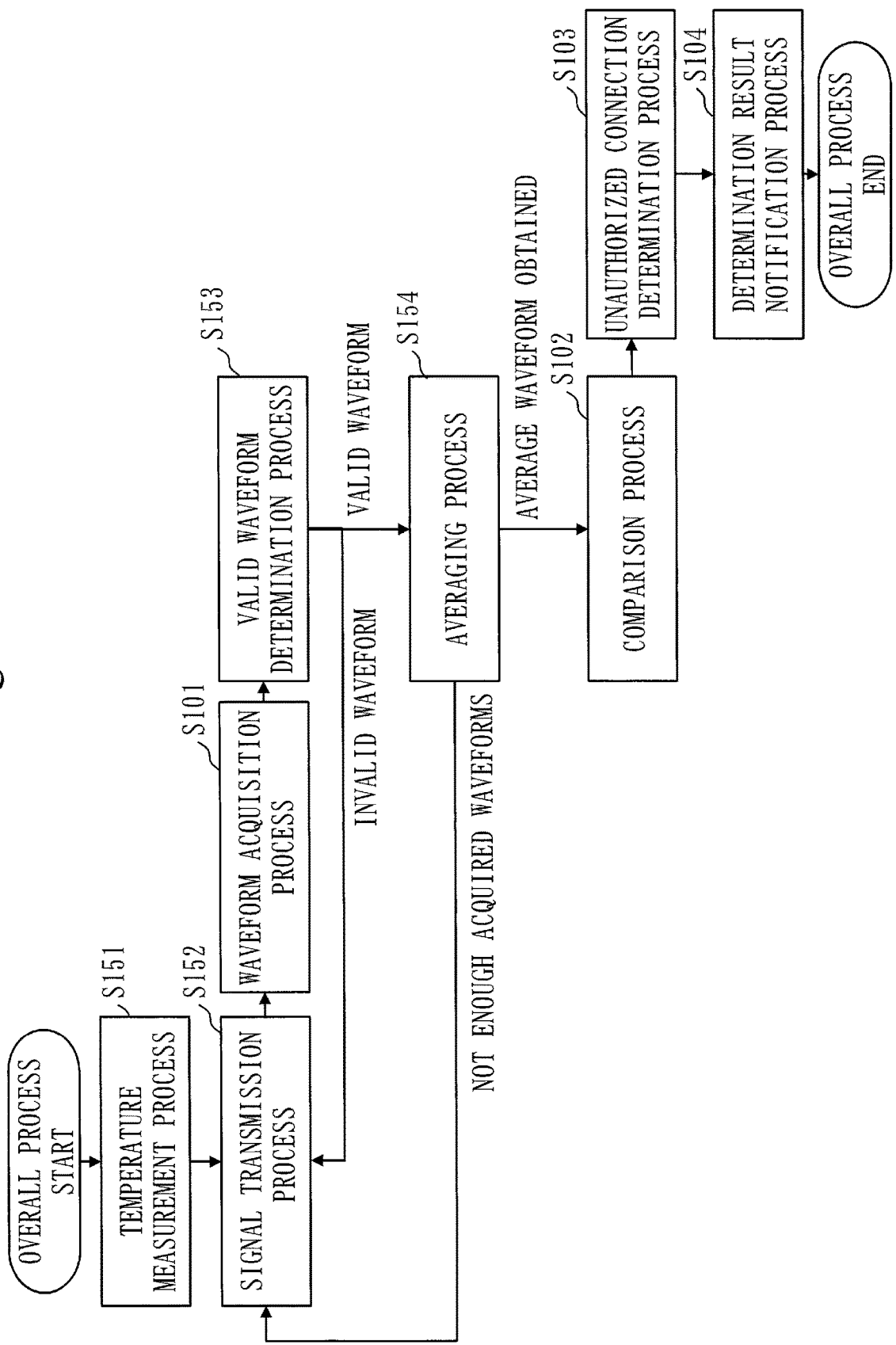
FIG. 9 is a flowchart illustrating an overall process of the unauthorized connection detection apparatus according to Embodiment 2.
Figure 10:
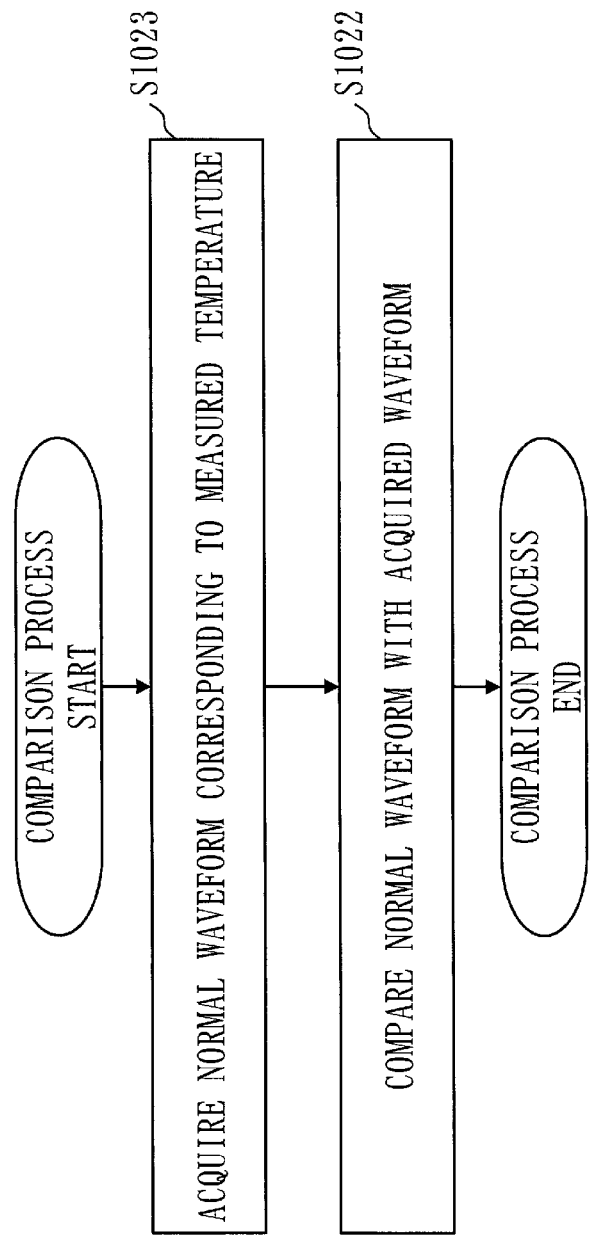
FIG. 10 is a flowchart illustrating a comparison process of the unauthorized connection detection apparatus according to Embodiment 2.
Figure 11:
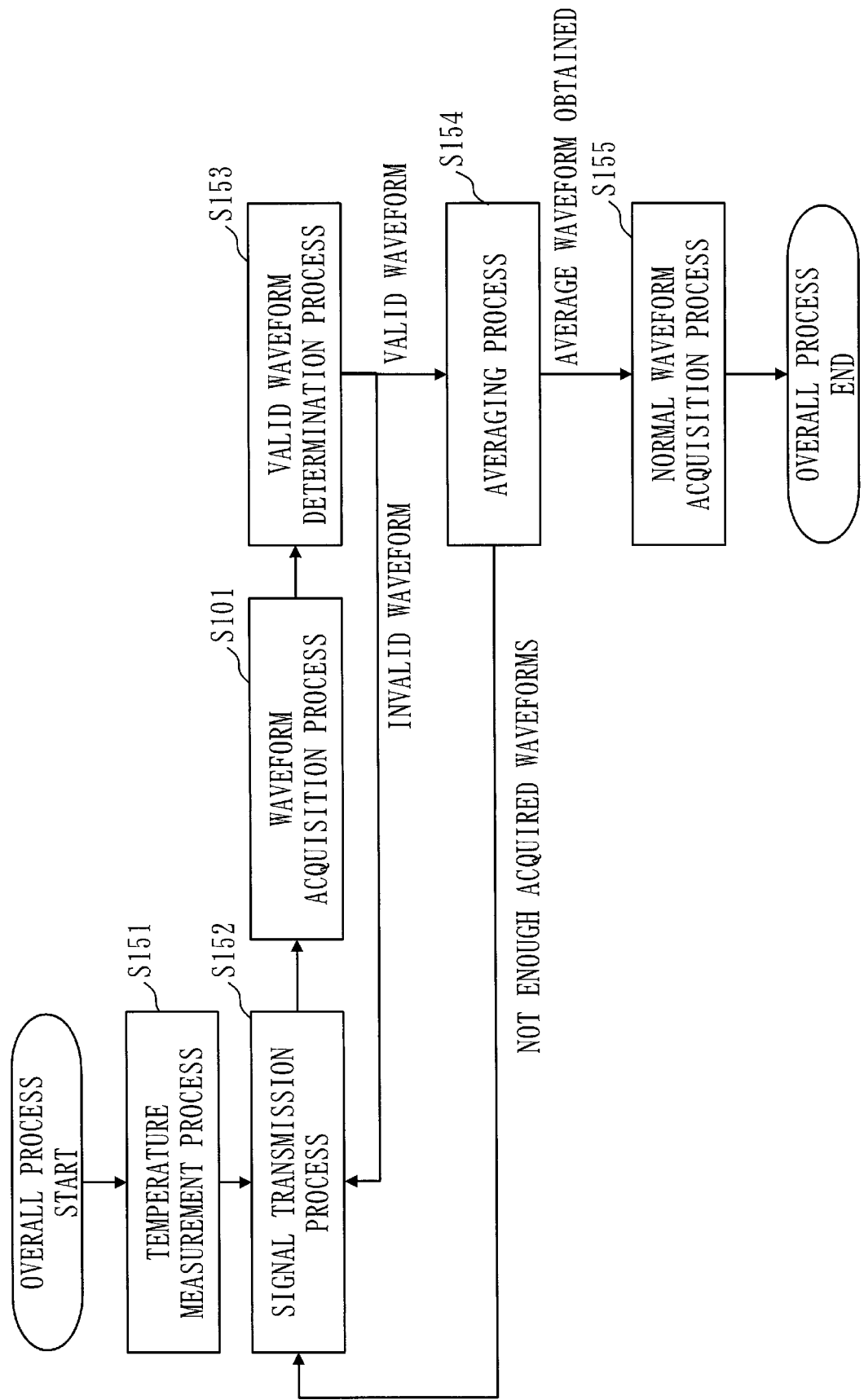
FIG. 11 is a flowchart illustrating an overall process including a normal waveform acquisition process of the unauthorized connection detection apparatus according to Embodiment 2.
Figure 12:
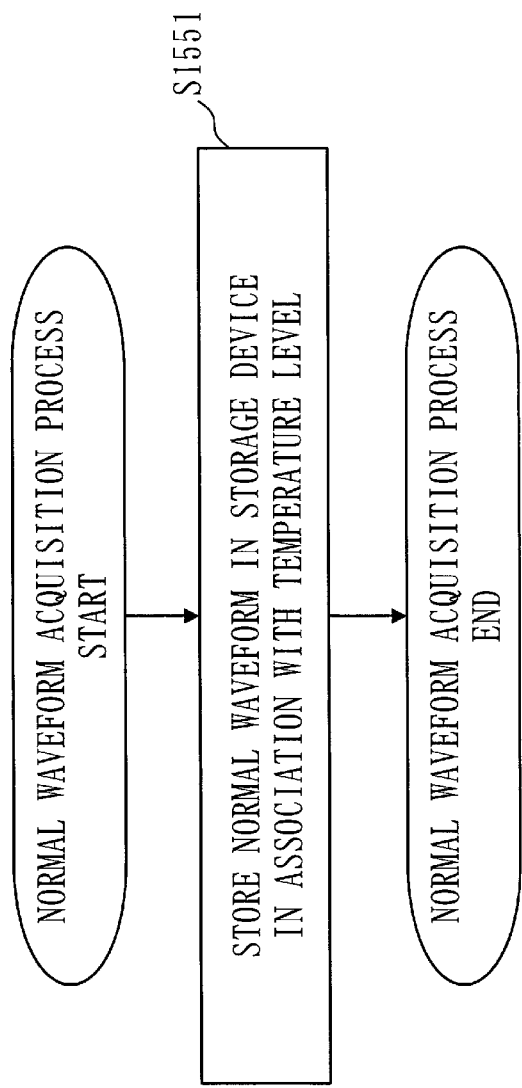
FIG. 12 is a flowchart illustrating the normal waveform acquisition process of the unauthorized connection detection apparatus according to Embodiment 2.

In FIG. 11, steps S151 to S154 are the same as those illustrated in FIG. 9, and thus description will be omitted.

If the average waveform is obtained in step S154, the normal waveform acquisition unit 129 performs the normal waveform acquisition process (step S155).

Details of the normal waveform acquisition process will be described with reference to FIG. 12.

The normal waveform acquisition unit 129 stores the average waveform obtained by the averaging processing unit 131 in the storage device 2 in association with a temperature level of the temperature measured by the temperature measurement unit 130 (step S1551).

Description of Effects of Embodiment

According to this embodiment, the unauthorized connection detection apparatus 1 can detect connection of an unauthorized device with higher accuracy in comparison with Embodiment 1.

Embodiment 3

In this embodiment, differences from Embodiment 1 will be mainly described. Matters not described below are the same as in Embodiment 1.

Figure 14:
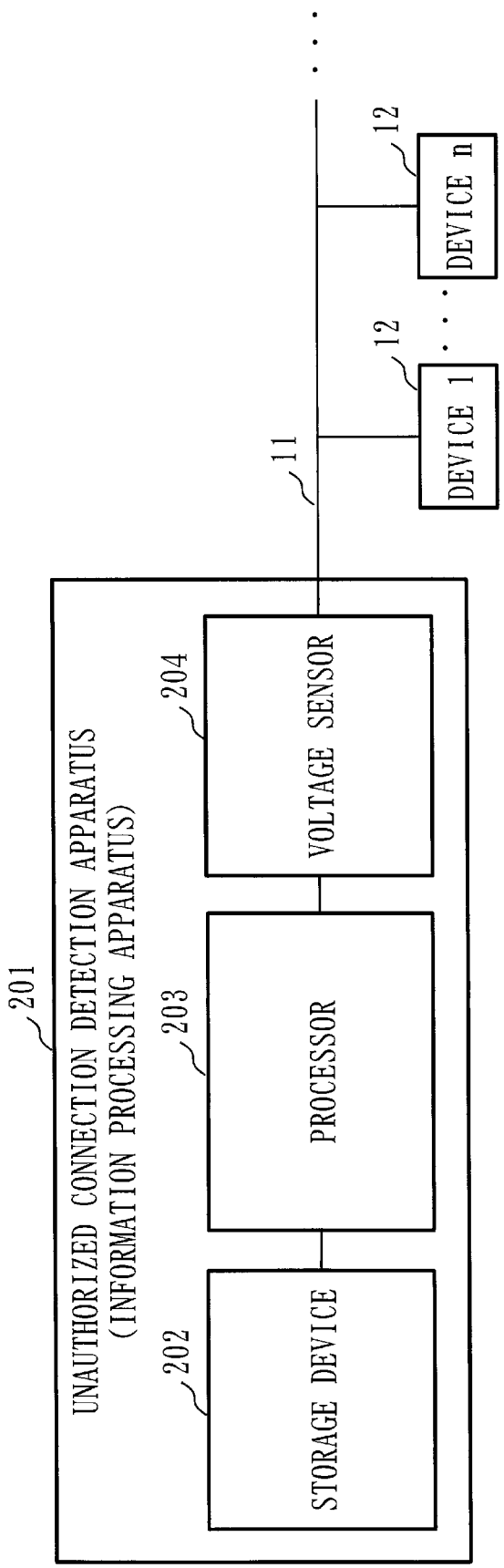
FIG. 14 is a diagram illustrating an example of the hardware configuration of an unauthorized connection detection apparatus according to Embodiment 3.

FIG. 14 illustrates an example of the hardware configuration of an unauthorized connection detection apparatus 201 according to this embodiment. The unauthorized connection detection apparatus 201 corresponds to the information processing apparatus. Processes performed in the unauthorized connection detection apparatus 201 correspond to the information processing method and the information processing program.

The unauthorized connection detection apparatus 201 is connected to a bus line 11.

The bus line 11 is the same as that described in Embodiment 1.

An n number of devices 12 connected to the bus line 11 are also the same as those described in Embodiment 1.

The unauthorized connection detection apparatus 201 is a computer, and includes a storage device 202, a processor 203, and a voltage sensor 204, as hardware.

The storage device 202 is the same as the storage device 2 illustrated in FIG. 1. The processor 203 is the same as the processor 3 illustrated in FIG. 1. The voltage sensor 204 is the same as the voltage sensor 4 illustrated in FIG. 1.

Figure 15:
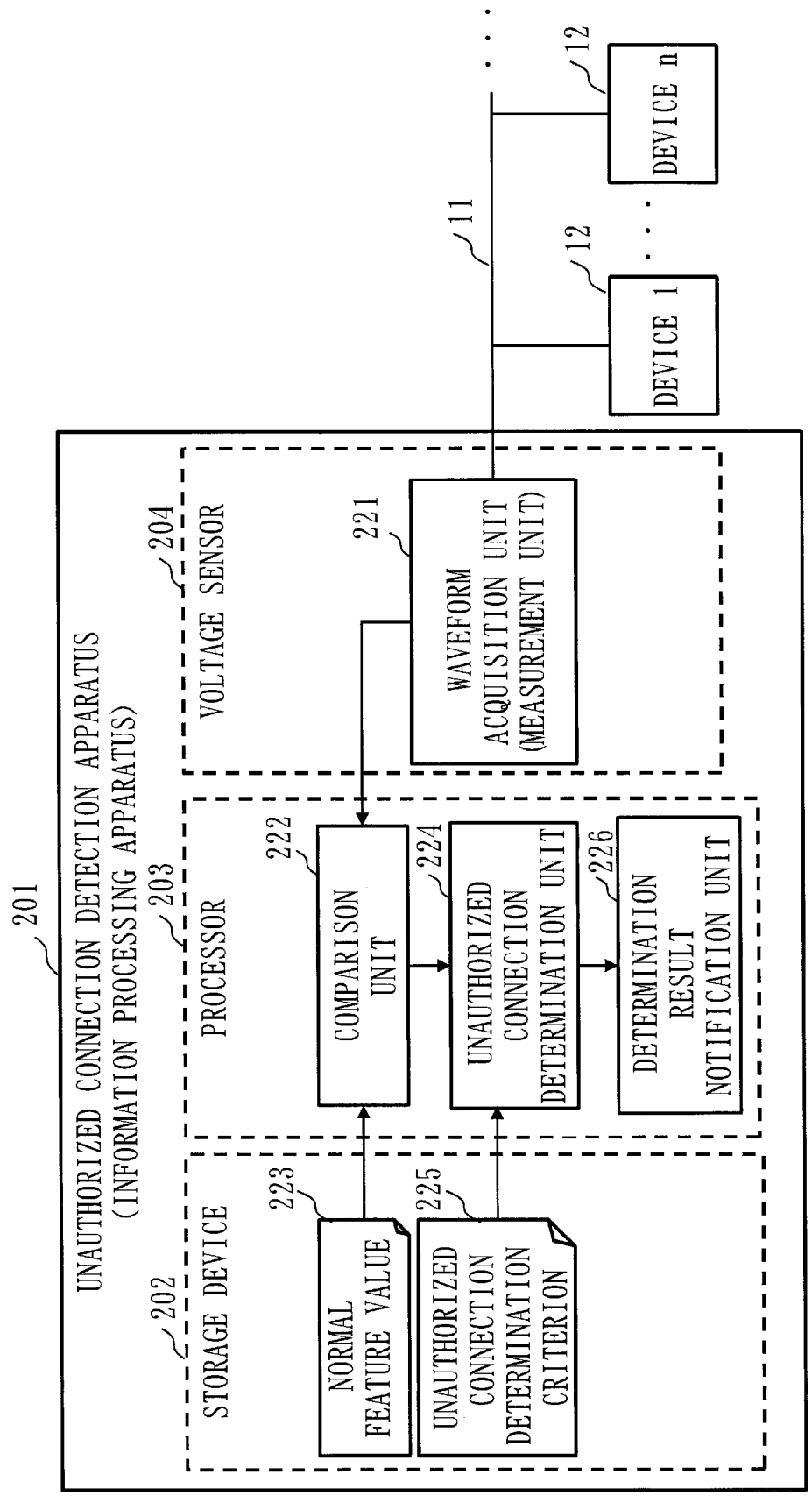
FIG. 15 is a diagram illustrating an example of the functional configuration of the unauthorized connection detection apparatus according to Embodiment 3.

FIG. 15 illustrates an example of the functional configuration of the unauthorized connection detection apparatus 201 according to this embodiment.

The unauthorized connection detection apparatus 201 is composed of a waveform acquisition unit 221, a comparison unit 222, an unauthorized connection determination unit 224, and a determination result notification unit 226. The waveform acquisition unit 221 is realized by the voltage sensor 204. The comparison unit 222, the unauthorized connection determination unit 224, and the determination result notification unit 226 are realized by programs, and the processor 203 executes these programs.

The waveform acquisition unit 221 measures a voltage value of the bus line 11. The waveform acquisition unit 221 outputs a waveform representing changes over time in voltage values of the bus line 11 to the comparison unit 222 as an acquired waveform.

The waveform acquisition unit 221 corresponds to the measurement unit.

The comparison unit 222 acquires a normal feature value 223 from the storage device 2. The comparison unit 222 calculates a feature value from the acquired waveform output by the waveform acquisition unit 221. Then, the comparison unit 222 compares the calculated feature value of the acquired waveform with the normal feature value 223. Further, the comparison unit 222 outputs the comparison result to the unauthorized connection determination unit 224.

The normal feature value 223 is a feature value calculated from a waveform representing changes over time in voltage values of the bus line 11 in a normal state. The term "normal" refers to a state in which only the n number of authorized devices 12 are connected to the bus line 11.

A method for calculating the feature value will be described later.

The operation performed by the comparison unit 222 corresponds to the comparison process.

The unauthorized connection determination unit 224 acquires an unauthorized connection determination criterion 225. The unauthorized connection determination criterion 225 indicates a threshold value for the difference between the normal feature value 223 and the feature value of the acquired waveform. The unauthorized connection determination unit 224 compares the comparison result output from the comparison unit 222 with the unauthorized connection determination criterion 225. If the difference between the feature value of the acquired waveform and the normal feature value 223 indicated in the comparison result is within the unauthorized connection determination criterion 225, the unauthorized connection determination unit 224 determines that an unauthorized device is not connected to the bus line 11. On the other hand, if the difference between the feature value of the acquired waveform and the normal feature value 223 indicated in the comparison result exceeds the unauthorized connection determination criterion 225, the unauthorized connection determination unit 224 determines that an unauthorized device is connected to the bus line 11.

In this way, the unauthorized connection determination unit 224 evaluates the difference between the feature value of the acquired waveform calculated by the comparison unit 222 and the normal feature value 223 to determine whether an unauthorized device is connected to the bus line 11.

The unauthorized connection determination unit 224 outputs the determination result on the presence or absence of connection of an unauthorized device to the determination result notification unit 226.

The operation performed by the unauthorized connection determination unit 224 corresponds to the unauthorized connection determination process.

The determination result notification unit 226 notifies the user of the unauthorized connection detection apparatus 201 of the determination result of the unauthorized connection determination unit 224. For example, upon obtaining the determination result indicating that an unauthorized device is connected to the bus line 11, the determination result notification unit 226 issues an alarm.

\*\*\*Description of Operation\*\*\*

The operational flow of the unauthorized connection detection apparatus 201 according to this embodiment will be described with reference to FIGS. 18, 19, 20, and 21.

When the unauthorized connection detection apparatus 201 receives an instruction for execution from the user, the waveform acquisition unit 221 starts a waveform acquisition process (step S201).

Figure 19:
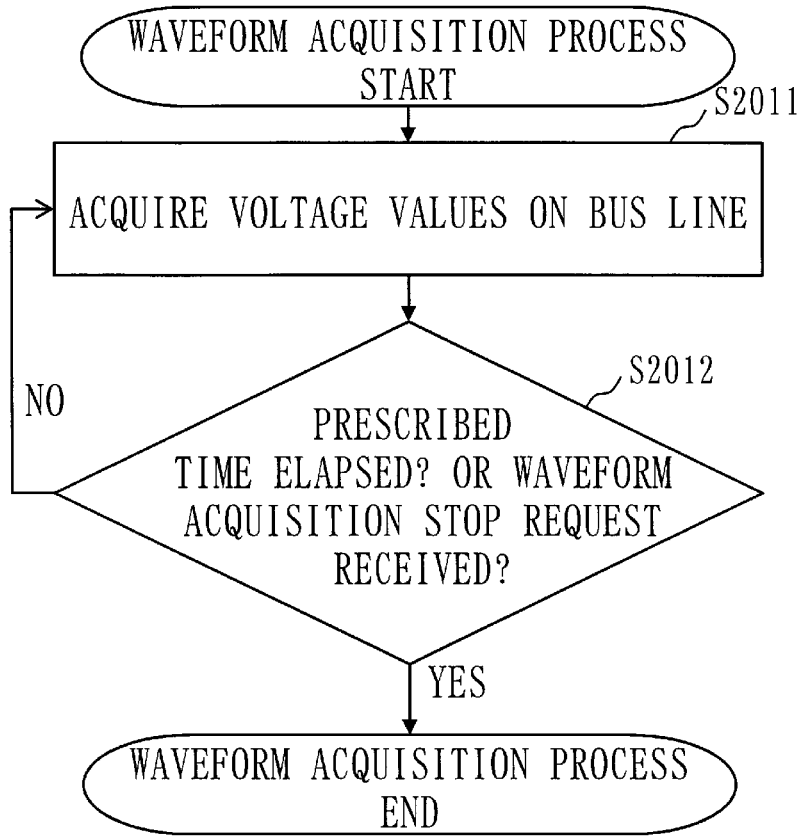
FIG. 19 is a flowchart illustrating a waveform acquisition process of the unauthorized connection detection apparatus according to Embodiment 3.

Details of the waveform acquisition process will be described with reference to FIG. 19.

In the waveform acquisition process, the waveform acquisition unit 221 repeatedly acquires voltage values of the bus line 11 until a prescribed time elapses or until a waveform acquisition stop request is received (steps S2011, 2012).

Upon completion of the waveform acquisition process by the waveform acquisition unit 221, the comparison unit 222 starts a comparison process (step S202).

Figure 20:
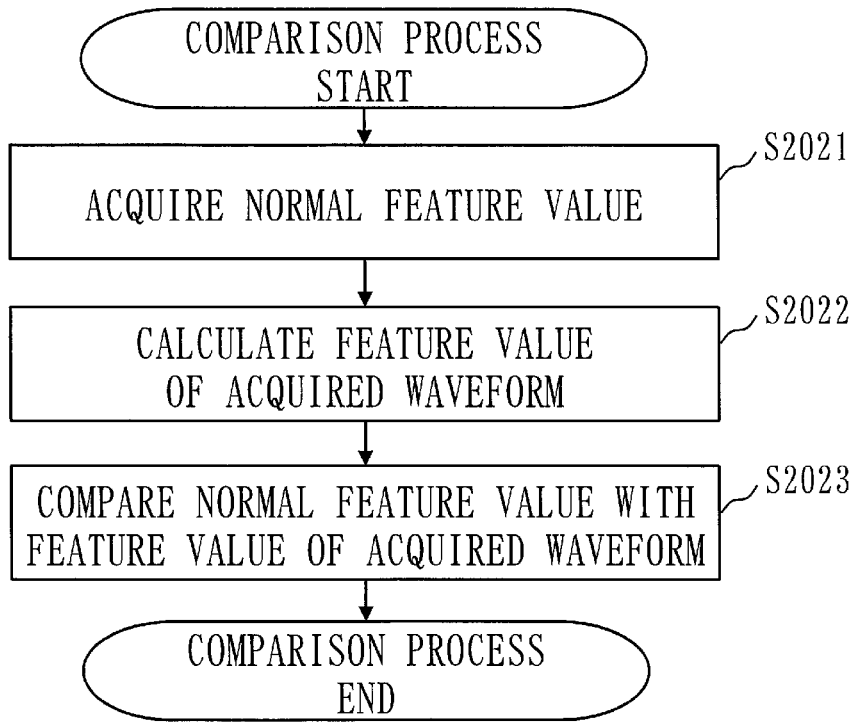
FIG. 20 is a flowchart illustrating a comparison process of the unauthorized connection detection apparatus according to Embodiment 3.
Figure 21:
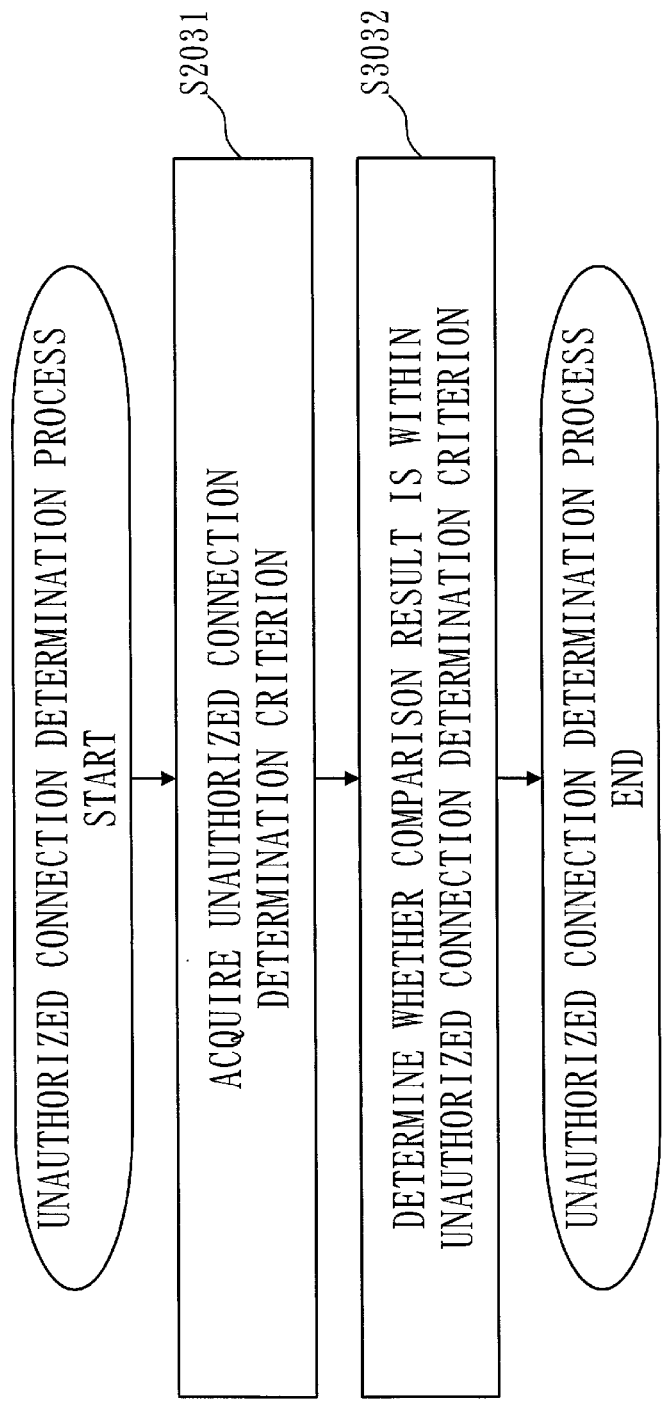
FIG. 21 is a flowchart illustrating an unauthorized connection determination process of the unauthorized connection detection apparatus according to Embodiment 3.

Details of the comparison process will be described with reference to FIG. 20.

In the comparison process, the comparison unit 222 first acquires the normal feature value 223 from the storage device 2 (step S2021).

Next, the comparison unit 222 calculates a feature value from the acquired waveform obtained by the waveform acquisition unit 221 (step S2022). For example, the comparison unit 222 calculates the feature value of the acquired waveform, using the singular value decomposition (SVD) or the like. Then, the comparison unit 222 compares the normal feature value 223 with the feature value of the acquired waveform (step S2023).

Upon completion of the comparison process by the comparison unit 222, the unauthorized connection determination unit 224 starts an unauthorized connection determination process (step S203).

Details of the unauthorized connection determination process will be described with reference to FIG. 20.

In the unauthorized connection determination process, the unauthorized connection determination unit 224 acquires the unauthorized connection determination criterion 225 from the storage device 2 (step S2031). Then, the unauthorized connection determination unit 224 determines whether the difference between the normal feature value 223 and the feature value of the acquired waveform indicated in the comparison result of the comparison unit 222 is within the unauthorized connection determination criterion 225 (step S2032).

If the difference between the normal feature value 223 and the feature value of the acquired waveform is within the unauthorized connection determination criterion 225, the unauthorized connection determination unit 224 determines that an unauthorized device is not connected to the bus line 11. On the other hand, if the difference between the normal feature value 223 and the feature value of the acquired waveform exceeds the unauthorized connection determination criterion 225, the unauthorized connection determination unit 224 determines that an unauthorized device is connected to the bus line 11.

Upon completion of the unauthorized connection determination process by the unauthorized connection determination unit 224, the determination result notification unit 226 notifies the user of unauthorized connection detection apparatus 201 or notifies an external device of the determination result of the unauthorized connection determination unit 224 (step S204).

Description of Effects of Embodiment

In this embodiment, the unauthorized connection detection apparatus 201 determines whether an unauthorized device is connected to the bus line 11, using the feature values. Therefore, according to this embodiment, it is possible to determine whether an unauthorized device is connected to the bus line 11 with less calculation load in comparison with Embodiment 1.

Embodiment 4

In this embodiment, differences from Embodiment 3 will be mainly described. Matters not described below are the same as in Embodiment 3.

Figure 16:
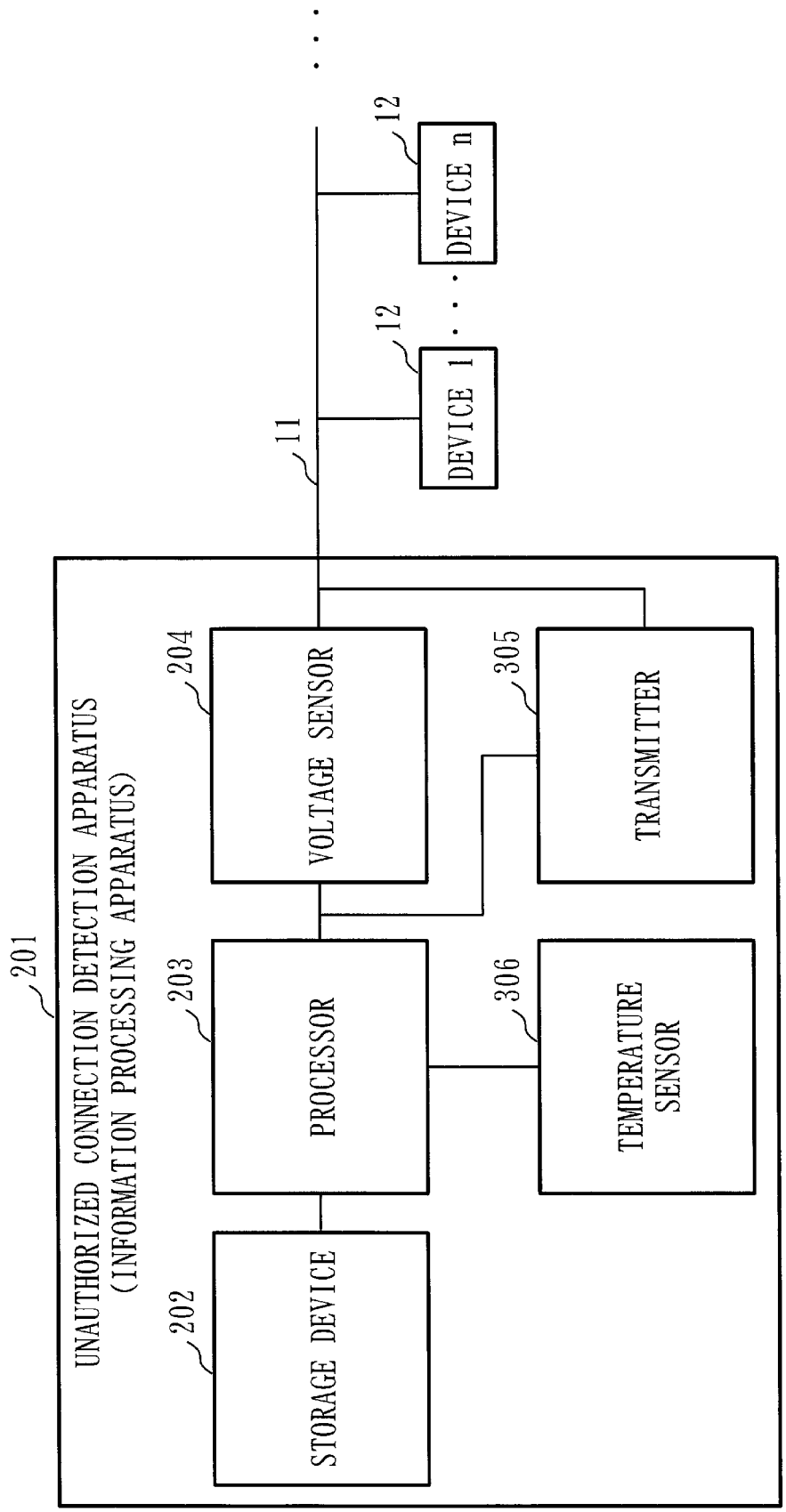
FIG. 16 is a diagram illustrating an example of the hardware configuration of an unauthorized connection detection apparatus according to Embodiment 4.

FIG. 16 illustrates an example of the hardware configuration of an unauthorized connection detection apparatus 201 according to this embodiment.

In FIG. 16, a transmitter 305 and a temperature sensor 306 are added in comparison with FIG. 14. Elements other than the transmitter 305 and the temperature sensor 306 are the same as those illustrated in FIG. 14, and thus description will be omitted.

The transmitter 305 transmits a signal to the bus line 11 in accordance with an instruction from the processor 203.

The temperature sensor 306 measures a temperature around the bus line 11.

Figure 17:
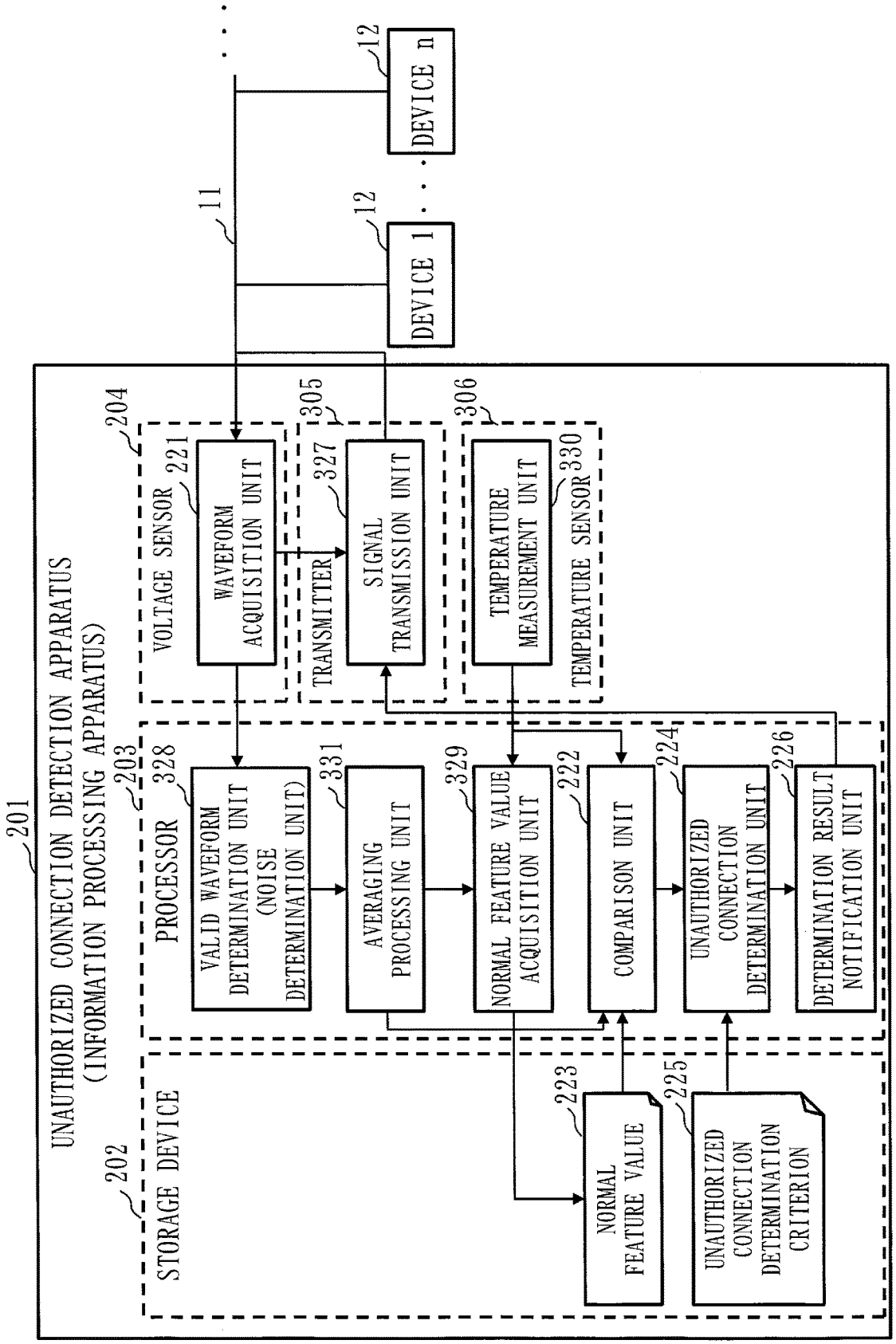
FIG. 17 is a diagram illustrating an example of the functional configuration of the unauthorized connection detection apparatus according to Embodiment 4.
Figure 18:
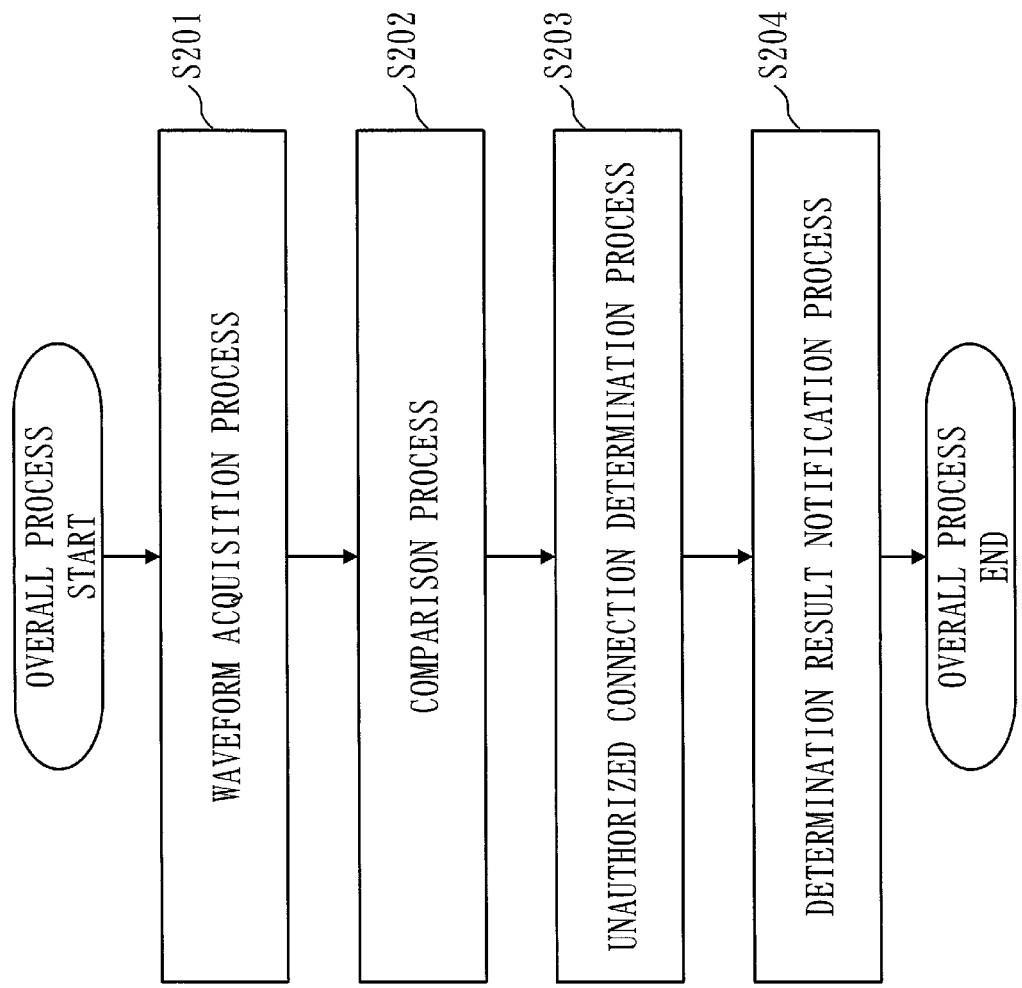
FIG. 18 is a flowchart illustrating an overall process of the unauthorized connection detection apparatus according to Embodiment 3.

FIG. 17 illustrates an example of the functional configuration of the unauthorized connection detection apparatus 201 according to this embodiment.

In FIG. 17, a signal transmission unit 327, a valid waveform determination unit 328, a normal feature value acquisition unit 329, a temperature measurement unit 330, and an averaging processing unit 331 are added in comparison with FIG. 15.

Elements other than the signal transmission unit 327, the valid waveform determination unit 328, the normal feature value acquisition unit 329, the temperature measurement unit 330, and the averaging processing unit 331 are the same as those illustrated in FIG. 15, and thus description will be omitted.

The signal transmission unit 327 is realized by the transmitter 305 illustrated in FIG. 16. The temperature measurement unit 330 is realized by the temperature sensor 306 illustrated in FIG. 16. The valid waveform determination unit 328, the normal feature value acquisition unit 329, and the averaging processing unit 331 are realized by programs, and these programs are executed by the processor 203.

The signal transmission unit 327 transmits a high-frequency step electrical signal or a pulse electrical signal to the bus line 11. In this embodiment, the waveform acquisition unit 221 observes the reflection characteristics of high-frequency step electrical signals or pulse electrical signals transmitted by the signal transmission unit 127 so as to measure changes over time in voltage values of the bus line 11.

The waveform acquisition unit 221 can accurately set the start timing and the end timing for acquiring a waveform, so that memory saving and an increase in processing speed can be expected.

In this embodiment, the determination result notification unit 226 may cause the signal transmission unit 327 to transmit a high-frequency step electrical signal or a pulse electrical signal to the bus line 11 to notify the bus line 11 of a determination result.

The valid waveform determination unit 328 determines whether an acquired waveform acquired by the waveform acquisition unit 221 is a valid waveform suitable for determination by the unauthorized connection determination unit 224. For example, the valid waveform determination unit 328 determines whether impulse noise is included in the acquired waveform. Then, only when impulse noise is not included in the acquired waveform, the valid waveform determination unit 328 outputs the acquired waveform to the averaging processing unit 331. The valid waveform determination unit 328 excludes acquired waveforms including impulse noise, so that the influence of impulse noise can be reduced in the unauthorized connection determination process, and connection of an unauthorized device can be detected with accuracy.

The valid waveform determination unit 328 corresponds to the noise determination unit.

The normal feature value acquisition unit 329 calculates a feature value from an acquired waveform obtained by the waveform acquisition unit 221 in a normal state and determined to be a valid waveform by the valid waveform determination unit 328, and stores the calculated feature value in the storage device 2 as the normal feature value 223. As described above, the term "normal" refers to a state in which only the n number of authorized devices 12 are connected to the bus line 11. The normal feature value acquisition unit 329 acquires the normal feature value 223, so that connection of an unauthorized device can be detected with high accuracy.

Note that the normal feature value acquisition unit 329 may store the feature value obtained from an acquired waveform after the averaging process by the averaging processing unit 331 to be described later in the storage device 2 as the normal feature value 223, or may store the feature value obtained from an acquired waveform without the averaging process by the averaging processing unit 331 in the storage device 2 as the normal feature value 223. FIG. 17 illustrates an example in which the normal feature value acquisition unit 329 stores the feature value obtained from an acquired waveform after the averaging process by the averaging processing unit 331 in the storage device 2 as the normal feature value 223.

The temperature measurement unit 330 measures a temperature around the bus line 11, and outputs the measurement result to the comparison unit 222. The temperature measurement unit 330 outputs the measurement result also to the normal feature value acquisition unit 329. The normal feature value acquisition unit 329 stores the normal feature value 223 in the storage device 2 in association with a temperature level of the temperature measured by the temperature measurement unit 330 at the time of acquisition of the normal feature value 223 concerned. As a result, the storage device 2 stores a plurality of the normal feature values 223 in association with a plurality of temperature levels. The comparison unit 222 selects the normal feature value 223 associated with the temperature level corresponding to the temperature at acquisition of the acquired waveform by the waveform acquisition unit 221. Then, the comparison unit 222 acquires the selected normal feature value 223 from the storage device 2. Therefore, the unauthorized connection determination unit 224 can detect connection of an unauthorized device with accuracy, depending on the temperature around the bus line 11.

The averaging processing unit 331 performs the averaging process to average acquired waveforms. That is, the averaging processing unit 331 calculates the average waveform based on a plurality of acquired waveforms acquired by the waveform acquisition unit 221 and determined to be valid by the valid waveform determination unit 328. For example, the averaging processing unit 331 obtains the average waveform by superimposing the plurality of acquired waveforms on one another. The averaging processing unit 331 outputs the average waveform to the comparison unit 222. The comparison unit 222 compares a feature value obtained from the average waveform obtained by the averaging processing unit 331 with the normal feature value 223. By this arrangement, the unauthorized connection determination unit 224 can reduce the influence of noise on the voltages of the bus line 11, and can detect connection of an unauthorized device with accuracy.

The averaging processing unit 331 also outputs the average waveform to the normal feature value acquisition unit 329. As described above, the normal feature value acquisition unit 329 stores the feature value calculated from the average waveform in the storage device 2 as the normal feature value 223.

\*\*\*Description of Operation\*\*\*

The operational flow of the unauthorized connection detection apparatus 201 according to this embodiment will be described with reference to FIGS. 22 and 23.

First, the temperature measurement unit 330 performs a temperature measurement process (step S251). That is, the temperature measurement unit 330 measures a temperature around the bus line 11. The temperature measurement unit 330 notifies the comparison unit 222 of the measured temperature.

Next, the signal transmission unit 327 performs a signal transmission process (step S252). That is, the signal transmission unit 327 transmits a high-frequency step electrical signal or a pulse electrical signal to the bus line 11.

Next, the waveform acquisition unit 221 performs a waveform acquisition process (step S201). Details of the waveform acquisition process are as described in Embodiment 3.

Next, the valid waveform determination unit 328 performs a valid waveform determination process (step S253). That is, the valid waveform determination unit 328 determines whether impulse noise is included in the acquired waveform.

If the acquired waveform is a valid waveform, that is, if impulse noise is not included in the acquired waveform, step S254 is performed. The valid waveform determination unit 328 also outputs the acquired waveform which is a valid waveform to the averaging processing unit 331. If the acquired waveform is an invalid waveform, that is, if impulse noise is included in the acquired waveform, step S201 is performed again, and steps from step S252 are performed again when the configuration includes the signal transmission unit 327.

If the acquired waveform is a valid waveform, the averaging processing unit 331 performs the averaging process (step S254). That is, the averaging processing unit 331 obtains an average waveform, using a plurality of acquired waveforms.

If there are not enough acquired waveforms for averaging, step S252 is performed again. If there are enough acquired waveforms and the average waveform is obtained, step S202 is performed. If the average waveform is obtained, the averaging processing unit 331 outputs the average waveform to the comparison unit 222.

If the average waveform is obtained, the comparison unit 222 performs a comparison process (step S202).

Details of the comparison process according to this embodiment will be described with reference to FIG. 23.

In this embodiment, the comparison unit 222 first acquires the normal feature value 223 corresponding to the temperature measured by the temperature measurement unit 330 from the storage device 2 (step S2024). Then, the comparison unit 222 calculates a feature value from the acquired waveform acquired by the waveform acquisition unit 221 (step S2022). Then, the comparison unit 222 compares the normal feature value 223 with the feature value of the acquired waveform (step S2023). Details of step S2022 and S2023 are as described in Embodiment 3.

After the comparison process, an unauthorized connection determination process (step S203) and a determination result notification process (step S204) are performed. Details of the unauthorized connection determination process and the determination result notification process are as described in Embodiment 3.

Next, a normal feature value acquisition process by the normal feature value acquisition unit 329 will be described with reference to FIGS. 24 and 25.

Figure 22:
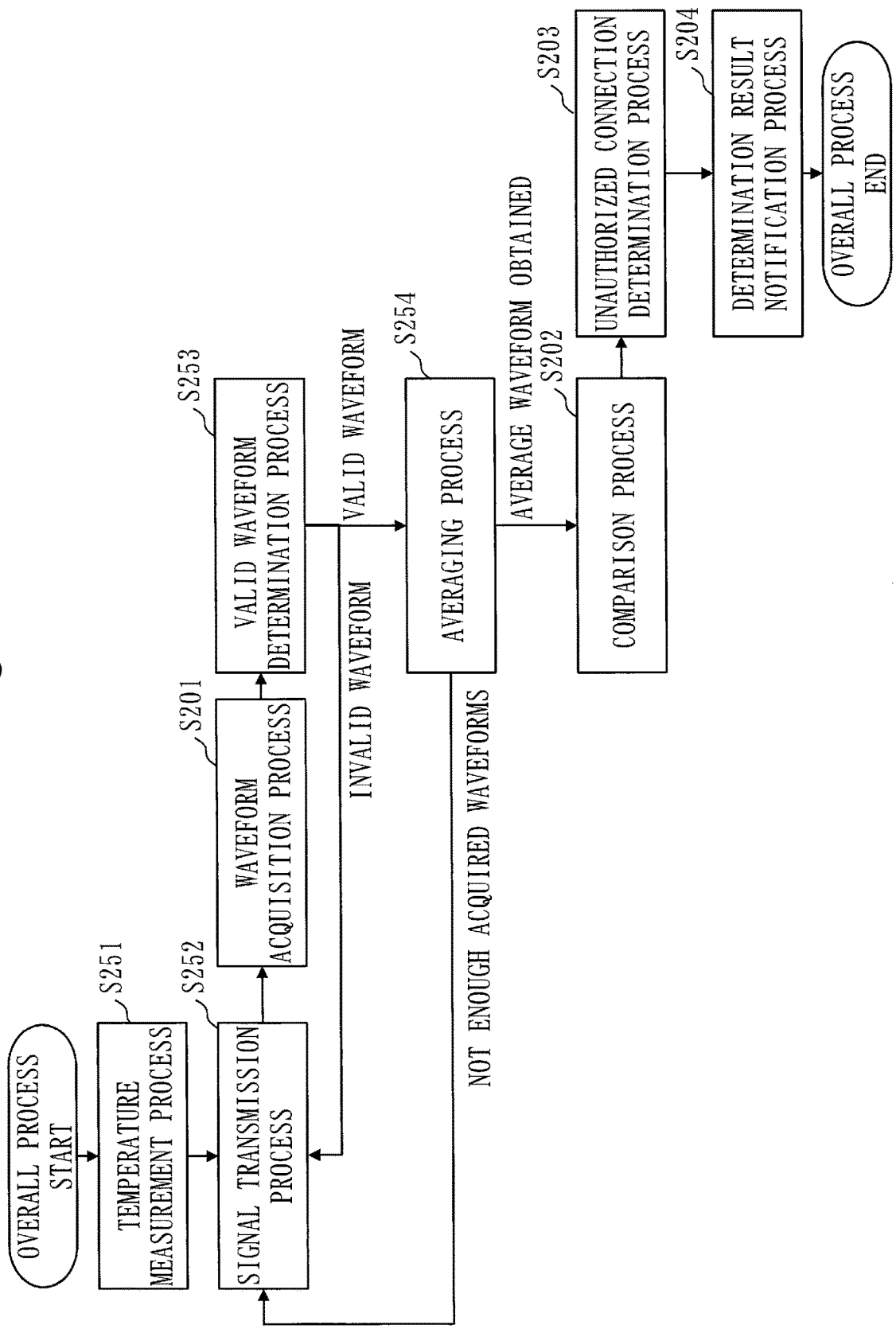
FIG. 22 is a flowchart illustrating an overall process of the unauthorized connection detection apparatus according to Embodiment 4.
Figure 23:
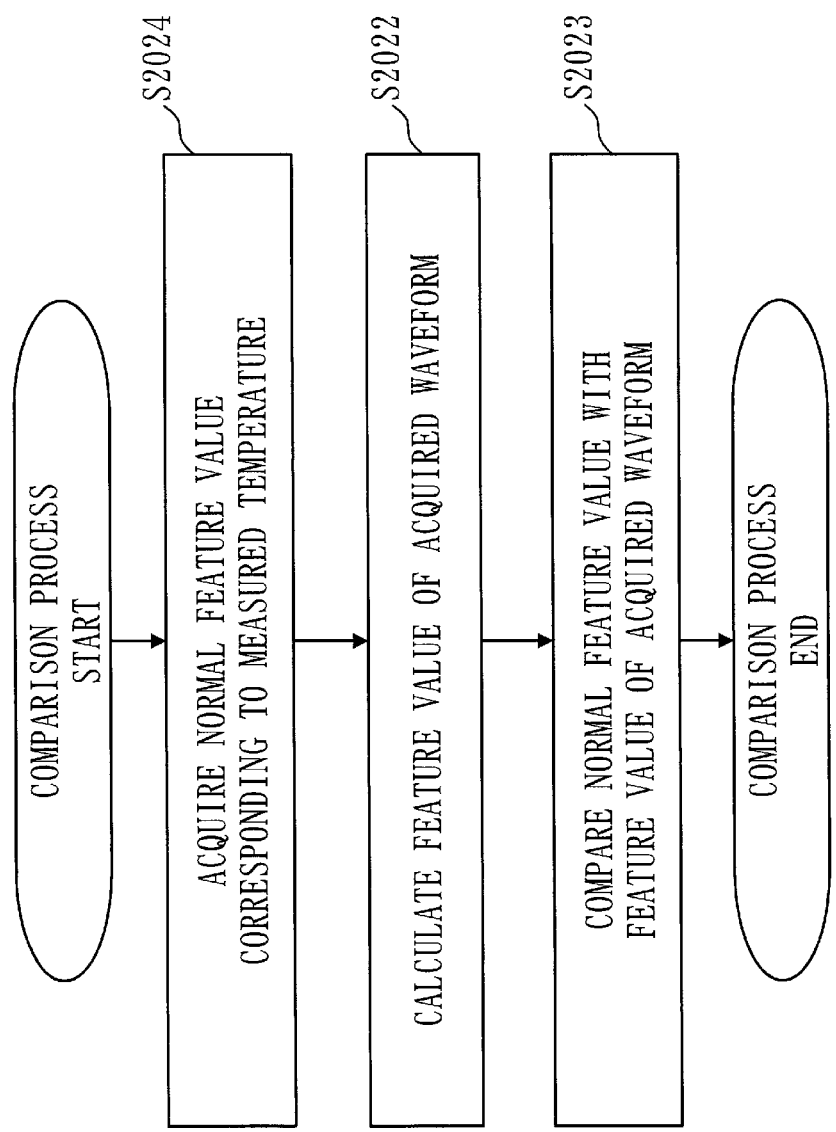
FIG. 23 is a flowchart illustrating a comparison process of the unauthorized connection detection apparatus according to Embodiment 4.
Figure 24:
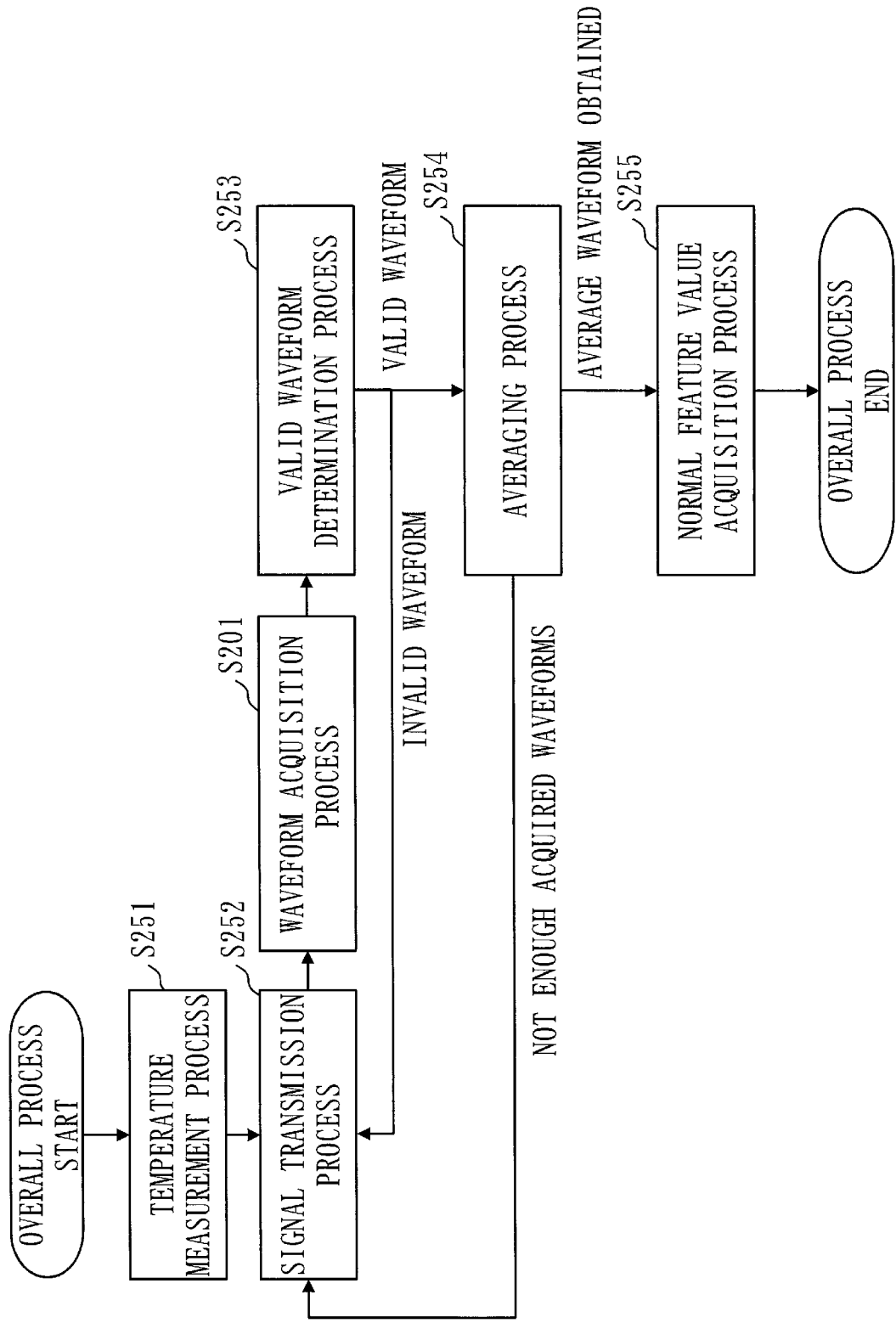
FIG. 24 is a flowchart illustrating an overall process including a normal feature value acquisition process of the unauthorized connection detection apparatus according to Embodiment 4.
Figure 25:
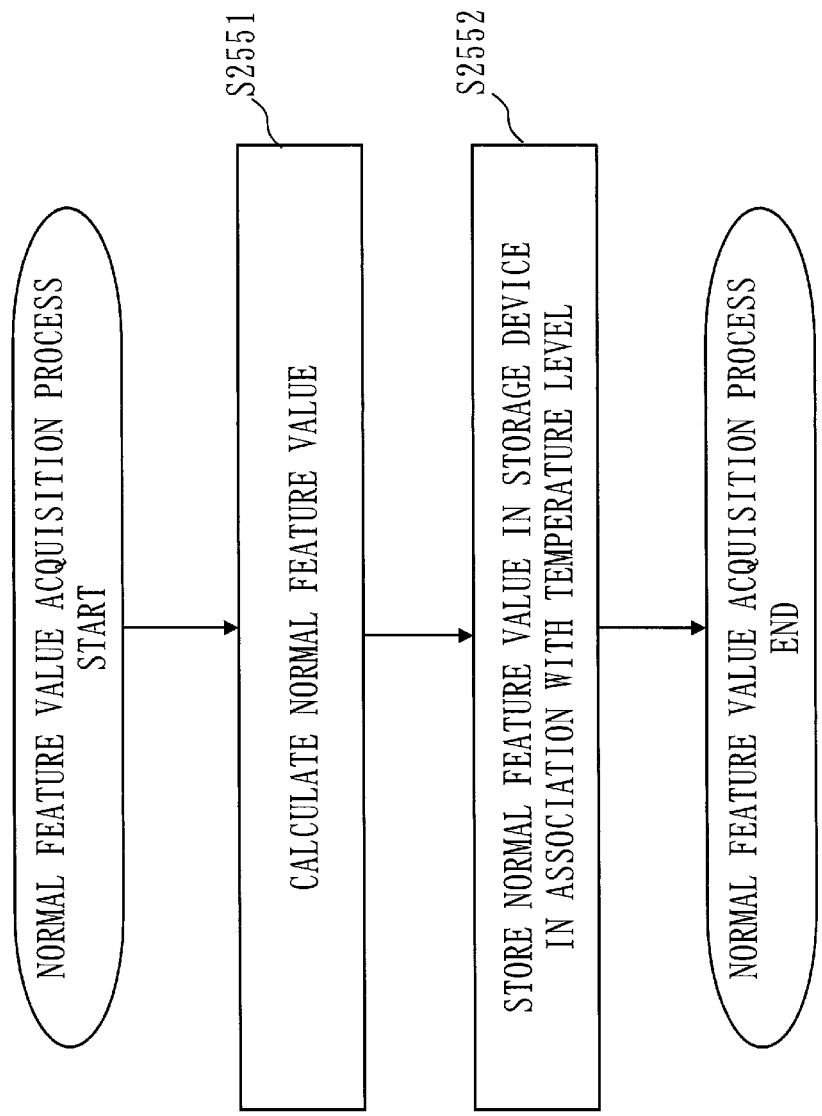
FIG. 25 is a flowchart illustrating the normal feature value acquisition process of the unauthorized connection detection apparatus according to Embodiment 4.

In FIG. 24, steps S251 to S254 are the same as those illustrated in FIG. 22, and thus description will be omitted.

If the average waveform is obtained in step S254, the normal feature value acquisition unit 329 performs the normal feature value acquisition process (step S255).

Details of the normal feature value acquisition process will be described with reference to FIG. 25.

The normal feature value acquisition unit 329 calculates the normal feature value 223 from the average waveform obtained by the averaging processing unit 331 (step S2551). Then, the normal feature value acquisition unit 329 stores the calculated normal feature value 223 in the storage device 2 in association with a temperature level of the temperature measured by the temperature measurement unit 330 (step S2552).

Description of Effects of Embodiment

According to this embodiment, the unauthorized connection detection apparatus 201 can detect connection of an unauthorized device with higher accuracy in comparison with Embodiment 3.

Embodiment 5

In Embodiment 2, it has been described that the valid waveform determination unit 128 determines whether impulse noise is included in an acquired waveform.

In this embodiment, a specific determination method of the valid waveform determination unit 128 will be described.

Differences from Embodiment 2 and Embodiment 4 will be mainly described below. Matters not described below are the same as in Embodiment 2 and Embodiment 4.

\*\*\*Description of Configurations\*\*\*

Figure 26:
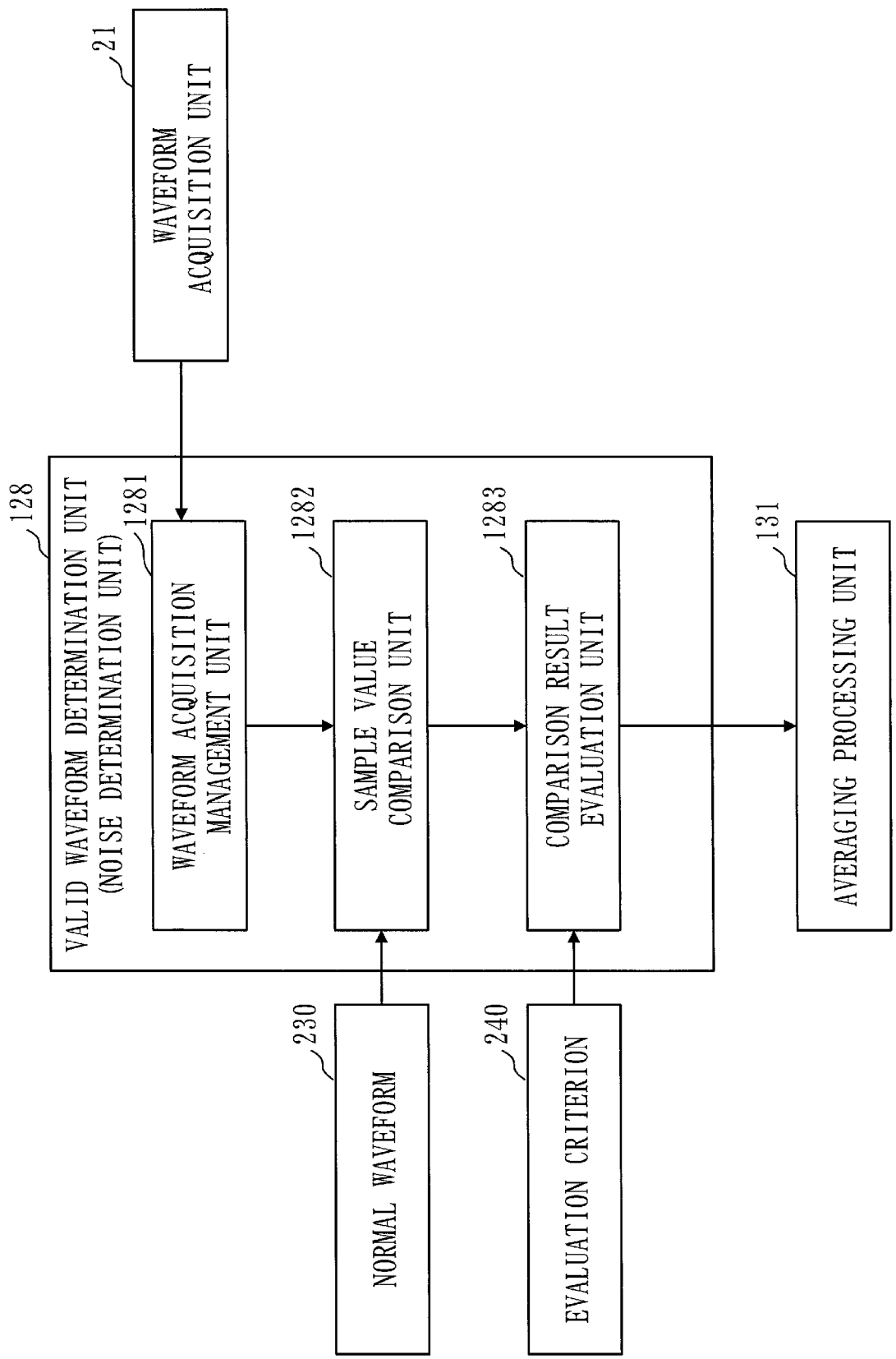
FIG. 26 is a diagram illustrating an example of the configuration of a valid waveform determination unit according to Embodiment 5.

FIG. 26 illustrates an example of the configuration of a valid waveform determination unit 128 according to this embodiment.

The functional configuration of an unauthorized connection detection apparatus 1 according to this embodiment is as illustrated in FIG. 4. The hardware configuration of the unauthorized connection detection apparatus 1 according to this embodiment is as illustrated in FIG. 3.

In this embodiment, an internal configuration of the valid waveform determination unit 128 in the unauthorized connection detection apparatus 1 will be disclosed.

Before describing details of the internal configuration of the valid waveform determination unit 128, an outline of the operation of the valid waveform determination unit 128 according to this embodiment will be described with reference to FIGS. 27 and 28.

In this embodiment, the waveform acquisition unit 21 acquires a waveform of voltage values from the bus line 11 as a measurement value candidate to be a candidate for a measurement value.

Figure 27:
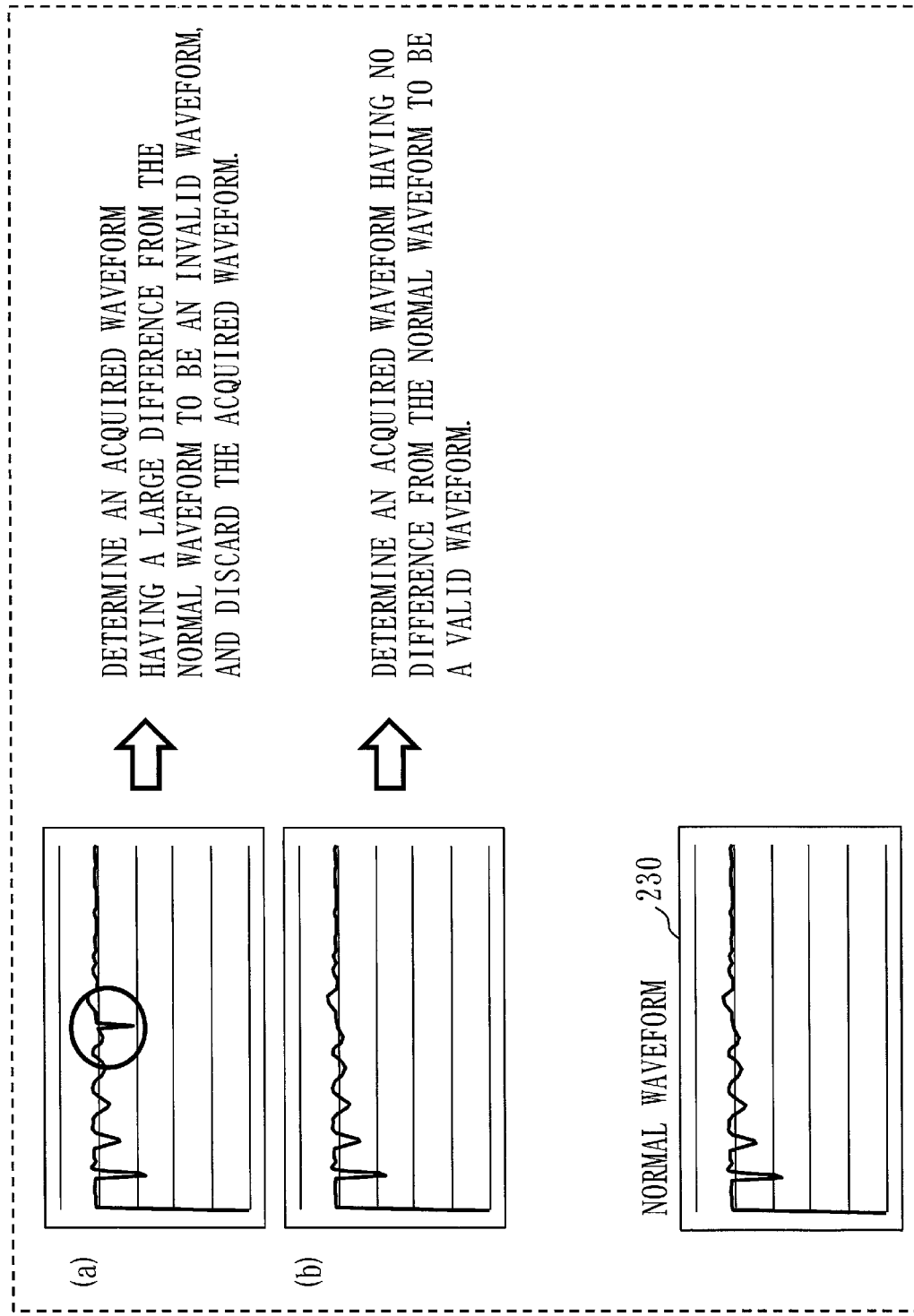
FIGS. 27A and 27B are diagrams illustrating an outline of the operation of the valid waveform determination unit according to Embodiment 5.

As illustrated in FIG. 27, each time an acquired waveform is obtained as a measurement value candidate by the waveform acquisition unit 21, the valid waveform determination unit 128 compares the acquired waveform that has been obtained with the normal waveform 230, which is a normal value. Then, if there is a large difference between the acquired waveform and the normal waveform 230 as illustrated in (a) of FIG. 27, that is, if a difference between a sample value of the acquired waveform and a sample value of the normal waveform 230 is greater than or equal to a threshold value, the valid waveform determination unit 128 determines that impulse noise is included in the acquired waveform. Then, the valid waveform determination unit 128 determines that the acquired waveform is an invalid waveform and discards the acquired waveform.

On the other hand, if there is no large difference between the acquired waveform and the normal waveform 230 as illustrated in (b) of FIG. 27, that is, if a difference between a sample value of the acquired waveform and a sample value of the normal waveform 230 is less than the threshold value, the valid waveform determination unit 128 determines that impulse noise is not included in the acquired waveform. Then, the valid waveform determination unit 128 determines that the acquired waveform is a valid waveform and outputs the acquired waveform to the averaging processing unit 131.

Note that the normal waveform 230 may be the same waveform as illustrated in FIG. 2 or may be a different waveform.

If it is determined that impulse noise is included in each of an m (m≥2) number of consecutive acquired waveforms measured by the waveform acquisition unit 21, the valid waveform determination unit 128 determines that impulse noise is not included in an acquired waveform measured by the waveform acquisition unit 21 after the m number of acquired waveforms.

Figure 28:
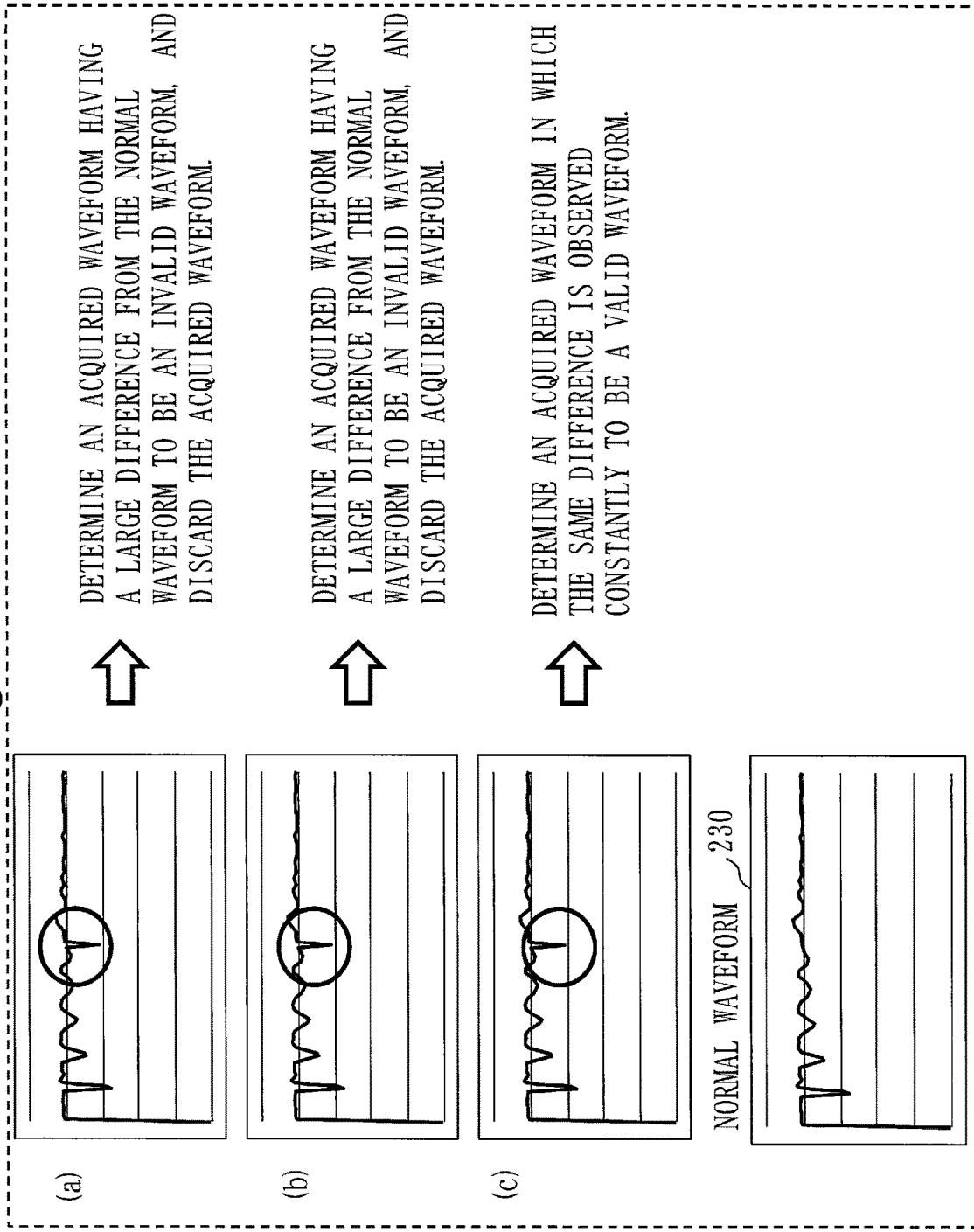
FIGS. 28A, 28B and 28C are diagrams illustrating an outline of the operation of the valid waveform determination unit according to Embodiment 5.

FIG. 28 illustrates the operation of the valid waveform determination unit 128 in the case of m=2.

As illustrated in (a) and (b) of FIG. 28, it is assumed that the valid waveform determination unit 128 determines that impulse noise is included in, for example, two consecutive acquired waveforms. Then, as illustrated in (c) of FIG. 28, it is assumed that a third acquired waveform also has a difference from the normal waveform 230 that is greater than or equal to the threshold value at the same sample point as those of the two preceding acquired waveforms. In this case, the valid waveform determination unit 128 determines that impulse noise is not included in the third acquired waveform. That is, the valid waveform determination unit 128 determines that the third acquired waveform is a valid waveform. This is because, in such a case, it is considered that the difference from the normal waveform 230 that is greater than or equal to the threshold value is not due to impulse noise, but is caused by connection of an unauthorized device to the bus line 11.

In this way, if it is determined that impulse noise is included in the acquired waveform m consecutive times, the valid waveform determination unit 128 determines that the (m+1)-th acquired waveform is a valid waveform even when the (m+1)-th acquired waveform has a difference from the normal waveform 230 that is greater than or equal to the threshold value at the same sample point as those of the m number of preceding acquired waveforms.

The internal configuration of the valid waveform determination unit 128 illustrated in FIG. 26 will now be described.

Each time an acquired waveform which is a measurement value candidate is measured, a waveform acquisition management unit 1281 acquires the acquired waveform from the waveform acquisition unit 21, and outputs the acquired waveform to a sample value comparison unit 1282.

The sample value comparison unit 1282 compares, for each sample point, a sample value of the acquired waveform with a sample value of the normal waveform 230.

A comparison result evaluation unit 1283 evaluates the result of comparison of the sample values for each sample point by the sample value comparison unit 1282.

Then, if there is a difference greater than or equal to the threshold value between the sample value of the acquired waveform and the sample value of the normal waveform 230 at any of the sample points, the comparison result evaluation unit 1283 determines that the acquired waveform is an invalid waveform, as illustrated in (a) of FIG. 27. On the other hand, if there is no difference greater than or equal to the threshold value between the sample value of the acquired waveform and the sample value of the normal waveform 230 at any of the sample points, the comparison result evaluation unit 1283 determines that the acquired waveform is a valid waveform, as illustrated in (b) of FIG. 27. Then, the comparison result evaluation unit 1283 outputs the acquired waveform determined to be a valid waveform to the averaging processing unit 131.

If the comparison result evaluation unit 1283 determines that impulse noise is included in the acquired waveform m consecutive times as illustrated in FIG. 28, the comparison result evaluation unit 1283 determines that the (m+1)-th acquired waveform is a valid waveform when the (m+1)-th acquired waveform has a difference from the normal waveform 230 that is greater than or equal to the threshold value at the same sample point as those of the m number of preceding acquired waveforms. Then, the comparison result evaluation unit 1283 outputs the acquired waveform determined to be a valid waveform to the averaging processing unit 131.

Figure 29:
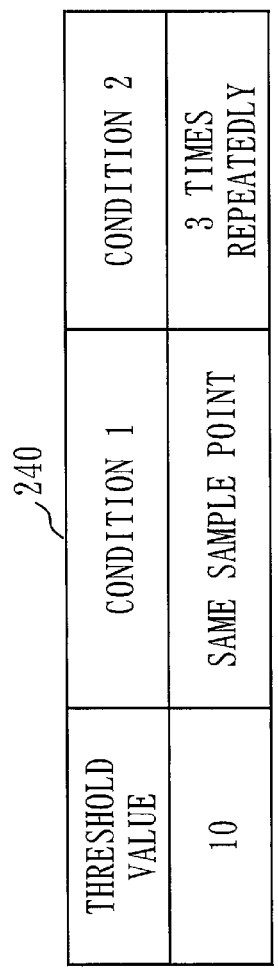
FIG. 29 is a diagram illustrating an example of an evaluation criterion according to Embodiment 5.

The comparison result evaluation unit 1283 uses an evaluation criterion 240 illustrated in FIG. 29, for example.

The evaluation criterion 240 illustrated in FIG. 29 includes a threshold value, a condition 1, and a condition 2.

The threshold value is a permissible value for the difference between the sample value of the normal waveform 230 and the sample value of the acquired waveform at the same sample point.

The condition 1 and the condition 2 are conditions for performing determination of FIG. 28. That is, if there is a difference greater than or equal to the threshold value between the acquired waveform and the normal waveform 230 at the same sample point three times repeatedly, the comparison result evaluation unit 1283 determines that the fourth acquired waveform is a valid waveform.

*Description of Operation*

Figure 30:
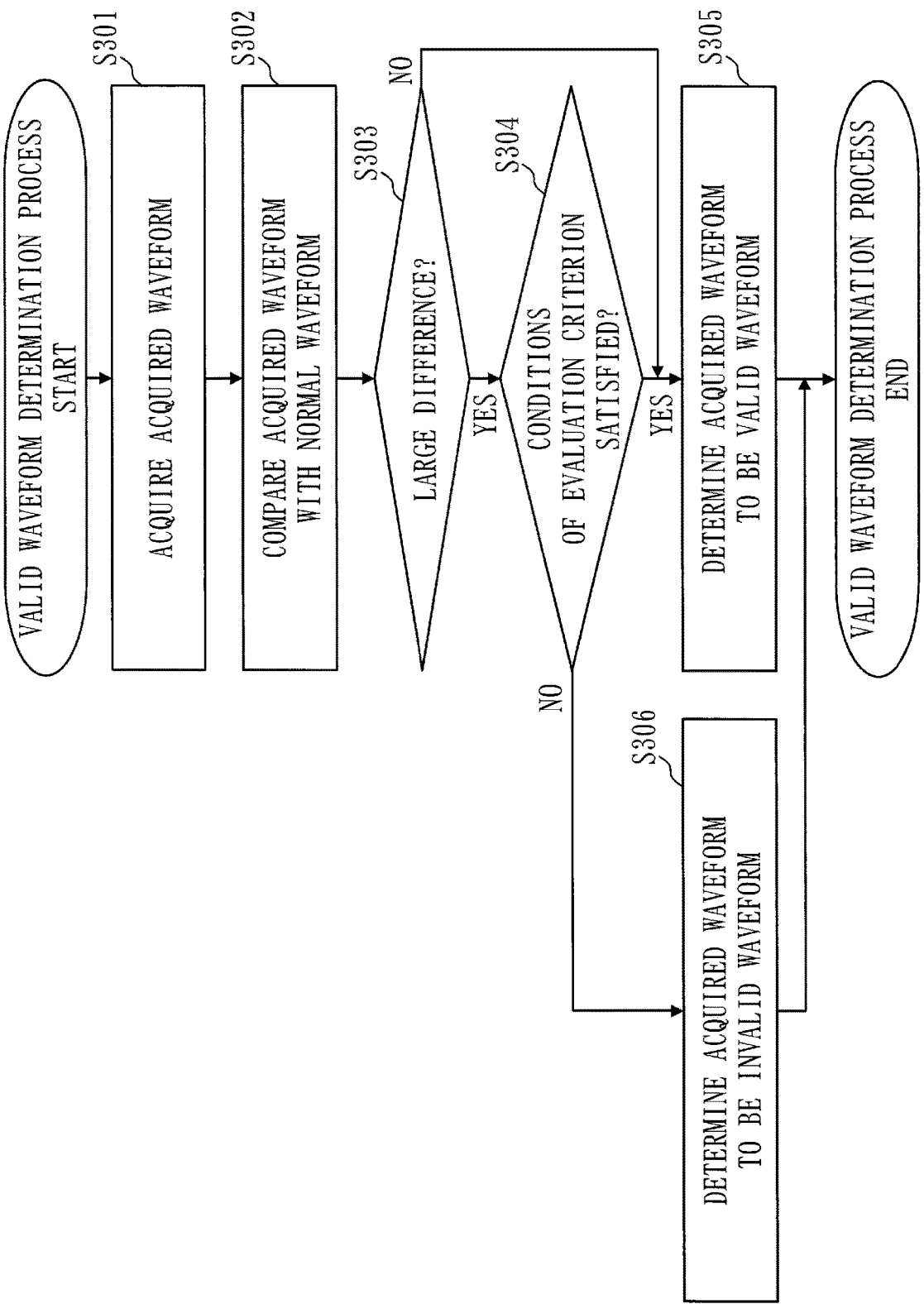
FIG. 30 is a flowchart illustrating a valid waveform determination process of an unauthorized connection detection apparatus according to Embodiment 5.

FIG. 30 illustrates an example of the operation of the valid waveform determination unit 128 according to this embodiment.

The operational flow of FIG. 30 is repeated each time an acquired waveform is input by the waveform acquisition unit 21.

First, the waveform acquisition management unit 1281 acquires the acquired waveform from the waveform acquisition unit 21 (step S301).

Then, the waveform acquisition management unit 1281 outputs the acquired waveform to the sample value comparison unit 1282.

Next, the sample value comparison unit 1282 compares, for each sample point, a sample value of the acquired waveform with a sample value of the normal waveform 230 (step S302).

The sample value comparison unit 1282 outputs the comparison result for each sample point to the comparison result evaluation unit 1283.

The comparison result evaluation unit 1283 evaluates the comparison result of the sample value comparison unit 1282, and determines whether there is a difference greater than or equal to the threshold value at any of the sample points (step S303).

If there is no difference greater than or equal to the threshold value at any of the sample points (NO in step S303), the comparison result evaluation unit 1283 determines that the acquired waveform is a valid waveform (step S305). Then, the comparison result evaluation unit 1283 outputs the acquired waveform to the averaging processing unit 131.

On the other hand, if there is a difference greater than or equal to the threshold value at any of the sample points (YES in step S303), the comparison result evaluation unit 1283 determines whether the conditions of the evaluation criterion 240 are satisfied (step S304). With the evaluation criterion 240 illustrated in FIG. 29, the comparison result evaluation unit 1283 determines whether the condition 1 and the condition 2 are satisfied.

If the conditions of the evaluation criterion 240 are satisfied (YES in step S304), the comparison result evaluation unit 1283 determines that the acquired waveform is a valid waveform (step S305). Then, the comparison result evaluation unit 1283 outputs the acquired waveform to the averaging processing unit 131.

On the other hand, if the conditions of the evaluation criterion 240 are not satisfied (NO in step S304), the comparison result evaluation unit 1283 determines that the acquired waveform is an invalid waveform (step S306).

Description of Effects of Embodiment

According to this embodiment, it is possible to accurately distinguish a change in the waveform due to impulse noise from a change in the waveform due to connection of an unauthorized device to the bus line 11. Therefore, according to this embodiment, connection of an unauthorized device can be detected with accuracy. In this embodiment, the normal waveform 230 is compared with the acquired waveform, so that it is possible to accurately distinguish a change in the waveform due to impulse noise from a change in the waveform due to connection of an unauthorized device to the bus line 11 for each vehicle.

Embodiment 6

In this embodiment, another method for determining impulse noise will be described.

In the following, differences from Embodiment 2 and Embodiment 4 will be mainly described. Matters not described below are the same as in Embodiment 2 and Embodiment 4.

*Description of Configurations*

Figure 31:
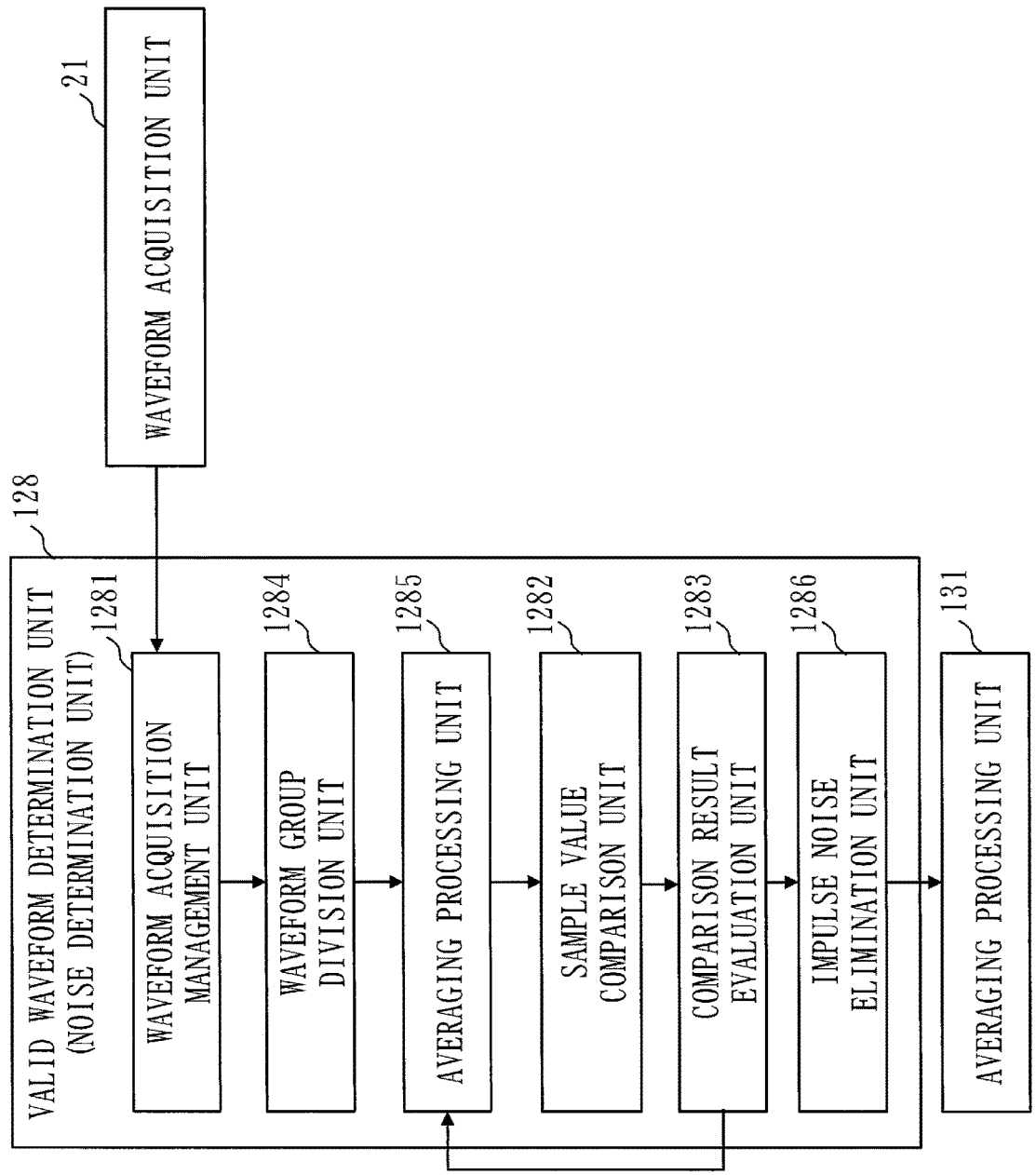
FIG. 31 is a diagram illustrating an example of the configuration of a valid waveform determination unit according to Embodiment 6.

FIG. 31 illustrates an example of the configuration of a valid waveform determination unit 128 according to this embodiment.

The functional configuration of an unauthorized connection detection apparatus 1 according to this embodiment is as illustrated in FIG. 4. The hardware configuration of the unauthorized connection detection apparatus 1 according to this embodiment is as illustrated in FIG. 3.

Before describing details of the internal configuration of the valid waveform determination unit 128, an outline of the operation of the valid waveform determination unit 128 according to this embodiment will be described with reference to FIG. 32.

The valid waveform determination unit 128 divides a plurality of acquired waveforms measured by the waveform acquisition unit 21 into a plurality of groups. For simplicity of description, it is assumed here that the valid waveform determination unit 128 divides the plurality of acquired waveforms into two groups of Group 1 and Group 2.

The valid waveform determination unit 128 compares each of a plurality of acquired waveforms belonging to Group 1 (an example of a plurality of first measurement value candidates) with a representative waveform (corresponding to a representative value) of a plurality of acquired waveforms belonging to Group 2 (an example of a plurality of second measurement value candidates). In FIG. 32, the upper group is Group 1 and the lower group is Group 2. In an example in FIG. 32, the representative waveform of the acquired waveforms of Group 2 is an average waveform of the acquired waveforms of Group 2.

If a difference from the representative waveform of the acquired waveforms belonging to Group 2 is greater than or equal to a threshold value in any of the acquired waveforms belonging to Group 1, the valid waveform determination unit 128 determines that impulse noise is included in the acquired waveform concerned.

Then, the valid waveform determination unit 128 either discards the acquired waveform determined to include impulse noise or corrects the acquired waveform determined to include impulse noise.

If the number of acquired waveforms determined to include impulse noise exceeds a threshold value, the valid waveform determination unit 128 compares the representative waveform of the acquired waveforms belonging to Group 1 with each of the acquired waveforms of Group 2. In the example in FIG. 32, the representative waveform of the acquired waveforms of Group 1 is an average waveform of the acquired waveforms of Group 1.

If a difference from the representative waveform of the acquired waveforms belonging to Group 1 is greater than or equal to the threshold value in any acquired waveform of the acquired waveforms belonging to Group 2, it is determined that impulse noise is included in the acquired waveform concerned.

If the number of acquired waveforms determined to include impulse noise is less than the threshold value, the valid waveform determination unit 128 determines that impulse noise is not included in each acquired waveform determined to include impulse noise among the acquired waveforms belonging to Group 1.

Figure 32:
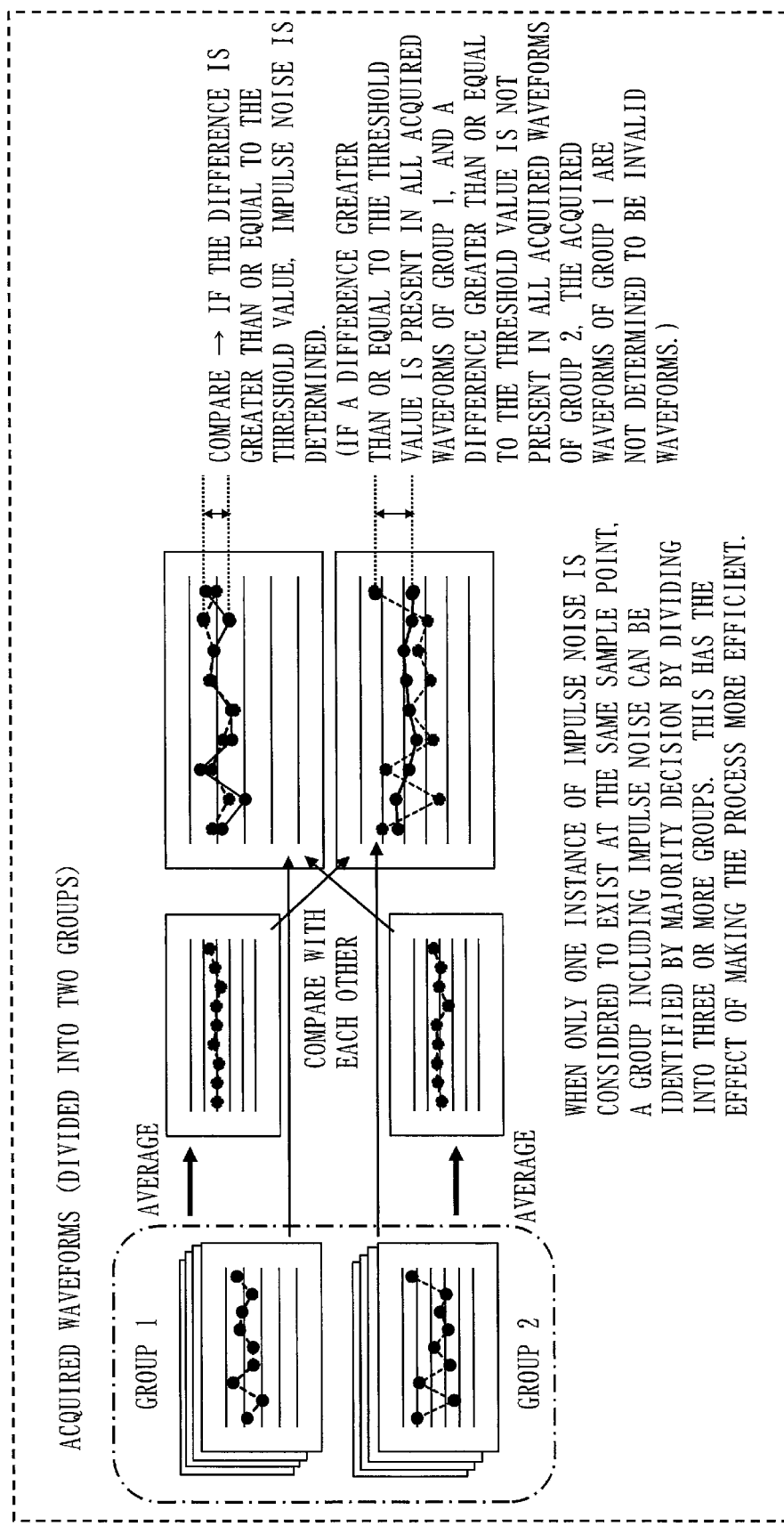
FIG. 32 is a diagram illustrating an outline of the operation of the valid waveform determination unit according to Embodiment 6.

In the example in FIG. 32, it is assumed that if a difference greater than or equal to the threshold value is present in all the acquired waveforms of Group 1 and a difference greater than or equal to the threshold value is not present in each of all the acquired waveforms of Group 2, the valid waveform determination unit 128 does not determine that the acquired waveforms of Group 1 are invalid waveforms. Instead of this, the valid waveform determination unit 128 may be configured to not determine that the acquired waveforms of Group 1 are invalid waveforms if, for example, a difference greater than or equal to the threshold value is present in 80 percent of the acquired waveforms of Group 1 and a difference greater than or equal to the threshold value is not present in 80 percent of the acquired waveforms of Group 2.

The valid waveform determination unit 128 performs the above operation also on the acquired waveforms belonging to Group 2. That is, in this case, the acquired waveforms belonging to Group 2 correspond to an example of the first measurement value candidates, and the acquired waveforms belonging to Group 1 correspond to an example of the second measurement value candidates.

The internal configuration of the valid waveform determination unit 128 illustrated in FIG. 31 will now be described.

Each time an acquired waveform which is a measurement value candidate is measured, a waveform acquisition management unit 1281 acquires the acquired waveform from the waveform acquisition unit 21 and outputs the acquired waveform to a waveform group division unit 1284.

The waveform group division unit 1284 divides acquired waveforms into a plurality of groups. In the following, it is assumed that the waveform group division unit 1284 divides the acquired waveforms into Group 1 and Group 2 as illustrated in FIG. 32.

An averaging processing unit 1285 performs an averaging process on the acquired waveforms to obtain an average waveform. More specifically, the averaging processing unit 1285 obtains an average waveform of the acquired waveforms of Group 1. The averaging processing unit 1285 also obtains an average waveform of the acquired waveforms of Group 2.

A sample value comparison unit 1282 compares an acquired waveform with the average waveform of a different group. That is, the sample value comparison unit 1282 compares, for each sample point, a sample value of each acquired waveform of Group 1 with a sample value of the average waveform of Group 2.

The sample value comparison unit 1282 also compares, for each sample point, a sample value of each acquired waveform of Group 2 with a sample value of the average waveform of Group 1.

A comparison result evaluation unit 1283 evaluates the comparison result of the sample value comparison unit 1282.

Specifically, the comparison result evaluation unit 1283 evaluates the result of comparing the sample value of each acquired waveform of Group 1 with the sample value of the average waveform of Group 2.

Then, if there is a difference greater than or equal to the threshold value between the sample value of an acquired waveform of Group 1 and the sample value of the average waveform of Group 2 at any of the sample points, the comparison result evaluation unit 1283 determines that the acquired waveform of Group 1 is an invalid waveform. On the other hand, if there is no difference greater than or equal to the threshold value between the sample value of an acquired waveform of Group 1 and the sample value of the average waveform of Group 2 at any of the sample points, the comparison result evaluation unit 1283 determines that the acquired waveform of Group 1 is a valid waveform.

If the number of acquired waveforms determined to be an invalid waveform in Group 1 exceeds the threshold value, the comparison result evaluation unit 1283 causes the sample value comparison unit 1282 to compare the average waveform of Group 1 with each of the acquired waveforms of Group 2. If the difference between any of the acquired waveforms of Group 2 and the average waveform of Group 1 is greater than or equal to the threshold value, the comparison result evaluation unit 1283 determines that the acquired waveform concerned is an invalid waveform.

If the number of acquired waveforms determined to be an invalid waveform in Group 2 is less than the threshold value, the comparison result evaluation unit 1283 determines that each acquired waveform determined to be an invalid waveform among the acquired waveforms of Group 1 is a valid waveform.

If the number of acquired waveforms determined to be an invalid waveform in Group 1 is less than the threshold value, the comparison result evaluation unit 1283 evaluates the comparison result of the sample value comparison unit 1282 for each acquired waveform of Group 2. The comparison result evaluation unit 1283 performs the same process on each acquired waveform of Group 2 as the process on each acquired waveform of Group 1.

An impulse noise elimination unit 1286 eliminates impulse noise from the acquired waveform determined to be an invalid waveform by the comparison result evaluation unit 1283. For example, the impulse noise elimination unit 1286 eliminates impulse noise by replacing the sample value that is impulse noise of the acquired waveform determined to be an invalid waveform with a corresponding sample value of the average waveform of a different group.

\*\*\*Description of Operation\*\*\*

Figure 33:
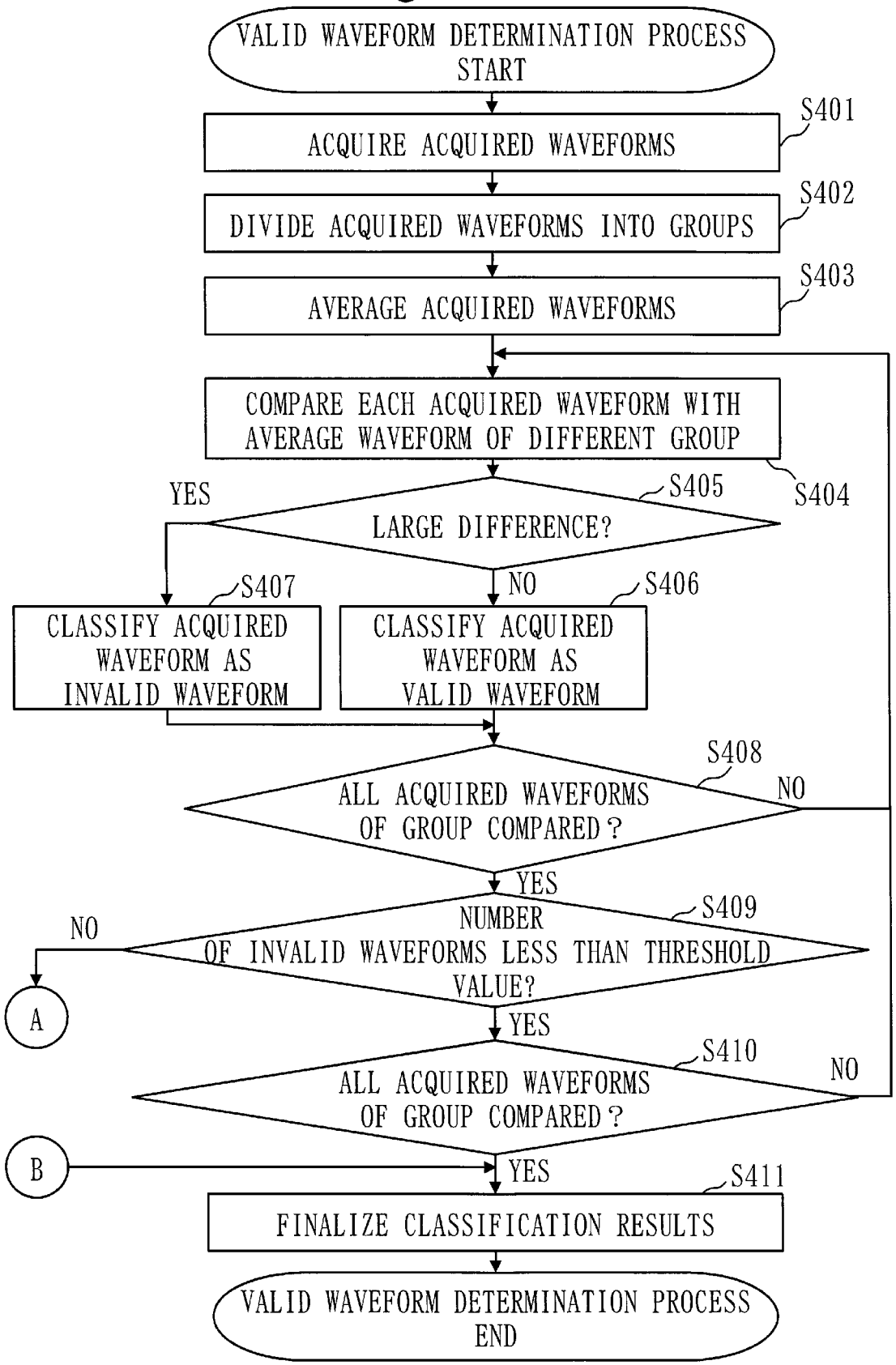
FIG. 33 is a flowchart illustrating a valid waveform determination process of the unauthorized connection detection apparatus according to Embodiment 6.
Figure 34:
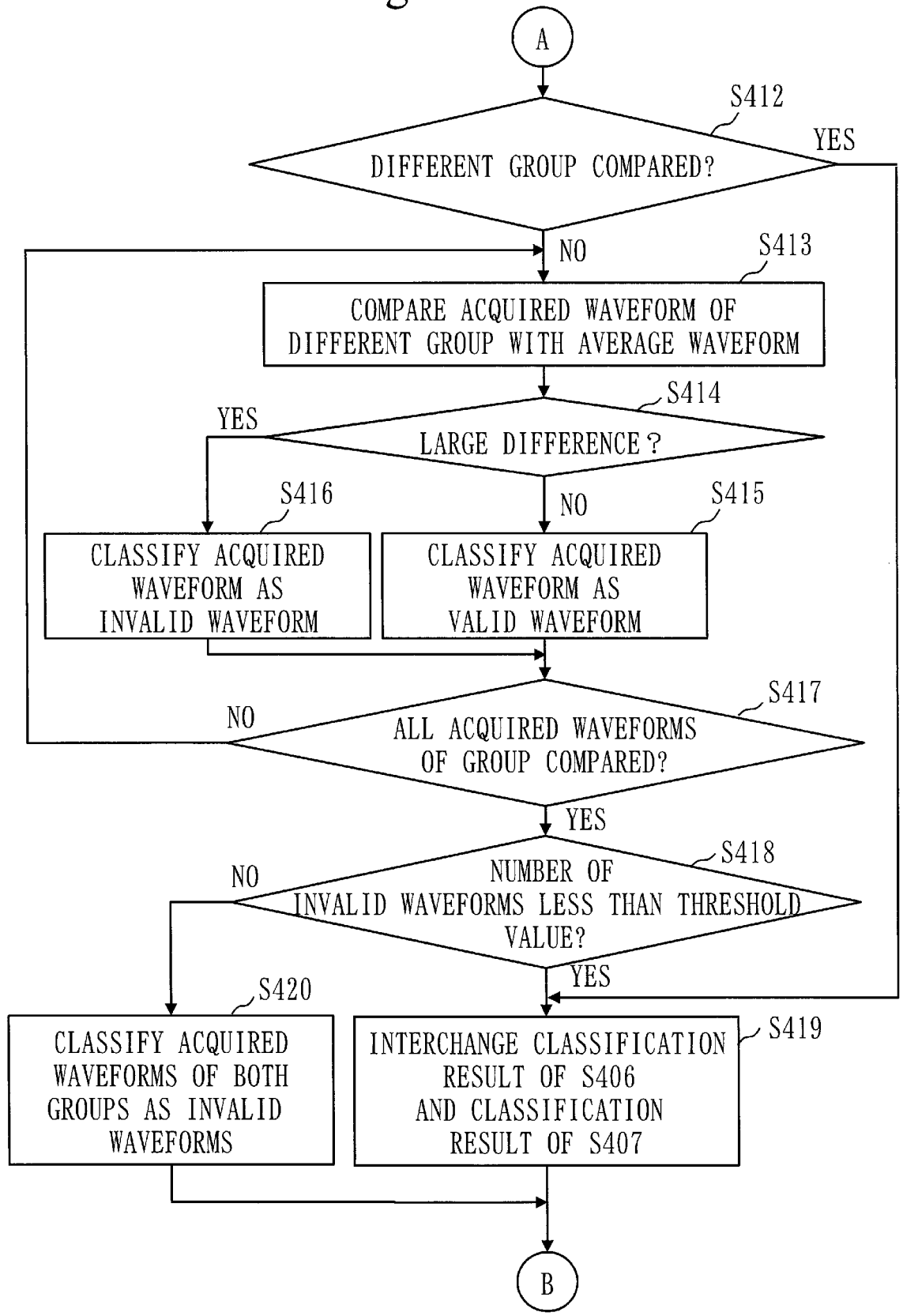
FIG. 34 is a flowchart illustrating the valid waveform determination process of the unauthorized connection detection apparatus according to Embodiment 6.

FIGS. 33 and 34 illustrate an example of the operation of the valid waveform determination unit 128 according to this embodiment.

First, the waveform acquisition management unit 1281 acquires an acquired waveform from the waveform acquisition unit 21 (step S401).

Then, the waveform acquisition management unit 1281 outputs the acquired waveform to the waveform group division unit 1284.

Next, the waveform group division unit 1284 divides acquired waveforms into a plurality of groups (step S402).

As described above, in this embodiment, the waveform group division unit 1284 divides the acquired waveforms into Group 1 and Group 2.

The waveform group division unit 1284 outputs, for each group, acquired waveforms belonging to each group to the averaging processing unit 1285.

Next, the averaging processing unit 1285 averages the acquired waveforms to obtain an average waveform for each group (step S403).

Then, the averaging processing unit 1285 outputs the acquired waveforms and the average waveform to the sample value comparison unit 1282 for each group.

Next, the sample value comparison unit 1282 compares, for each sample point, a sample value of each acquired waveform of the group subject to comparison with a sample value of the average waveform of a different group (step S404). For example, the sample value comparison unit 1282 compares, for each sample point, a sample value of each acquired waveform of Group 1 with a sample value of the average waveform of Group 2.

The sample value comparison unit 1282 outputs the comparison result for each sample point to the comparison result evaluation unit 1283 for each acquired waveform.

The comparison result evaluation unit 1283 evaluates the comparison result of the sample value comparison unit 1282, and determines whether there is a difference greater than or equal to the threshold value at any of the sample points (step S405).

If there is no difference greater than or equal to the threshold value at any of the sample points (NO in step S405), the comparison result evaluation unit 1283 classifies the acquired waveform as a valid waveform (step S406). The comparison result evaluation unit 1283 stores the classification result in a register, for example.

On the other hand, if there is a difference greater than or equal to the threshold value at any of the sample points (YES in step S405), the comparison result evaluation unit 1283 classifies the acquired waveform as an invalid waveform (step S407). The comparison result evaluation unit 1283 stores the classification result in a register, for example.

Next, the comparison result evaluation unit 1283 determines whether all the acquired waveforms of the group subject to comparison have been compared with the average waveform of the different group (step S408).

If there is an acquired waveform that has not been compared (NO in step S408), the sample value comparison unit 1282 performs the process of step S404 on the acquired waveform that has not been compared, and the comparison result evaluation unit 1283 performs the process of step S405 and thereafter based on the comparison result.

If all the acquired waveforms of the group subject to comparison have been compared with the average waveform of the different group (YES in step S408), the comparison result evaluation unit 1283 determines whether the number of acquired waveforms determined to be an invalid waveform is less than the threshold value (step S409).

If the number of acquired waveforms determined to be an invalid waveform is less than the threshold value (YES in step S409), the comparison result evaluation unit 1283 determines whether all the acquired waveforms of all the groups have been compared with the average waveform of a different group (step S410).

That is, the comparison result evaluation unit 1283 determines whether all the acquired waveforms of Group 1 have been compared with the average waveform of Group 2, and whether all the acquired waveforms of Group 2 have been compared with the average waveform of Group 1.

If acquired waveforms of any of the groups have not been compared with the average waveform of a different group (NO in step S410), the acquired waveforms of the group not compared with the average waveform are compared with the average waveform of a different group (step S404).

For example, if each acquired waveform of Group 2 has not been compared with the average waveform of Group 1, the sample value comparison unit 1282 compares each acquired waveform of Group 2 with the average waveform of Group 1.

On the other hand, if all the acquired waveforms of all the groups have been compared with the average waveform of a different group (YES in step S410), the comparison result evaluation unit 1283 finalizes the classification results (step S411).

That is, the comparison result evaluation unit 1283 treats the classification result of step S406 or the classification result of step S407 as final determination results.

More specifically, the comparison result evaluation unit 1283 outputs the acquired waveform classified as a valid waveform in step S406 to the averaging processing unit 131. The comparison result evaluation unit 1283 outputs the acquired waveform classified as an invalid waveform in step S407 to the impulse noise elimination unit 1286. The impulse noise elimination unit 1286 eliminates impulse noise from the acquired waveform classified as an invalid waveform by the method described above, for example. The impulse noise elimination unit 1286 outputs the acquired waveform from which impulse noise has been eliminated to the averaging processing unit 131.

On the other hand, in a case where step S409 is NO, the comparison result evaluation unit 1283 has determined that impulse noise is included in many acquired waveforms of the group subject to comparison (for example, Group 1). As a reason for such determination, it may be considered that impulse noise is actually included in many of the acquired waveforms of the group subject to comparison (for example, Group 1). It may also be considered that impulse noise is included in some of the acquired waveforms of a different group (for example, Group 2), so that the average waveform of the different group is under the influence of impulse noise.

Therefore, in order to evaluate the influence of impulse noise on the average waveform of the different group, the comparison result evaluation unit 1283 evaluates the acquired waveforms of the different group as described below.

Specifically, the comparison result evaluation unit 1283 first determines whether each acquired waveform of the different group has been compared with the average waveform of the group subject to comparison in step S404 (step S412).

If each acquired waveform of the different group has been compared with the average waveform of the group subject to comparison in step S404 (YES in step S412), the comparison result evaluation unit 1283 interchanges the classification result of step S406 and the classification result of step S407 (step S419).

That is, the comparison result evaluation unit 1283 classifies the acquired waveform classified as a valid waveform in step S406 as an invalid waveform, and classifies the acquired waveform classified as an invalid waveform in step S407 as a valid waveform (step S420).

Then, the comparison result evaluation unit 1283 finalizes the classification results (step S411).

A case where step S409 is NO and step S412 is YES will be considered. It is assumed here that comparison with the average waveform is performed in the order of Group 1 and Group 2. In the case where step S409 is NO and step S412 is YES, many of the acquired waveforms of Group 1 have been classified as valid waveforms, and then many of the acquired waveforms of Group 2 have been classified as invalid waveforms (NO in step S409). Since many of the acquired waveforms of Group 1 have been classified as valid waveforms, the average waveform of Group 2 is presumed to be appropriate. Since the average waveform of Group 2 is presumed to be appropriate, the acquired waveforms of Group 2 determined to be invalid waveforms are presumed to be valid waveforms. For this reason, the comparison result evaluation unit 1283 reclassifies the acquired waveforms classified as invalid waveforms of Group 2 as valid waveforms. Similarly, the comparison result evaluation unit 1283 reclassifies the acquired waveforms classified as valid waveforms of Group 2 as invalid waveforms. On the other hand, since many of the acquired waveforms of Group 2 have been classified as invalid waveforms, it is presumed that the average waveform of Group 1 is under the influence of one or more acquired waveforms including impulse noise. Since, any acquired waveform including impulse noise among the acquired waveforms of Group 1 has already been classified as an invalid waveform, the comparison result evaluation unit 1283 does not change the classification results of the acquired waveforms of Group 1.

On the other hand, if each acquired waveform of the different group has not been compared with the average waveform (NO in step S412), the sample value comparison unit 1282 compares, for each sample point, a sample value of each acquired waveform of the different group with a sample value of the average waveform of the group subject to comparison in S404 (step S413).

The sample value comparison unit 1282 outputs the comparison result for each sample point to the comparison result evaluation unit 1283 for each acquired waveform.

The comparison result evaluation unit 1283 evaluates the comparison result of the sample value comparison unit 1282 to determine whether there is a difference greater than or equal to the threshold value at any of the sample points (step S414).

If there is no difference greater than or equal to the threshold value at any of the sample points (NO in step S414), the comparison result evaluation unit 1283 classifies the acquired waveform as a valid waveform (step S415). The comparison result evaluation unit 1283 stores the classification result in a register, for example.

On the other hand, if there is a difference greater than or equal to the threshold value at any of the sample points (YES in step S414), the comparison result evaluation unit 1283 classifies the acquired waveform as an invalid waveform (step S416). The comparison result evaluation unit 1283 stores the classification result in a register, for example.

Next, the comparison result evaluation unit 1283 determines whether all the acquired waveforms of the group have been compared with the average waveform (step S417).

If there is an acquired waveform that has not been compared (NO in step S417), the sample value comparison unit 1282 performs the process of step S413 on the acquired waveform that has not been compared, and the comparison result evaluation unit 1283 performs the process of step S414 and thereafter based on the comparison result.

If all the acquired waveforms of the group have been compared with the average waveform (YES in step S417), the comparison result evaluation unit 1283 determines whether the number of acquired waveforms determined to be an invalid waveform is less than the threshold value (step S418).

If the number of acquired waveforms determined to be an invalid waveform is less than the threshold value (YES in step S418), the comparison result evaluation unit 1283 interchanges the classification result of step S406 and the classification result of step S407 (step S419).

That is, the comparison result evaluation unit 1283 classifies the acquired waveform classified as a valid waveform in step S406 as an invalid waveform, and classifies the acquired waveform classified as an invalid waveform in step S407 as a valid waveform (step S419).

Then, the comparison result evaluation unit 1283 finalizes the classification results (step S411).

A case where step S418 is YES will be considered. It is assumed here that comparison with the average waveform is performed in the order of Group 1 and Group 2. If many of the acquired waveforms of Group 1 have been classified as invalid waveforms, then step S409 is NO. At this point, Group 2 has not been compared, so that step S412 is NO. In step S413 to step S417, all the acquired waveforms of Group 2 are compared with the average waveform of Group 1. If many of the acquired waveforms of Group 2 have been classified as valid waveforms, then step S418 is YES. That is, step S418 is YES if many of the acquired waveforms of Group 1 have been classified as invalid waveforms and many of the acquired waveforms of Group 2 have been classified as valid waveforms. Since many of the acquired waveforms of Group 2 have been classified as valid waveforms, the average waveform of Group 1 is presumed to be appropriate. Since the average waveform of Group 1 is presumed to be appropriate, each acquired waveform determined to be an invalid waveform of Group 1 is presumed to be a valid waveform. For this reason, the comparison result evaluation unit 1283 reclassifies each acquired waveform classified as an invalid waveform of Group 1 as a valid waveform. Similarly, the comparison result evaluation unit 1283 reclassifies each acquired waveform classified as a valid waveform of Group 1 as an invalid waveform. On the other hand, since many of the acquired waveforms of Group 1 have been classified as invalid waveforms, it is presumed that the average waveform of Group 2 is under the influence of one or more acquired waveforms including impulse noise. Since any acquired waveform including impulse noise among the acquired waveforms of Group 2 has been classified as an invalid waveform in step S416, the comparison result evaluation unit 1283 does not change the classification results of the acquired waveforms of Group 2.

On the other hand, if the number of acquired waveforms determined to be an invalid waveform is greater than or equal to the threshold value (NO in step S418), the comparison result evaluation unit 1283 classifies all the acquired waveforms of the both groups as invalid waveforms (step S420).

A case where step S409 is NO and step S412 is NO will be considered. It is assumed here that comparison with the average waveform is performed in the order of Group 1 and Group 2. The case where step S409 is NO and step S412 is NO is a situation where many of the acquired waveforms of Group 1 have been classified as invalid waveforms, and many of the acquired waveforms of Group 2 have also been classified as invalid waveforms. In this case, it is not possible to determine which one of the average waveform of Group 1 and the average waveform of Group 2 is appropriate, so that the comparison result evaluation unit 1283 classifies all the acquired waveforms of the both groups as invalid waveforms in step S420.

In this embodiment, the impulse noise elimination unit 1286 eliminates impulse noise. However, the comparison result evaluation unit 1283 may discard an acquired waveform including impulse noise.

Description of Effects of Embodiment

Also according to this embodiment, it is possible to accurately distinguish a change in the waveform due to impulse noise from a change in the waveform due to connection of an unauthorized device to the bus line 11. Therefore, also according to this embodiment, connection of an unauthorized device can be detected with accuracy. According to this embodiment, an acquired waveform including impulse noise can be corrected, so that it is not necessary to discard the acquired waveform.

Embodiment 7

In this embodiment, another method for determining impulse noise will be described.

Differences from Embodiment 2 and Embodiment 4 will be mainly described below. Matters not described below are the same as in Embodiment 2 and Embodiment 4.

\*\*\*Description of Configurations\*\*\*

Figure 35:
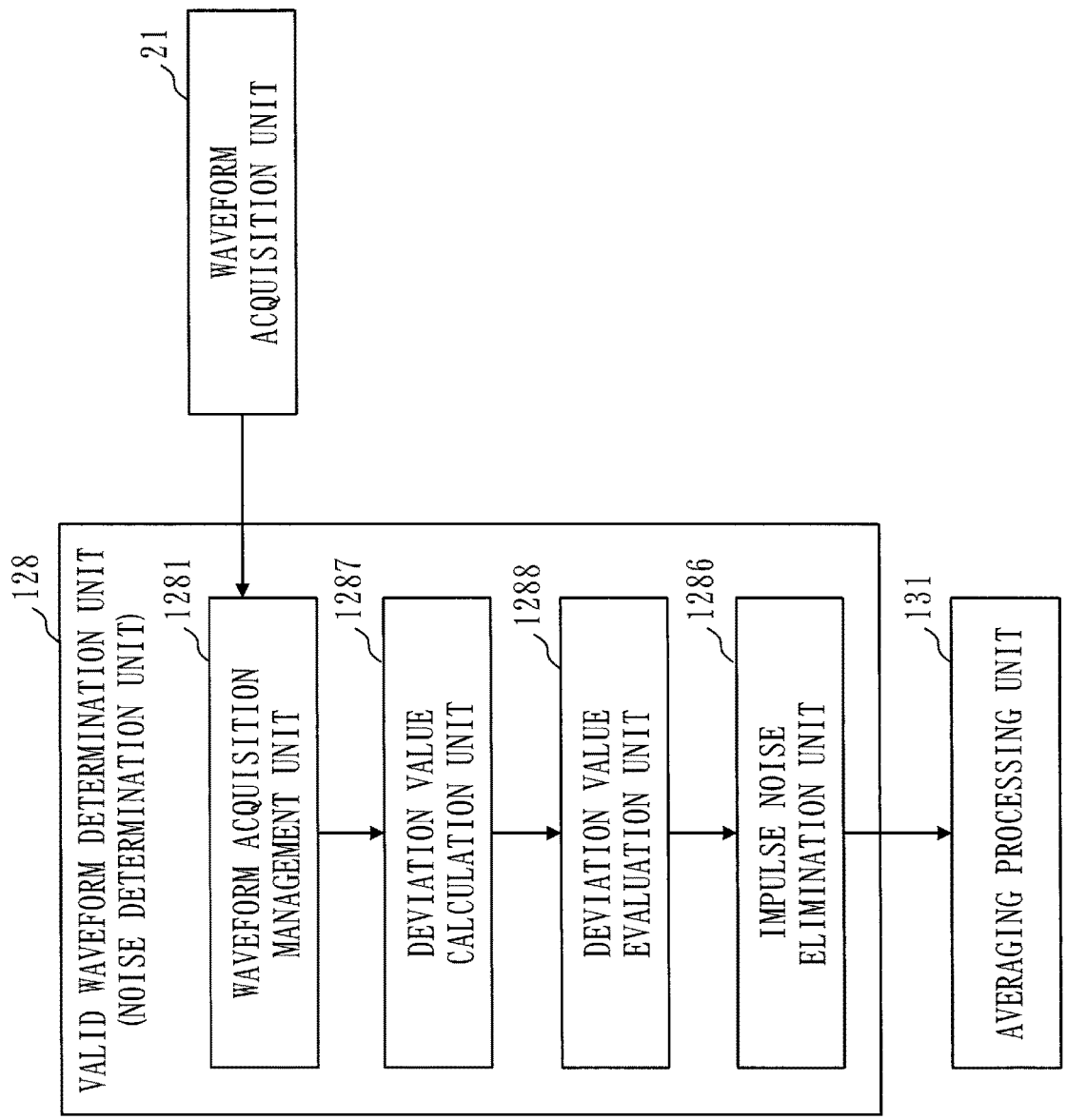
FIG. 35 is a diagram illustrating an example of the configuration of a valid waveform determination unit according to Embodiment 7.

FIG. 35 illustrates an example of the configuration of a valid waveform determination unit 128 according to this embodiment.

The functional configuration of an unauthorized connection detection apparatus 1 according to this embodiment is as illustrated in FIG. 4. The hardware configuration of the unauthorized connection detection apparatus 1 according to this embodiment is as illustrated in FIG. 3.

Figure 36:
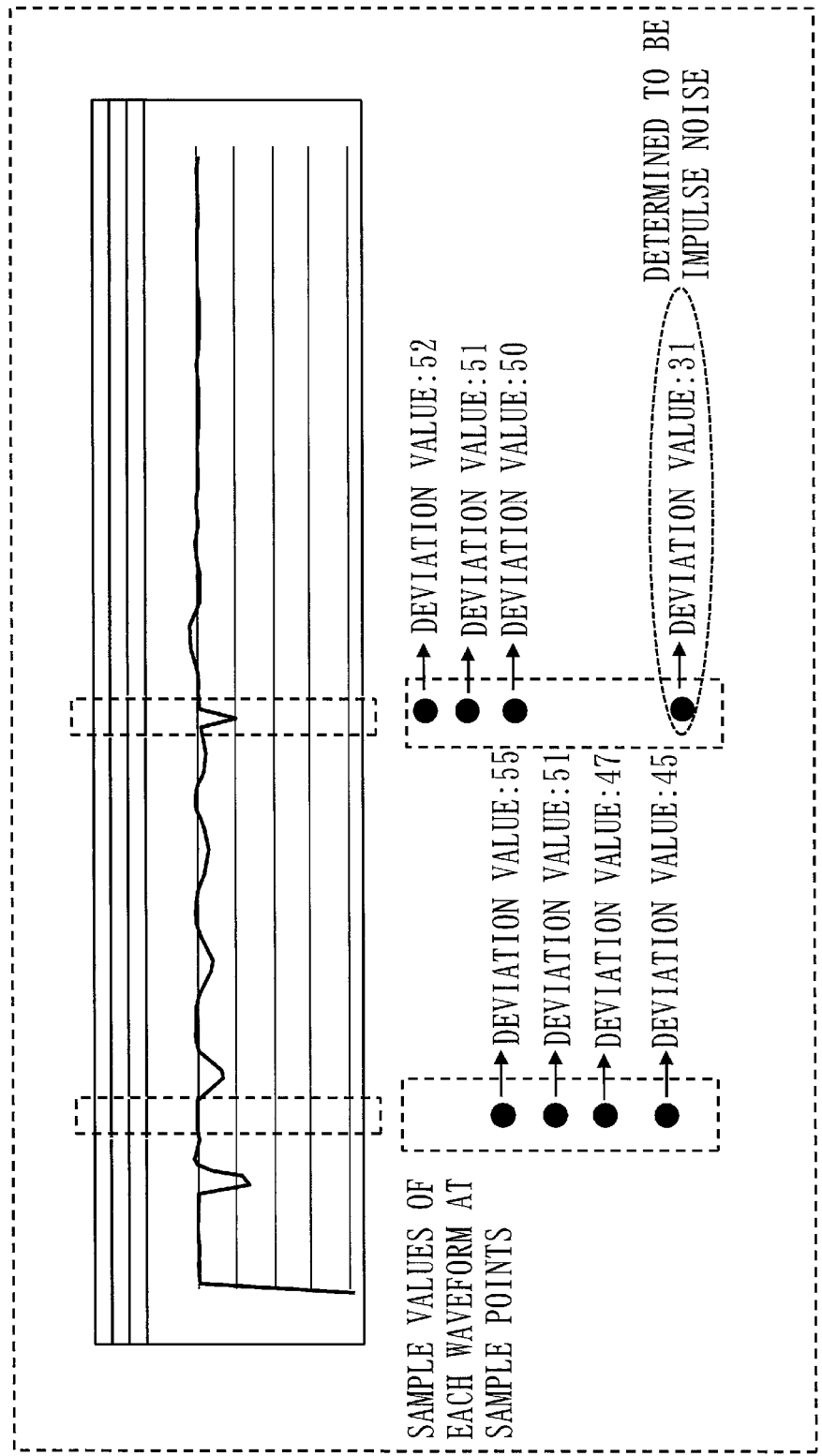
FIG. 36 is a diagram illustrating an outline of the operation of the valid waveform determination unit according to Embodiment 7.

Before describing details of the internal configuration of the valid waveform determination unit 128, an outline of the operation of the valid waveform determination unit 128 according to this embodiment will be described with reference to FIG. 36.

Also in this embodiment, as in Embodiment 2, when measuring changes over time in voltage values of the bus line 11, the waveform acquisition unit 21 samples voltage values of the bus line 11 at a plurality of sample points. When measuring distance transition of voltage values of the bus line 11, the waveform acquisition unit 21 samples voltage values of the bus line 11 at a plurality of sample points. When measuring changes over time in impedance values of the bus line 11, the waveform acquisition unit 21 samples impedance values of the bus line 11 at a plurality of sample points. When measuring distance transition of impedance values of the bus line 11, the waveform acquisition unit 21 samples impedance values of the bus line 11 at a plurality of sample points.

When acquired waveforms which are measurement value candidates are measured by the waveform acquisition unit 21, the valid waveform determination unit 128 analyzes, for each sample point, a deviation value of each sample value of the acquired waveforms that have been measured to determine whether each sample value is impulse noise.

If a sample value at any of the sample points of any of the acquired waveforms is impulse noise, the valid waveform determination unit 128 discards the sample value that is impulse noise or corrects the sample value that is impulse noise, so as to obtain the acquired waveform not including impulse noise.

More specifically, the valid waveform determination unit 128 determines, for each sample point, whether deviation values of a plurality of sample values calculated for a plurality of acquired waveforms are within an acceptable range. Then, it is determined that a sample value whose deviation value is outside the acceptable range is impulse noise. In an example in FIG. 36, it is assumed that the acceptable range for deviation values is 40 or more. Therefore, the valid waveform determination unit 128 determines the sample value whose deviation value 31 is outside the acceptable range to be impulse noise.

The internal configuration of the valid waveform determination unit 128 illustrated in FIG. 35 will now be described.

Each time an acquired waveform which is a measurement value candidate is measured, a waveform acquisition management unit 1281 acquires the acquired waveform from the waveform acquisition unit 21, and outputs the acquired waveform to a deviation value calculation unit 1287.

The deviation value calculation unit 1287 calculates, for each sample point, deviation values of sample values of a plurality of acquired waveforms.

A deviation value evaluation unit 1288 evaluates, for each sample point, the deviation values of the sample values of the plurality of acquired waveforms.

More specifically, the deviation value evaluation unit 1288 determines, for each sample point, whether the deviation values of the sample values of the plurality of acquired waveforms are within the acceptable range.

Then, the deviation value evaluation unit 1288 determines a sample value whose deviation value is outside the acceptable range to be impulse noise.

An impulse noise elimination unit 1286 eliminates the impulse noise determined by the deviation value evaluation unit 1288. For example, the impulse noise elimination unit 1286 eliminates the impulse noise by replacing the sample value that is the impulse noise with another sample value whose deviation value is within the acceptable range.

*Description of Operation*

Figure 37:
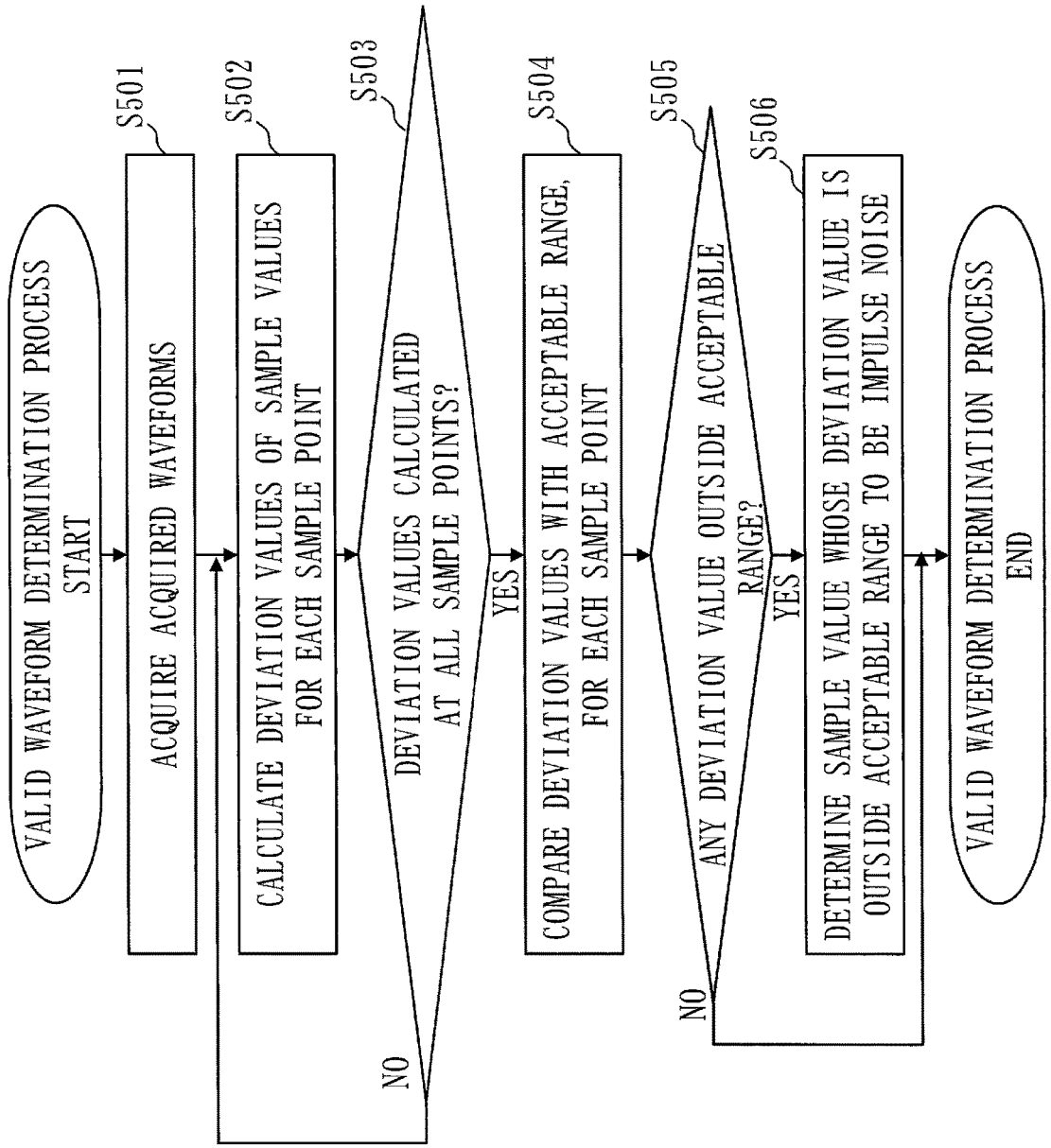
FIG. 37 is a flowchart illustrating a valid waveform determination process of the unauthorized connection detection apparatus according to Embodiment 7.

FIG. 37 illustrates an example of the operation of the valid waveform determination unit 128 according to this embodiment.

First, the waveform acquisition management unit 1281 acquires an acquired waveform from the waveform acquisition unit 21 (step S501).

Then, the waveform acquisition management unit 1281 outputs the acquired waveform to the deviation value calculation unit 1287.

The deviation value calculation unit 1287 calculates, for each sample point, deviation values of sample values of a plurality of acquired waveforms (step S502). A method by which the deviation value calculation unit 1287 calculates the deviation values of the sample values may be any method.

After the deviation value calculation unit 1287 has calculated the deviation values at all the sample points (YES in step S503), the deviation value evaluation unit 1288 compares, for each sample point, the deviation value of each sample value with the acceptable range (step S504).

If there is a deviation value outside the acceptable range at any of the sample points (YES in step S505), the deviation value evaluation unit 1288 determines the sample value whose deviation value is outside the acceptable range to be impulse noise (step S506).

The impulse noise elimination unit 1286 eliminates the impulse noise determined by the deviation value evaluation unit 1288. The impulse noise elimination unit 1286 eliminates the impulse noise by the method described above, for example.

In this embodiment, the impulse noise elimination unit 1286 eliminates impulse noise. However, the deviation value evaluation unit 1288 may discard a sample value whose deviation value is outside the acceptable range.

Description of Effects of Embodiment

Also according to this embodiment, it is possible to accurately distinguish a change in the waveform due to impulse noise from a change in the waveform due to connection of an unauthorized device to the bus line. Therefore, also according to this embodiment, connection of an unauthorized device can be detected with accuracy.

Embodiment 8

In this embodiment, another method for determining impulse noise will be described.

Differences from Embodiment 2 and Embodiment 4 will be mainly described below. Matters not described below are the same as in Embodiment 2 and Embodiment 4.

*Description of Configurations*

The functional configuration of an unauthorized connection detection apparatus 1 according to this embodiment is as illustrated in FIG. 4. The hardware configuration of the unauthorized connection detection apparatus 1 according to this embodiment is as illustrated in FIG. 3.

Figure 38:
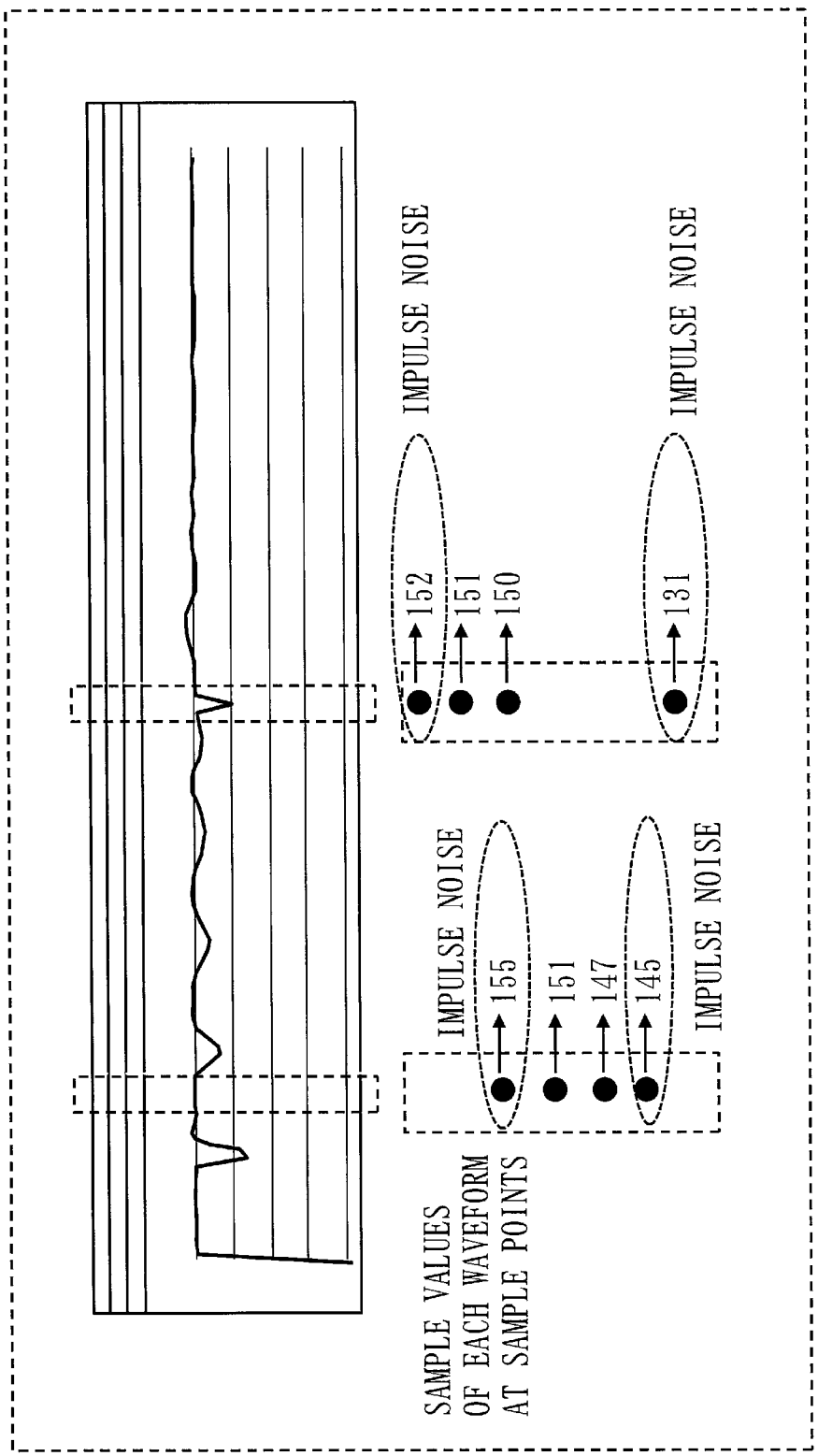
FIG. 38 is a diagram illustrating an outline of the operation of a valid waveform determination unit according to Embodiment 8.

An outline of the operation of the valid waveform determination unit 128 according to this embodiment will be described with reference to FIG. 38.

In this embodiment, when acquired waveforms which are measurement value candidates are measured by the waveform acquisition unit 21, the valid waveform determination unit 128 analyzes, for each sample point, each sample value of the acquired waveforms that have been measured to determine whether each sample value is impulse noise.

If a sample value at any of the sample points of any of the acquired waveforms is impulse noise, the valid waveform determination unit 128 either discards the sample value that is impulse noise or corrects the sample value that is impulse noise, so as to obtain the acquired waveform not including impulse noise.

More specifically, the valid waveform determination unit 128 determines, for each sample point, that an arbitrary number of highest sample values and an arbitrary number of lowest sample values among the plurality of sample values of the plurality of acquired waveforms are impulse noise. In an example in FIG. 38, the highest sample value and the lowest sample value are impulse noise.

*Description of Operation*

Figure 39:
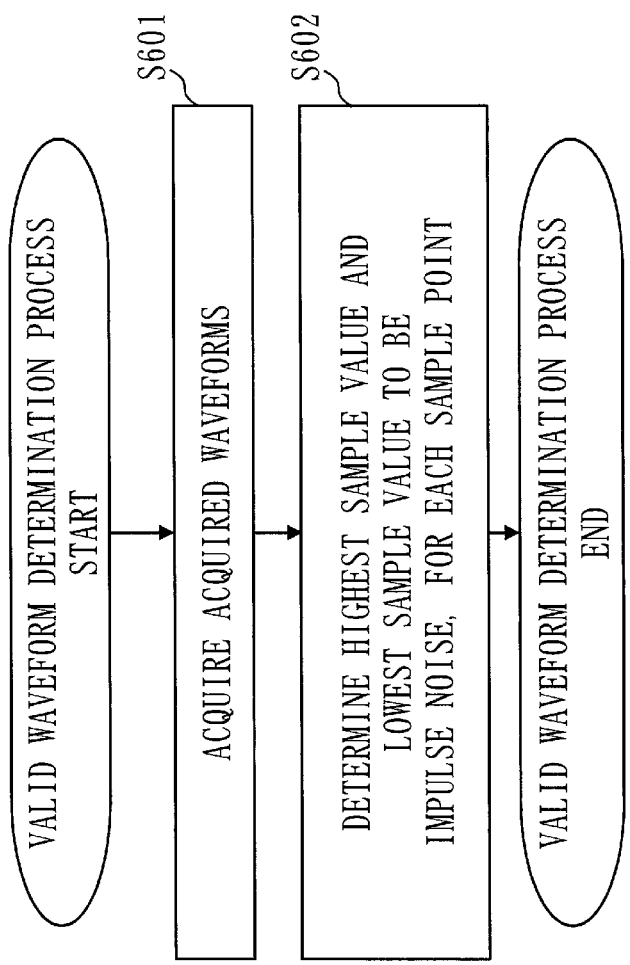
FIG. 39 is a flowchart illustrating a valid waveform determination process of an unauthorized connection detection apparatus according to Embodiment 8.

FIG. 39 illustrates an example of the operation of the valid waveform determination unit 128 according to this embodiment.

First, the valid waveform determination unit 128 acquires an acquired waveform from the waveform acquisition unit 21 (step S601).

Then, the valid waveform determination unit 128 determines, for each sample point, that the highest sample value and the lowest sample value are impulse noise (step S602).

Then, the valid waveform determination unit 128 eliminates the impulse noise. For example, the valid waveform determination unit 128 eliminates the impulse noise by replacing the sample value that is the impulse noise with another sample value at the same sample point.

In this embodiment, the valid waveform determination unit 128 determines only the highest sample value and the lowest sample value to be impulse noise. However, the valid waveform determination unit 128 may determine that two or more of highest sample values and two or more of lowest sample values are impulse noise.

Description of Effects of Embodiment

Also according to this embodiment, it is possible to accurately distinguish a change in the waveform due to impulse noise from a change in the waveform due to connection of an unauthorized device to the bus line 11. Therefore, also according to this embodiment, connection of an unauthorized device can be detected with accuracy. In this embodiment, impulse noise can be determined without any special conditional determination or criterion, so that designing of the unauthorized connection detection apparatus 1 is facilitated.

Embodiment 9

In this embodiment, another method for determining impulse noise will be described.

Differences from Embodiment 2 and Embodiment 4 will be mainly described below. Matters not described below are the same as in Embodiment 2 and Embodiment 4.

\*\*\*Description of Configurations\*\*\*

The functional configuration of an unauthorized connection detection apparatus 1 according to this embodiment is as illustrated in FIG. 4. The hardware configuration of the unauthorized connection detection apparatus 1 according to this embodiment is as illustrated in FIG. 3.

An outline of the operation of the valid waveform determination unit 128 according to this embodiment will be described here with reference to FIG. 40.

Also in this embodiment, when acquired waveforms which are measurement value candidates are measured by the waveform acquisition unit 21, the valid waveform determination unit 128 determines, for each sample point, whether each sample value of the acquired waveforms that have been measured is impulse noise.

If a sample value at any of the sample points of any of the acquired waveforms is impulse noise, the valid waveform determination unit 128 either discards the sample value that is impulse noise, or corrects the sample value that is impulse noise, so as to obtain the acquired waveform not including impulse noise.

More specifically, the valid waveform determination unit 128 determines, for each sample point, that sample values other than a median value among the sample values of the acquired waveforms are impulse noise. In an example in FIG. 40, those other than a sample value of "151" and a sample value of "150" are determined to be impulse noise.

Figure 40:
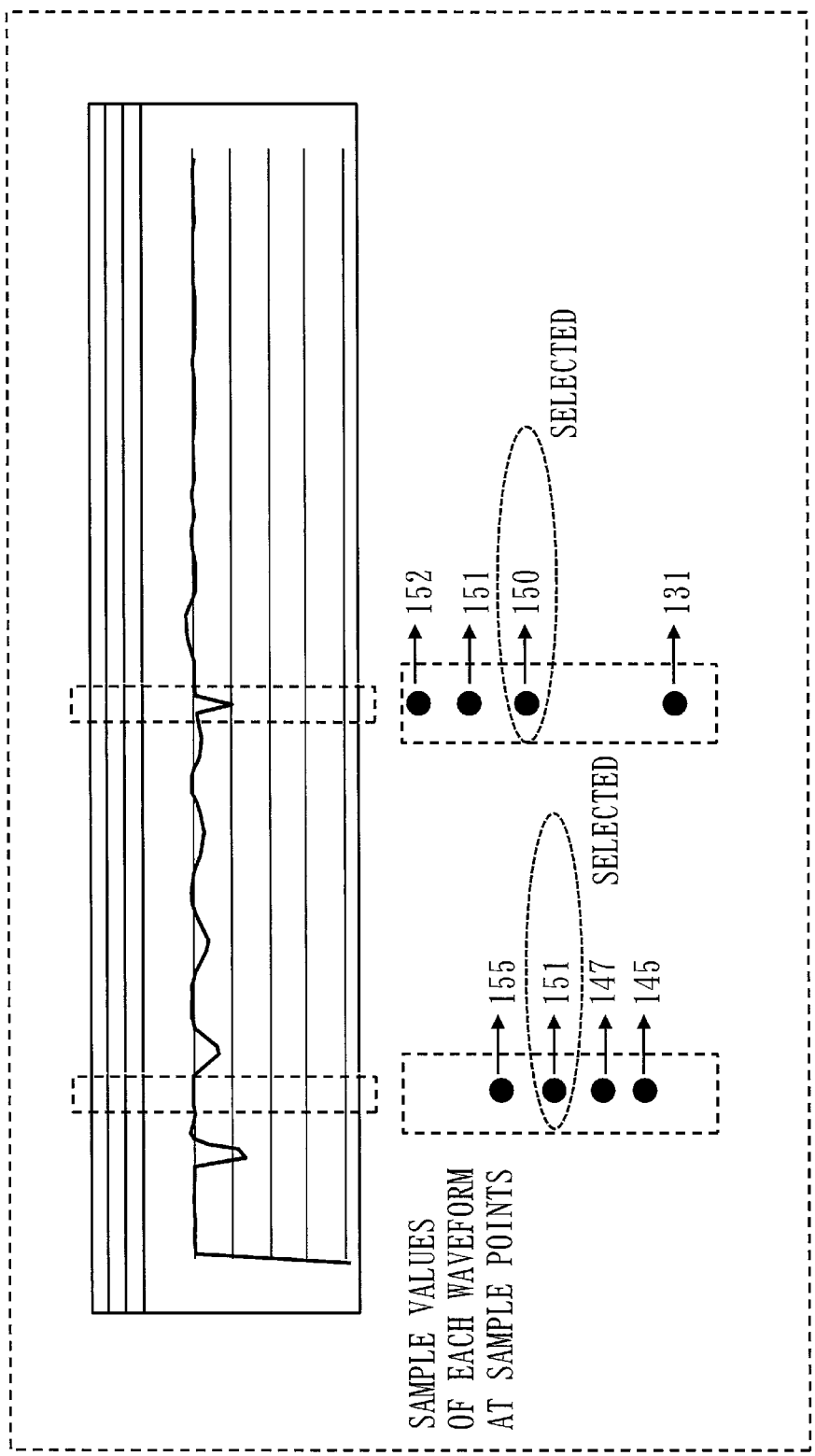
FIG. 40 is a diagram illustrating an outline of the operation of a valid waveform determination unit according to Embodiment 9.

Note that FIG. 40 illustrates an image of the operation of the valid waveform determination unit 128 according to this embodiment. In FIG. 40, the sample value of "151" and the sample value of "150" are not strictly median values. For simplicity of description, however, the sample value of "151" and the sample value of "150" are considered as median values in FIG. 40.

\*\*\*Description of Operation\*\*\*

Figure 41:
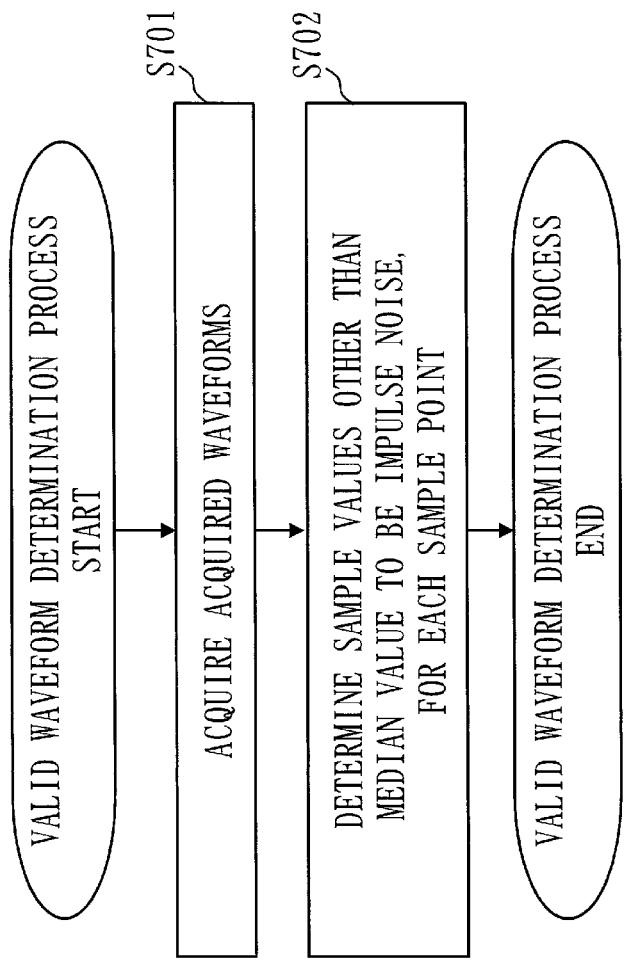
FIG. 41 is a flowchart illustrating a valid waveform determination process of an unauthorized connection detection apparatus according to Embodiment 9.

FIG. 41 illustrates an example of the operation of the valid waveform determination unit 128 according to this embodiment.

First, the valid waveform determination unit 128 acquires acquired waveforms from the waveform acquisition unit 21 (step S701).

Next, the valid waveform determination unit 128 determines, for each sample point, that sample values other than a sample value of the median value are impulse noise (step S704).

Then, the valid waveform determination unit 128, for example, discards the sample values determined to be impulse noise.

Description of Effects of Embodiment

Also according to this embodiment, it is possible to accurately distinguish a change in the waveform due to impulse noise from a change in the waveform due to connection of an unauthorized device to the bus line 11. Therefore, also according to this embodiment, connection of an unauthorized device can be detected with accuracy. In this embodiment, impulse noise can be determined without any special conditional determination or criterion, so that designing of the unauthorized connection detection apparatus 1 is facilitated. According to this embodiment, random noise can also be eliminated.

Embodiment 10

In Embodiment 3, the comparison unit 222 calculates the feature value of an acquired waveform by the SVD.

This embodiment describes an example in which the comparison unit 222 calculates the feature value of an acquired waveform using waveform areas in place of the SVD.

Differences from Embodiment 3 will be mainly described below. Matters not described below are the same as in Embodiment 3.

The functional configuration of an unauthorized connection detection apparatus 201 according to this embodiment is as illustrated in FIG. 15. The hardware configuration of the unauthorized connection detection apparatus 201 according to this embodiment is as illustrated in FIG. 3.

In this embodiment, the comparison unit 222 calculates the feature value of an acquired waveform using waveform areas in place of the SVD.

The operation of the comparison unit 222 is as described in Embodiment 3 except that waveform areas are used in place of the SVD.

Figure 42:
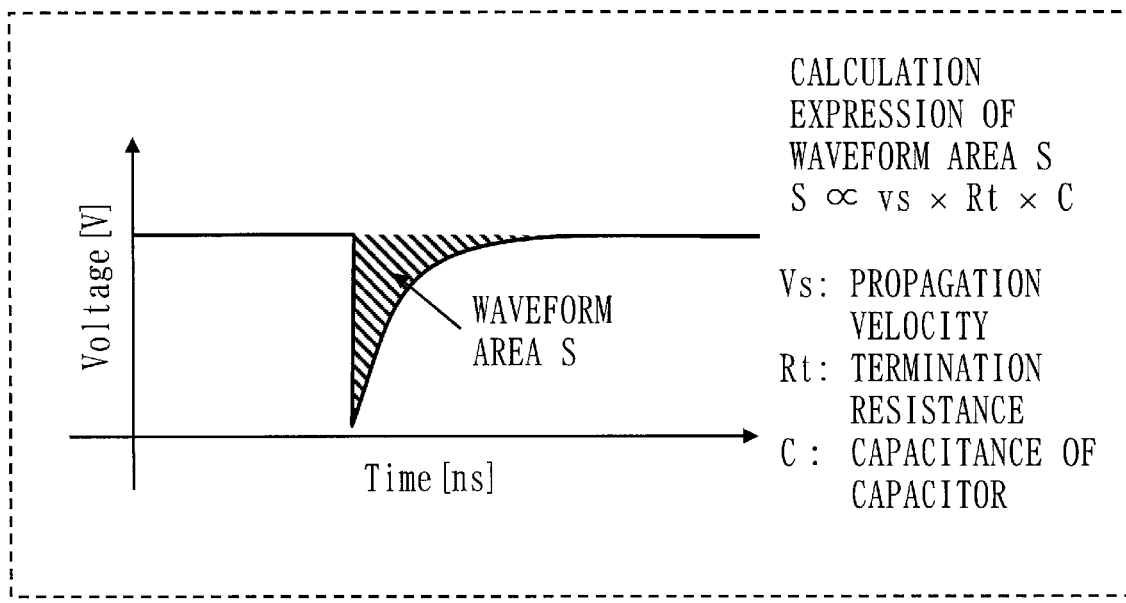
FIG. 42 is a diagram illustrating a calculation expression of a waveform area according to Embodiment 10.

Note that the comparison unit 222 calculates a waveform area by a calculation expression illustrated in FIG. 42.

Figure 43:
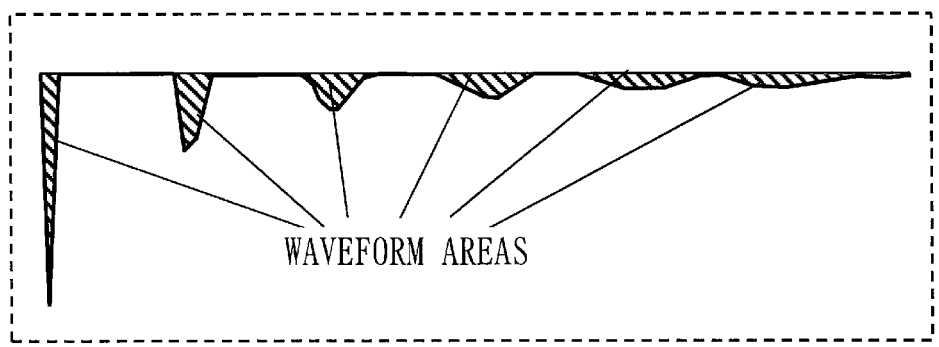
FIG. 43 is a diagram illustrating an example of waveform areas in an acquired waveform according to Embodiment 10.

When the acquired waveform is a waveform illustrated in FIG. 43, the comparison unit 222 calculates each of five waveform areas included in the acquired waveform according to the calculation expression illustrated in FIG. 42. Then, the comparison unit 222 uses the sum of the waveform areas as the feature value of the acquired waveform concerned.

In this embodiment, waveform areas are used to calculate the feature value. That is, in this embodiment, only simple addition processing is performed, so that the feature value can be calculated with a low computational load. According to this embodiment, no statistical processing such as the SVD is required, so that the feature value can be calculated with a low computational load. According to this embodiment, connection of an unauthorized device to the bus line 11 can be detected with accuracy without being affected by random noise.

Embodiment 11

In Embodiment 1, the unauthorized connection determination unit 24 determines whether an unauthorized device is connected to the bus line 11.

In Embodiment 1, however, the user is only notified that an unauthorized device is connected to the bus line 11. For this reason, the user needs to search the entire network for the unauthorized device. For example, a CAN bus line has a length of several tens of meters, so that visually searching for the unauthorized devices is a burden on the user.

This embodiment describes an example in which the unauthorized connection determination unit 24 identifies a location where an unauthorized device is connected.

Differences from Embodiment 1 will be mainly described below. Matters not described below are the same as in Embodiment 1.

The functional configuration of an unauthorized connection detection apparatus 1 according to this embodiment is as illustrated in FIG. 2. The hardware configuration of the unauthorized connection detection apparatus 1 according to this embodiment is as illustrated in FIG. 3.

In this embodiment, upon determining that an unauthorized device is connected to the bus line 11, the unauthorized connection determination unit 24 identifies a location where the unauthorized device is connected.

The operation of the unauthorized connection determination unit 24 is as described in Embodiment 1 except that a process to identify the location where the unauthorized device is connected is added.

Upon determining that an unauthorized device is connected to the bus line 11 based on an acquired waveform representing changes over time in voltage values of the bus line 11, the unauthorized connection determination unit 24 converts the acquired waveform concerned representing changes over time in the voltage values into a waveform of distance transition of the voltage values. Then, the unauthorized connection determination unit 24 determines that the unauthorized device is connected at a location where a change greater than or equal to a threshold value occurs in the waveform of distance transition of the voltage values.

Figure 44:
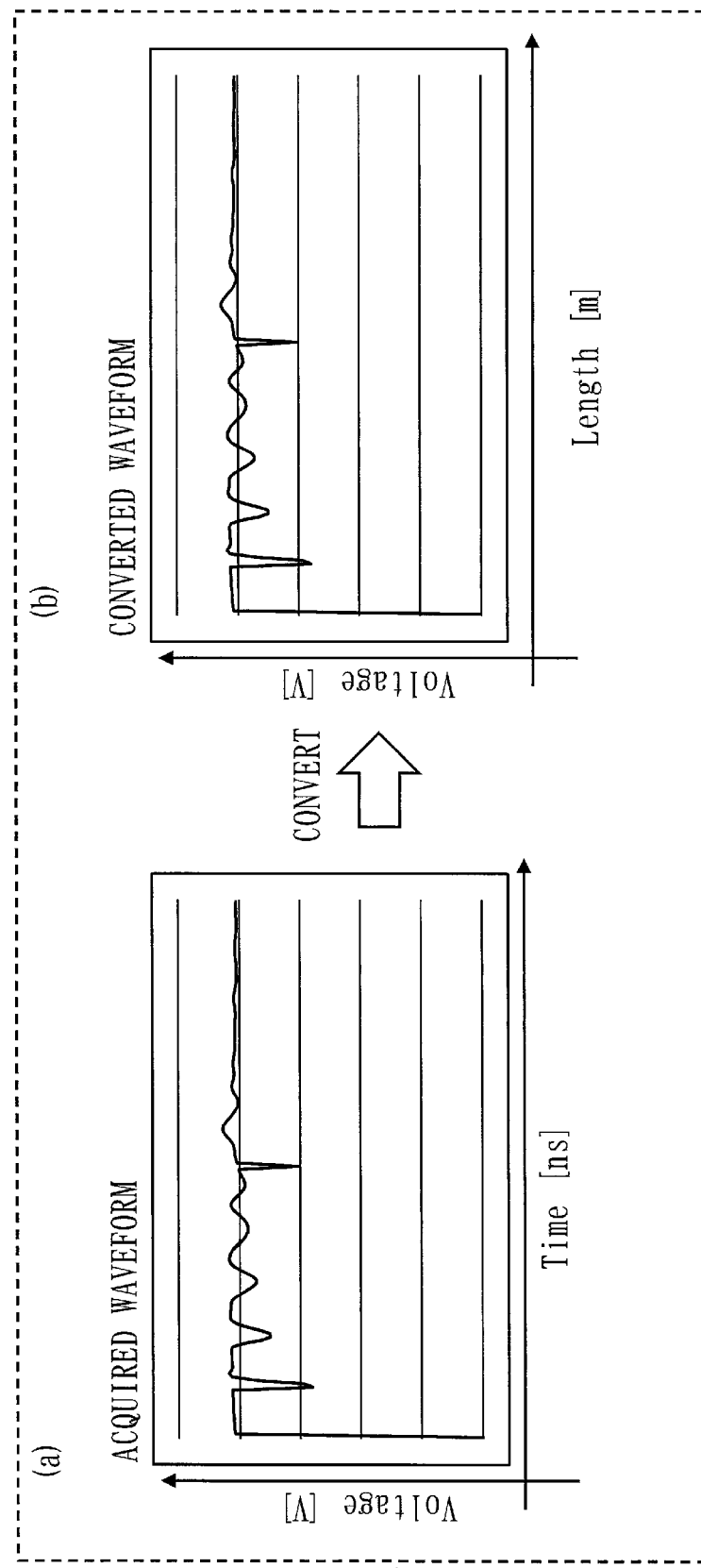
FIGS. 44A and 44B are diagrams illustrating an outline of the operation of an unauthorized connection determination unit according to Embodiment 11.

For example, the unauthorized connection determination unit 24 converts the acquired waveform representing changes over time in the voltage values as illustrated in (a) of FIG. 44 into the waveform representing distance transition of the voltage values as illustrated in (b) of FIG. 44. Then, the unauthorized connection determination unit 24 determines that the unauthorized device is connected at a location of a steep fall in the waveform of distance transition after conversion.

Then, the determination result notification unit 26 notifies the user of the connection location of the unauthorized device identified by the unauthorized connection determination unit 24.

This embodiment has described an example in which the unauthorized connection determination unit 24 identifies a location where an unauthorized device is connected by using an acquired waveform representing changes over time in voltage values. Alternatively, the unauthorized connection determination unit 24 may identify a location where an unauthorized device is connected by converting an acquired waveform representing changes over time in impedance values into a waveform representing distance transition of the impedance values.

In a case where an acquired waveform representing distance transition of voltage values or distance transition of impedance values has been obtained, the unauthorized connection determination unit 24 can identify a location where an unauthorized device is connected directly from the acquired waveform that has been obtained.

According to this embodiment, a connection location of an unauthorized device can be identified. Therefore, it is not necessary for the user to visually search for the unauthorized device, so that the burden on the user can be reduced.

Embodiment 12

In Embodiment 1, the comparison unit 22 obtains a difference between waveforms at each sample point to obtain a differential waveform. Then, upon completion of the comparison process by the comparison unit 22, the unauthorized connection determination unit 24 starts the unauthorized connection determination process to determine whether a difference between the normal waveform 23 and the acquired waveform is within the unauthorized connection determination criterion 25. Then, if the difference between the normal waveform 23 and the acquired waveform exceeds the unauthorized connection determination criterion 25, the unauthorized connection determination unit 24 determines that an unauthorized device is connected to the bus line 11.

In this embodiment, if a time or distance in which a difference between a measurement value and a normal value exceeds a threshold value is in excess of an upper limit value, the unauthorized connection determination unit 24 determines that an unauthorized device is connected to the bus line 11. More specifically, if a difference exceeding the threshold value exists in a range of sample points in excess of an upper limit width in the differential waveform between the normal waveform 23 and the acquired waveform, the unauthorized connection determination unit 24 determines that an unauthorized device is connected to the bus line 11.

Differences from Embodiment 1 will be mainly described below. Matters not described below are the same as in Embodiment 1.

FIG. 45 illustrates an example of an unauthorized connection determination criterion 25 according to this embodiment.

In the unauthorized connection determination criterion 25 according to this embodiment, a threshold value for differences and an upper limit width for a difference exceeding the threshold value are defined. The upper limit width is an upper limit value for a time or distance in which a difference exceeding the threshold value continues.

In the unauthorized connection determination criterion 25 according to this embodiment, a plurality of combinations of the threshold value and the upper limit width may be defined as illustrated in FIG. 45. The unauthorized connection determination unit 24 determines whether an unauthorized device is connected to the bus line 11, using at least one of the plurality of combinations of the threshold value and the upper limit width defined in the unauthorized connection determination criterion 25.

If a difference exceeding the threshold value indicated in the unauthorized connection determination criterion 25 exists in excess of the upper limit width indicated in the unauthorized connection determination criterion 25 in a differential waveform generated by the comparison unit 22, the unauthorized connection determination unit 24 determines that an unauthorized device is connected to the bus line 11.

Figure 46:
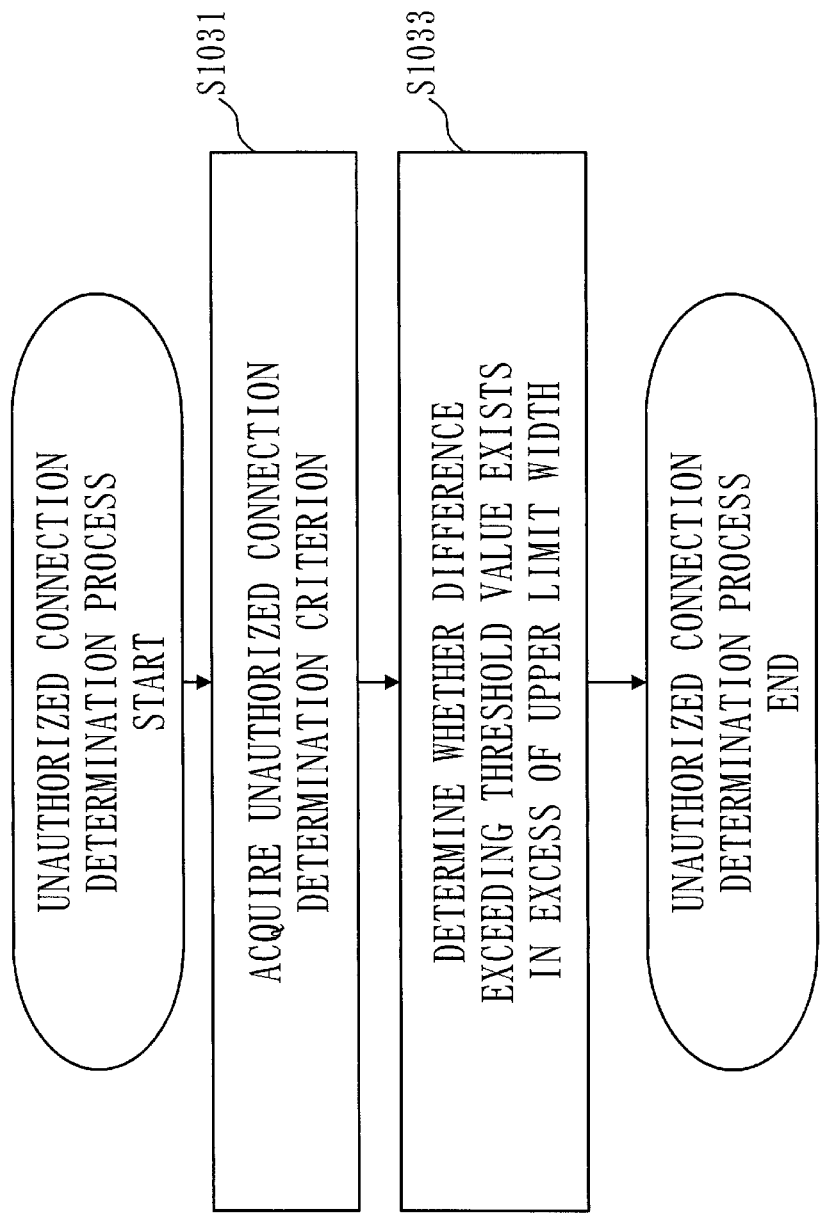
FIG. 46 is a flowchart illustrating an unauthorized connection detection process of an unauthorized connection detection apparatus according to Embodiment 12.

FIG. 46 is a flowchart illustrating details of an unauthorized connection determination process according to this embodiment.

In the unauthorized connection determination process, the unauthorized connection determination unit 24 acquires the unauthorized connection determination criterion 25 from the storage device 2 (step S1031). The unauthorized connection determination unit 24 acquires, for example, the unauthorized connection determination criterion 25 illustrated in FIG. 45.

Then, the unauthorized connection determination unit 24 determines whether a difference exceeding the threshold value exists in excess of the upper limit width in a differential waveform generated by the comparison unit 22 (step S1033).

That is, the unauthorized connection determination unit 24 determines whether a difference exceeding the threshold value exists in the differential waveform. Then, if a difference exceeding the threshold value exists, it is determined whether the width (time, distance) in which the difference concerned continues is in excess of the upper limit width defined in the unauthorized connection determination criterion 25.

If a difference exceeding the threshold value exists in excess of the upper limit width in the differential waveform, the unauthorized connection determination unit 24 determines that an unauthorized device is connected to the bus line 11.

Figure 47:
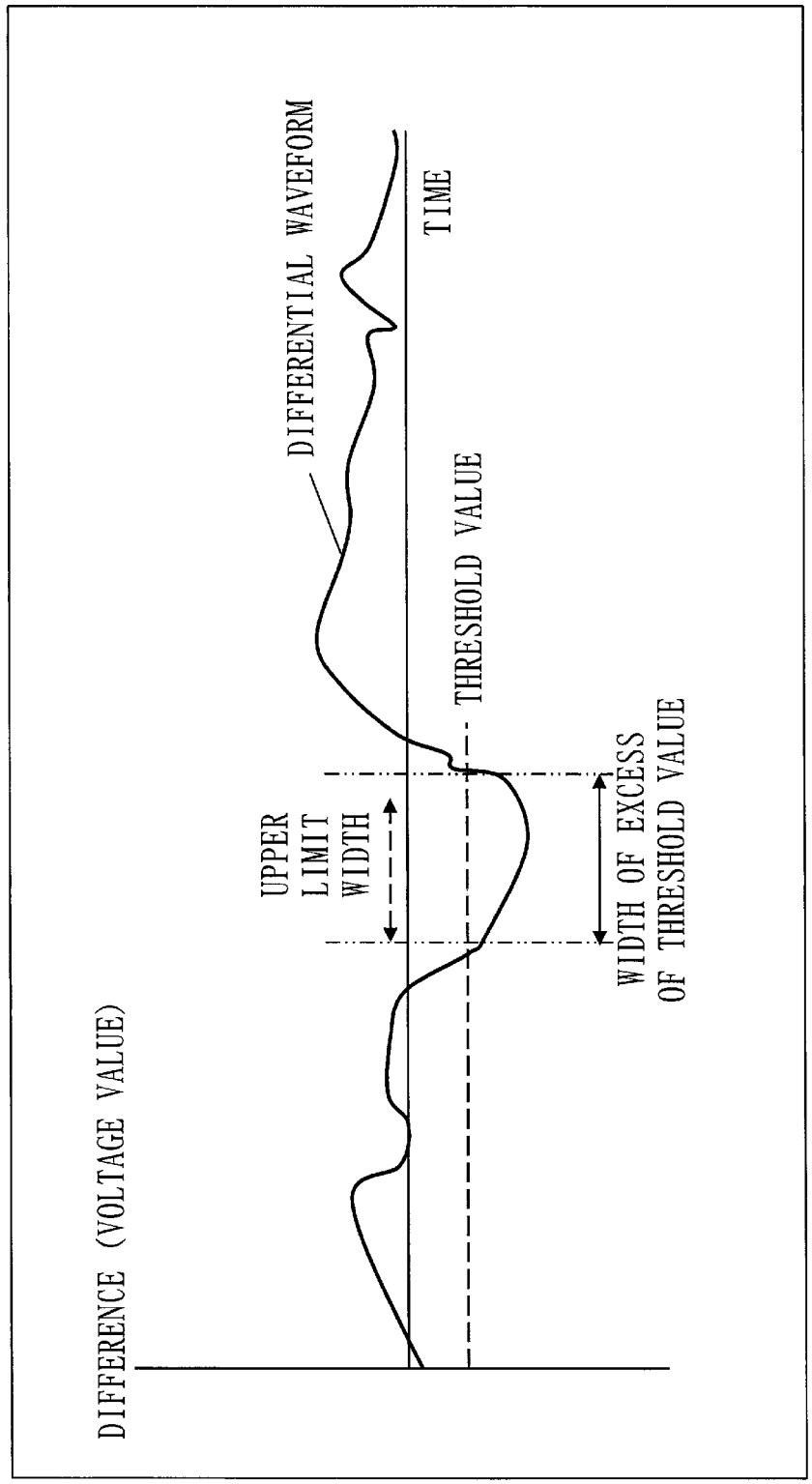
FIG. 47 is a diagram illustrating an example of a differential waveform, a threshold value, and an upper limit width according to Embodiment 12.

FIG. 47 illustrates an example of the differential waveform generated by the comparison unit 22, the threshold value, and the upper limit width.

In the differential waveform of FIG. 47, the width (time width) of sample values exceeding the threshold value is in excess of the upper limit width. Therefore, in the example in FIG. 47, the unauthorized connection determination unit 24 determines that an unauthorized device is connected to the bus line 11.

According to this embodiment, connection of an unauthorized device to the bus line 11 can be detected with accuracy by determining whether a specific change that occurs due to unauthorized connection is included in the differential waveform.

The embodiments of the present invention have been described above. These embodiments may be implemented in combination.

Alternatively, one of these embodiments may be partially implemented.

Alternatively, these embodiments may be partially implemented in combination.

Note that the present invention is not limited to these embodiments, and various modifications are possible as necessary.

In Embodiments 1 to 12, the processes on changes over time in voltage values have been mainly described. The processes described in Embodiments 1 to 12 may also be applied to distance transition of voltage values, changes over time in impedance values, and distance transition of impedance values, in addition to changes over time in voltage values. That is, "changes over time in voltage values" described in Embodiments 1 to 12 may be replaced with "distance transition of voltage values", "changes over time in impedance values", or "distance transition of impedance values".

\*\*\*Description of Hardware Configurations\*\*\*

Finally, the hardware configurations of the unauthorized connection detection apparatus 1 and the unauthorized connection detection apparatus 201 will be described supplementarily.

The processor 3 and the processor 203 are integrated circuits (ICs) that perform processing.

The processor 3 and the processor 203 are central processing units (CPUs), digital signal processors (DSPs), or the like.

Each of the storage device 2 and the storage device 202 is a random access memory (RAM), a read-only memory (ROM), a flash memory, a hard disk drive (HDD), or the like.

An operating system (OS) is stored in each of the storage device 2 and the storage device 202.

Then, at least part of the OS is executed by the processor 3 and the processor 203.

While executing part of the OS, the processor 3 executes the programs for realizing the functions of the comparison unit 22, the unauthorized connection determination unit 24, the determination result notification unit 26, the signal transmission unit 127, the valid waveform determination unit 128, the normal waveform acquisition unit 129, the temperature measurement unit 130, and the averaging processing unit 131.

While executing part of the OS, the processor 203 executes the programs for realizing the functions of the comparison unit 222, the unauthorized connection determination unit 224, the determination result notification unit 226, the signal transmission unit 327, the valid waveform determination unit 328, the normal feature value acquisition unit 329, the temperature measurement unit 330, and the averaging processing unit 331.

Execution of the OS by the processor 3 and the processor 203 causes task management, memory management, file management, communication control, and the like to be performed.

At least one of information, data, signal values, and variable values indicating results of processing by the comparison unit 22, the unauthorized connection determination unit 24, the determination result notification unit 26, the signal transmission unit 127, the valid waveform determination unit 128, the normal waveform acquisition unit 129, the temperature measurement unit 130, and the averaging processing unit 131 is stored in at least one of the storage device 2 and a register or a cache memory in the processor 3.

Similarly, at least one of information, data, signal values, and variable value indicating results of processing by the comparison unit 222, the unauthorized connection determination unit 224, the determination result notification unit 226, the signal transmission unit 327, the valid waveform determination unit 328, the normal feature value acquisition unit 329, the temperature measurement unit 330, and the averaging processing unit 331 is stored in at least one of the storage device 202 and a register or a cache memory in the processor 203.

The programs for realizing the functions of the comparison unit 22, the unauthorized connection determination unit 24, the determination result notification unit 26, the signal transmission unit 127, the valid waveform determination unit 128, the normal waveform acquisition unit 129, the temperature measurement unit 130, and the averaging processing unit 131 may be stored in a portable storage medium, such as a magnetic disk, a flexible disk, an optical disc, a compact disc, a Blu-ray (registered trademark) disc, or a DVD.

Similarly, the programs for realizing the functions of the comparison unit 222, the unauthorized connection determination unit 224, the determination result notification unit 226, the signal transmission unit 327, the valid waveform determination unit 328, the normal feature value acquisition unit 329, the temperature measurement unit 330, and the averaging processing unit 331 may be stored in a portable storage medium, such as a magnetic disk, a flexible disk, an optical disc, a compact disc, a Blu-ray (registered trademark) disc, or a DVD.

The "unit" of the comparison unit 22, the unauthorized connection determination unit 24, the determination result notification unit 26, the signal transmission unit 127, the valid waveform determination unit 128, the normal waveform acquisition unit 129, the temperature measurement unit 130, the averaging processing unit 131, the comparison unit 222, the unauthorized connection determination unit 224, the determination result notification unit 226, the signal transmission unit 327, the valid waveform determination unit 328, the normal feature value acquisition unit 329, the temperature measurement unit 330, and the averaging processing unit 331 may be replaced with a "circuit", "step", "procedure", or "process".

The unauthorized connection detection apparatus 1 and the unauthorized connection detection apparatus 201 may be realized by an electronic circuit, such as a logic integrated circuit (IC), a gate array (GA), an application-specific integrated circuit (ASIC), or a field-programmable gate array (FPGA).

Note that the processor and the above electronic circuit are also collectively referred to as processing circuitry.

REFERENCE SIGNS LIST

1: unauthorized connection detection apparatus, 2: storage device, 3: processor, 4: voltage sensor, 11: bus line, 12: device, 21: waveform acquisition unit, 22: comparison unit, 23: normal waveform, 24: unauthorized connection determination unit, 25: unauthorized connection determination criterion, 26: determination result notification unit, 105: transmitter, 106: temperature sensor, 127: signal transmission unit, 128: valid waveform determination unit, 129: normal waveform acquisition unit, 130: temperature measurement unit, 131: averaging processing unit, 201: unauthorized connection detection apparatus, 202: storage device, 203: processor, 204: voltage sensor, 221: waveform acquisition unit, 222: comparison unit, 223: normal feature value, 224: unauthorized connection determination unit, 225: unauthorized connection determination criterion, 226: determination result notification unit, 230: normal waveform, 240: evaluation criterion, 305: transmitter, 306: temperature sensor, 327: signal transmission unit, 328: valid waveform determination unit, 329: normal feature value acquisition unit, 330: temperature measurement unit, 331: averaging processing unit, 1281: waveform acquisition management unit, 1282: sample value comparison unit, 1283: comparison result evaluation unit, 1284: waveform group division unit, 1285: averaging processing unit, 1286: impulse noise elimination unit, 1287: deviation value calculation unit, 1288: deviation value evaluation unit

The invention claimed is:

1. An information processing apparatus comprising:
a voltage sensor;
a temperature sensor; and
processing circuitry to:
control the voltage sensor to measure one of changes over time in a voltage value of a bus line, distance transition of the voltage value, changes over time in an impedance value of the bus line, and distance transition of the impedance value as a measurement value,
compare the measurement value with a normal value, and extract a difference between the measurement value and the normal value, the normal value being one of changes over time in a voltage value of the bus line, distance transition of the voltage value, changes over time in an impedance value of the bus line, and distance transition of the impedance value in a normal state, and
evaluate the extracted difference between the measurement value and the normal value, so as to determine whether an unauthorized device is connected to the bus line,
wherein the processing circuitry controls the temperature sensor to measure a temperature around the bus line,
wherein the processing circuitry selects a normal value associated with a temperature level corresponding to the measured temperature around the bus line from among a plurality of normal values, each of the normal values being associated with a respective temperature level different from a temperature level associated with each other normal value, and compares the selected normal value with the measurement value, and
wherein the processing circuitry determines that an unauthorized device is connected to the bus line and issues an alarm when the difference between the measurement value and the normal value exceeds a threshold value.

2. The information processing apparatus according to claim 1,
wherein the processing circuitry transmits a step electrical signal or a pulse electrical signal to the bus line, and
observes reflection characteristics of step electrical signals or pulse electrical signals that have been transmitted, so as to measure the one of the changes over time in the voltage value of the bus line, the distance transition of the voltage value, the changes over time in the impedance value of the bus line, and the distance transition of the impedance value as the measurement value.

3. The information processing apparatus according to claim 1,
wherein the processing circuitry determines whether impulse noise is included in the one of the changes over time in the voltage value of the bus line, the distance transition of the voltage value, the changes over time in the impedance value of the bus line, and the distance transition of the impedance value that have been measured, and
compares the measurement value with the normal value, the measurement value being the one of the changes over time in the voltage value of the bus line, the distance transition of the voltage value, the changes over time in the impedance value of the bus line, and the distance transition of the impedance value determined to not include the impulse noise.

4. The information processing apparatus according to claim 1,
wherein the processing circuitry averages the one of the changes over time in the voltage value of the bus line, the distance transition of the voltage value, the changes over time in the impedance value of the bus line, and the distance transition of the impedance value that have been measured, and
compares the measurement value with the normal value, the measurement value being the one of changes over time in the voltage value of the bus line, distance transition of the voltage value, changes over time in the impedance value of the bus line, and distance transition of the impedance value after averaging.

5. The information processing apparatus according to claim 1,
wherein the processing circuitry compares a feature value extracted from the measurement value with a feature value extracted from the normal value.

6. The information processing apparatus according to claim 5,
wherein the processing circuitry transmits a step electrical signal or a pulse electrical signal to the bus line,
observes reflection characteristics of step electrical signals or pulse electrical signals that have been transmitted, so as to measure the one of changes over time in the voltage value of the bus line, the distance transition of the voltage value, the changes over time in the impedance value of the bus line, and the distance transition of the impedance value as the measurement value, and extracts a feature value from the one of the changes over time in the voltage value of the bus line, the distance transition of the voltage value, the changes over time in the impedance value of the bus line, and the distance transition of the impedance value that have been measured, and compares the feature value of the measurement value with a feature value of the normal value, the feature value of the normal value being extracted from the one of the changes over time in the voltage value of the bus line, the distance transition of the voltage value, the changes over time in the impedance value of the bus line, and the distance transition of the impedance value in the normal state.

7. The information processing apparatus according to claim 5, wherein the processing circuitry determines whether impulse noise is included in the one of the changes over time in the voltage value of the bus line, the distance transition of the voltage value, the changes over time in the impedance value of the bus line, and the distance transition of the impedance value that have been measured, and extracts a feature value from the one of the changes over time in the voltage value of the bus line, the distance transition of the voltage value, the changes over time in the impedance value of the bus line, and the distance transition of the impedance value determined to not include the impulse noise, and compares the feature value of the measurement value with a feature value of the normal value, the feature value of the normal value being extracted from the one of the changes over time in the voltage value of the bus line, the distance transition of the voltage value, the changes over time in the impedance value of the bus line, and the distance transition of the impedance value in the normal state.

8. The information processing apparatus according to claim 5, wherein the processing circuitry averages the one of the changes over time in the voltage value of the bus line, the distance transition of the voltage value, the changes over time in the impedance value of the bus line, and the distance transition of the impedance value that have been measured, and extracts a feature value from the one of changes over time in the voltage value of the bus line, distance transition of the voltage value, changes over time in the impedance value of the bus line, and distance transition of the impedance value after averaging, and compares the feature value of the measurement value with a feature value of the normal value, the feature value of the normal value being extracted from the one of the changes over time in the voltage value of the bus line, the distance transition of the voltage value, the changes over time in the impedance value of the bus line, and the distance transition of the impedance value in the normal state.

9. The information processing apparatus according to claim 1, wherein the processing circuitry determines that an unauthorized device is connected to the bus line when the difference between the measurement value and the normal value exceeds a threshold value.

10. The information processing apparatus according to claim 1, wherein the processing circuitry externally notifies a determination result.

11. An information processing method comprising:

measuring, using a temperature sensor, a temperature around a bus line;

selecting a normal value associated with a temperature level corresponding to the measured temperature around the bus line from among a plurality of normal values, each of the normal values being associated with a respective temperature level different from a temperature level associated with each other normal value;

measuring, using a voltage sensor, one of changes over time in a voltage value of a bus line, distance transition of the voltage value, changes over time in an impedance value of the bus line, and distance transition of the impedance value as a measurement value;

comparing the measurement value with the normal value, and extracting a difference between the measurement value and the normal value, the normal value being one of changes over time in a voltage value of the bus line, distance transition of the voltage value, changes over time in an impedance value of the bus line, and distance transition of the impedance value in a normal state;

evaluating the extracted difference between the measurement value and the normal value, so as to determine whether an unauthorized device is connected to the bus line; and determining that an unauthorized device is connected to the bus line and issuing an alarm when the difference between the measurement value and the normal value exceeds a threshold value.

12. A non-transitory computer readable medium storing an information processing program for causing a computer to execute:

a measuring process to measure, using a temperature sensor, a temperature around a bus line;

a selecting process to select a normal value associated with a temperature level corresponding to the measured temperature around the bus line from among a plurality of normal values, each of the normal values being associated with a respective temperature level different from a temperature level associated with each other normal value;

another measuring process to measure, using a voltage sensor, one of changes over time in a voltage value of a bus line, distance transition of the voltage value, changes over time in an impedance value of the bus line, and distance transition of the impedance value as a measurement value;

a comparison process to compare the measurement value with the normal value, and extract a difference between the measurement value and the normal value, the normal value being one of changes over time in a voltage value of the bus line, distance transition of the voltage value, changes over time in an impedance value of the bus line, and distance transition of the impedance value in a normal state; and an unauthorized connection determination process to evaluate the difference between the measurement value and the normal value extracted by the comparison process, so as to determine whether an unauthorized device is connected to the bus line; and a determining process to determine that an unauthorized device is connected to the bus line and issue an alarm when the difference between the measurement value and the normal value exceeds a threshold value.

13. The information processing apparatus according to claim 1,
wherein the processing circuitry extracts a distance between the measurement value and the normal value as the difference between the measurement value and the normal value, and
evaluates the extracted distance between the measurement value and the normal value, which is the difference between the measurement value and the normal value, so as to determine whether an unauthorized device is connected to the bus line.

14. The information processing apparatus according to claim 1,
wherein the processing circuitry compares a feature value of the measurement value with a feature value of the normal value, the feature value of the measurement value being extracted from the one of the changes over time in the voltage value of the bus line, the distance transition of the voltage value, the changes over time in the impedance value of the bus line, and the distance transition of the impedance value that have been measured, the feature value of the measurement value being extracted using either of singular value decomposition (SVD) and a waveform area, the feature value of the normal value being extracted from the one of the changes over time in the voltage value of the bus line, the distance transition of the voltage value, the changes over time in the impedance value of the bus line, and the distance transition of the impedance value in the normal state, and extracts a difference between the feature value of the measurement value and the feature value of the normal value, and
evaluates the extracted difference between the feature value of the measurement value and the feature value of the normal value, so as to determine whether an unauthorized device is connected to the bus line.

15. The information processing apparatus according to claim 3,
wherein the processing circuitry measures one of changes over time in a voltage value of the bus line, distance transition of the voltage value, changes over time in an impedance value of the bus line, and distance transition of the impedance value as a measurement value candidate which is a candidate for the measurement value, and
each time a measurement value candidate is obtained, compares the obtained measurement value candidate with the normal value, and when a difference between the measurement value candidate and the normal value is greater than or equal to a threshold value, determines that the impulse noise is included in the measurement value candidate and discards the measurement value candidate determined to include the impulse noise, so as to obtain a measurement value candidate not including the impulse noise.

16. The information processing apparatus according to claim 15,
wherein upon determining that the impulse noise is included in each of an m (m≥2) number of consecutive measurement value candidates that have been measured, the processing circuitry determines that the impulse noise is not included in a measurement value candidate measured after the m number of measurement value candidates.

17. The information processing apparatus according to claim 3,
wherein the processing circuitry measures one of changes over time in a voltage value of the bus line, distance transition of the voltage value, changes over time in an impedance value of the bus line, and distance transition of the impedance value as a measurement value candidate which is a candidate for the measurement value,
compares each of a plurality of first measurement value candidates which are a plurality of measurement value candidates that have been measured with a representative value of a plurality of second measurement value candidates which are a plurality of measurement value candidates that have been measured and are different from the first measurement value candidates, and when a difference from the representative value of the plurality of second measurement value candidates is greater than or equal to a threshold value in a first measurement value candidate of the plurality of first measurement value candidates, determines that the impulse noise is included in the first measurement value candidate concerned, and performs either of discarding of the first measurement value candidate determined to include the impulse noise and correction of the first measurement value candidate determined to include the impulse noise, so as to obtain a measurement value candidate not including the impulse noise.

18. The information processing apparatus according to claim 17,
wherein when the number of first measurement value candidates determined to include the impulse noise exceeds a threshold value, the processing circuitry compares a representative value of the plurality of first measurement value candidates with each of the plurality of second measurement value candidates, and when a difference from the representative value of the plurality of first measurement value candidates is greater than or equal to the threshold value in a second measurement value candidate of the plurality of second measurement value candidates, determines that the impulse noise is included in the second measurement value candidate concerned, and when the number of second measurement value candidates determined to include the impulse noise is less than a threshold value, changes the previous determination that each first measurement candidate includes the impulse noise to determine that each first measurement candidate does not include the impulse noise.

19. The information processing apparatus according to claim 3,
wherein the processing circuitry measures one of changes over time in a voltage value of the bus line, distance transition of the voltage value, changes over time in an impedance value of the bus line, and distance transition of the impedance value as a measurement value candidate which is a candidate for the measurement value,
when measuring one of the changes over time in the voltage value of the bus line and the distance transition of the voltage value as the measurement value candidate, samples the voltage value of the bus line at a plurality of sample points,
when measuring one of the changes over time in the impedance value of the bus line and the distance transition of the impedance value as the measurement value candidate, samples the impedance value of the bus line at a plurality of sample points,
analyzes, for each of the sample points, a deviation value of each sample value of a plurality of measurement value candidates that have been measured, so as to determine whether each sample value is the impulse noise, and when a sample value at one of the sample points of one of the measurement value candidates is the impulse noise, performs either of discarding of the sample value that is the impulse noise and correction of the sample value that is the impulse noise, so as to obtain a measurement value candidate not including the impulse noise.

20. The information processing apparatus according to claim 19, wherein the processing circuitry determines, for each of the sample points, whether deviation values of a plurality of sample values calculated for the plurality of measurement value candidates are within an acceptable range, and determines that a sample value whose deviation value is outside the acceptable range is the impulse noise.

21. The information processing apparatus according to claim 19, wherein the processing circuitry determines, for each sample point, that an arbitrary number of highest sample values and an arbitrary number of lowest sample values among a plurality of sample values of a plurality of measurement value candidates are the impulse noise.

22. The information processing apparatus according to claim 19, wherein the processing circuitry determines, for each sample point, that sample values other than a median value among a plurality of sample values of a plurality of measurement value candidates are the impulse noise.

23. The information processing apparatus according to claim 1, wherein upon determining that an unauthorized device is connected to the bus line, the processing circuitry identifies a location where the unauthorized device is connected.

24. The information processing apparatus according to claim 1, wherein the processing circuitry determines that an unauthorized device is connected to the bus line when a time or distance in which the difference between the measurement value and the normal value exceeds a threshold value is in excess of an upper limit value.

25. The information processing apparatus according to claim 24, wherein the processing circuitry holds a plurality of combinations of the threshold value and the upper limit value, and determines whether an unauthorized device is connected to the bus line, using at least one of the plurality of combinations of the threshold value and the upper limit value.

26. The information processing apparatus according to claim 1, further comprising a storage, wherein the plurality of normal values are stored in advance in association with the respective temperature levels.

\* \* \* \* \*